US010063888B1

(12) United States Patent
Suzuki et al.

(10) Patent No.: US 10,063,888 B1
(45) Date of Patent: Aug. 28, 2018

(54) IMAGE PREDICTION ENCODING/DECODING SYSTEM

(71) Applicant: NTT DOCOMO, INC., Tokyo (JP)

(72) Inventors: Yoshinori Suzuki, Tokyo (JP); Junya Takiue, Tokyo (JP); Choong Seng Boon, Tokyo (JP); Thiow Keng Tan, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/965,484

(22) Filed: Apr. 27, 2018

Related U.S. Application Data

(63) Continuation of application No. 15/706,424, filed on Sep. 15, 2017, now Pat. No. 9,986,261, which is a
(Continued)

(30) Foreign Application Priority Data

Jul. 20, 2010 (JP) .................................. 2010-163245
Aug. 3, 2010 (JP) .................................. 2010-174869

(51) Int. Cl.
*H04N 7/12* (2006.01)
*G06K 9/36* (2006.01)
(Continued)

(52) U.S. Cl.
CPC .......... *H04N 19/61* (2014.11); *H04N 19/119* (2014.11); *H04N 19/124* (2014.11); *H04N 19/137* (2014.11); *H04N 19/176* (2014.11)

(58) Field of Classification Search
CPC .... H04N 19/139; H04N 19/61; H04N 19/119; H04N 19/176; H04N 19/52; H04N 19/159; H04N 19/70; H04N 19/46
See application file for complete search history.

(56) References Cited

U.S. PATENT DOCUMENTS 5,467,086 A 11/1995 Jeong
5,608,458 A 3/1997 Chen et al.
(Continued)

FOREIGN PATENT DOCUMENTS

EP 0 889 653 A2 1/1999
EP 1 621 022 A1 2/2006
(Continued)

OTHER PUBLICATIONS

McCann, Ken et al., "Samsung's Response to the Call for Proposals on Video Compression Technology," Joint Collaborative Team on Video Coding (JCT-VC) of ITU-T SG16 WP3 and ISO/IEC JTC1/SC29/WG11, 1st Meeting: Dresden, Germany, Apr. 15-23, 2010, Document: JCTVC-A124, Samsung Electronics Co., Ltd. and British Broadcasting Corporation, 42 pages.
(Continued)

*Primary Examiner* — Tsion B Owens
(74) *Attorney, Agent, or Firm* — Brinks Gilson & Lione

(57) ABSTRACT

An encoding target region in an image can be partitioned into a plurality of prediction regions. Based on prediction information of a neighboring region neighboring a target region, the number of previously-encoded prediction regions in the target region, and previously-encoded prediction information of the target region, a candidate for motion information to be used in generation of a predicted signal of the target prediction region as a next prediction region is selected from previously-encoded motion information of regions neighboring the target prediction region. According to the number of candidates for motion information selected, merging block information to indicate generation of the predicted signal of the target prediction region using the selected candidate for motion information and motion information detected by prediction information estimation
(Continued)

means, or either one of the merging block information or the motion information is encoded.

6 Claims, 39 Drawing Sheets

Related U.S. Application Data continuation of application No. 15/282,580, filed on Sep. 30, 2016, now Pat. No. 9,794,592, which is a continuation of application No. 14/872,826, filed on Oct. 1, 2015, now Pat. No. 9,497,480, which is a continuation of application No. 13/745,414, filed on Jan. 18, 2013, now Pat. No. 9,185,409, which is a continuation of application No. PCT/JP2011/066120, filed on Jul. 14, 2011.

(51) Int. Cl.
*H04N 19/61* (2014.01)
*H04N 19/119* (2014.01)
*H04N 19/124* (2014.01)
*H04N 19/137* (2014.01)
*H04N 19/176* (2014.01)

(56) References Cited

U.S. PATENT DOCUMENTS

| | | | |
|---|---|---|---|
| 5,682,204 A | 10/1997 | Uz et al. | |
| 6,256,417 B1 | 7/2001 | Takahashi et al. | |
| 6,259,739 B1 | 7/2001 | Kondo | |
| 6,415,056 B1 | 7/2002 | Boon | |
| 6,483,521 B1 | 11/2002 | Takahashi et al. | |
| 6,687,405 B1 | 2/2004 | Trew et al. | |
| 6,765,964 B1 | 7/2004 | Conklin | |
| 7,003,035 B2* | 2/2006 | Tourapis | H04N 19/00684 375/240.12 |
| 7,643,559 B2 | 1/2010 | Kato et al. | |
| 8,155,460 B2* | 4/2012 | Sato | H04N 19/159 382/232 |
| 8,355,438 B2* | 1/2013 | Shimizu | H04N 19/00569 375/240.12 |
| 8,885,727 B2 | 11/2014 | Lee et al. | |
| 9,031,125 B2 | 5/2015 | Suzuki et al. | |
| 9,185,409 B2 | 11/2015 | Suzuki et al. | |
| 9,253,498 B2* | 2/2016 | Lee | H04N 19/52 |
| 9,497,480 B2 | 11/2016 | Suzuki et al. | |
| 9,549,186 B2 | 1/2017 | Suzuki et al. | |
| 2002/0090030 A1 | 7/2002 | Boon | |
| 2004/0028282 A1 | 2/2004 | Kato et al. | |
| 2004/0109500 A1 | 6/2004 | Book et al. | |
| 2004/0136461 A1 | 7/2004 | Kondo et al. | |
| 2004/0179601 A1 | 9/2004 | Kobayashi et al. | |
| 2004/0223548 A1 | 11/2004 | Kato et al. | |
| 2004/0252768 A1 | 12/2004 | Suzuki et al. | |
| 2005/0053300 A1 | 3/2005 | Mukerjee | |
| 2005/0163216 A1 | 7/2005 | Boon et al. | |
| 2005/0232500 A1 | 10/2005 | Boon et al. | |
| 2006/0193385 A1 | 8/2006 | Yin et al. | |
| 2007/0009044 A1 | 1/2007 | Tourapis et al. | |
| 2007/0025444 A1 | 2/2007 | Okada et al. | |
| 2007/0065028 A1 | 3/2007 | Boon et al. | |
| 2007/0071105 A1 | 3/2007 | Tian et al. | |
| 2007/0121731 A1 | 5/2007 | Tanizawa et al. | |
| 2007/0253490 A1* | 11/2007 | Makino | H04N 19/00072 375/240.24 |
| 2008/0026729 A1 | 1/2008 | May et al. | |
| 2008/0063071 A1 | 3/2008 | Suzuki | |
| 2008/0063072 A1 | 3/2008 | Suzuki | |
| 2008/0069225 A1 | 3/2008 | Suzuki | |
| 2008/0267292 A1 | 10/2008 | Itoh | |
| 2009/0010557 A1 | 1/2009 | Zheng et al. | |
| 2009/0016443 A1 | 1/2009 | Kim et al. | |
| 2009/0034854 A1 | 2/2009 | Lee et al. | |
| 2009/0110070 A1 | 4/2009 | Takahashi et al. | |
| 2010/0091846 A1* | 4/2010 | Suzuki | H04N 19/105 375/240.12 |
| 2011/0261886 A1* | 10/2011 | Suzuki | H04N 19/56 375/240.16 |
| 2012/0177121 A1* | 7/2012 | Tripathi | G06T 7/20 375/240.16 |
| 2013/0216148 A1* | 8/2013 | Suzuki | H04N 19/52 382/233 |
| 2013/0301720 A1* | 11/2013 | Lee | H04N 19/105 375/240.12 |
| 2014/0286395 A1 | 9/2014 | Lee et al. | |
| 2014/0286428 A1 | 9/2014 | Lee et al. | |
| 2014/0286430 A1 | 9/2014 | Lee et al. | |
| 2016/0021389 A1 | 1/2016 | Suzuki et al. | |

FOREIGN PATENT DOCUMENTS

| | | |
|---|---|---|
| EP | 1 684 524 A1 | 7/2006 |
| JP | 7-264598 A | 10/1995 |
| JP | 2005-277968 A | 10/2005 |
| JP | 2008-311781 A | 12/2008 |
| JP | 2009-5147 A | 1/2009 |
| JP | 2009-246972 A | 10/2009 |
| JP | 2013-530658 A | 7/2013 |
| JP | 57-12330 B2 | 5/2015 |
| WO | WO 03/026315 A1 | 3/2003 |
| WO | WO 2004/091222 A1 | 10/2004 |
| WO | WO 2008/016609 A2 | 2/2008 |
| WO | WO 2008/117158 | 10/2008 |
| WO | WO 2008/127597 | 10/2008 |
| WO | WO 2010/064396 A1 | 6/2010 |
| WO | WO 2010/110126 A1 | 9/2010 |
| WO | WO 2012/005520 A2 | 1/2012 |
| WO | WO 2012/011432 A1 | 1/2012 |

OTHER PUBLICATIONS

JCT-VC, "Test Model under Consideration," Joint Collaborative Team on Video Coding (JCT-VC) of ITU-T SG16 WP3 and ISO/IEC JTC1/SC29/WG11, 1$^{st}$ Meeting: Dresden, Germany, Apr. 15-23, 2010, Document: JCTVC-A205, Output Document (draft007), JCT-VC, 153 pages.
Winken, Martin et al., "Description of video coding technology proposal by Fraunhofer HHI," Joint Collaborative Team on Video Coding (JCT-VC) of ITU-T SG16 WP3 and ISO/IEC JTC1/SC29/WG11, 1$^{st}$ Meeting: Dresden, Germany, Apr. 15-23, 2010, Document: JCTVC-A116, Input Document to JCT-VC, Fraunhofer HHI, 44 pages.
International Search Report, and English language translation thereof, in International Application No. PCT/JP2011/066120, dated Oct. 18, 2011, 4 pages.
Office Action, and English language translation thereof, in Japanese Application No. 2014-147639, dated Feb. 17, 2015, 9 pages.
Subsequent Substantive Examination Report in corresponding Philippines Application No. 1/2013/500087, dated Apr. 8, 2015, 2 pages.
Patent Examination Report No. 1 in corresponding Australian Application No. 2010228415, dated Jul. 17, 2015, 6 pages.
Office Action for U.S. Appl. No. 14/581,705 dated Nov. 17, 2015, 11 pages.
Extended Search Report in corresponding European Application No. 15185593.9, dated Jan. 21, 2016, 11 pages.
Extended Search Report in corresponding European Application No. 11809603.1, dated Feb. 5, 2016, 9 pages.
DeForni, R., et al., "On the Benefits of Leaf Merging in Quad-Tree Motion Models," Image Processing, 2005.Icip 2005. IEEE International Conference on IEEE, Piscataway, NJ, USA, IEEE, vol. 2, Sep. 11, 2005, pp. 858-861.
Winken (Fraunhofer), M. et al., "Video Coding Technology Proposal by Fraunhofer HHI," 1.JCT-VC Meeting; Apr. 15, 2010-Apr. 23, 2010; Dresden; (Joint Collaborative Team on Video Coding of

(56) References Cited

OTHER PUBLICATIONS

ISO/IEC JTC1/SC29/WG11 and ITU-STG.16); URL: http://wftp3.itu.int/av-arch/jctvc-a116, Apr. 24, 2010, pp. 1-44.
Office Action, and English translation thereof, in corresponding Mexican Application No. MX/a/2015/006350, dated Feb. 16, 2016, 12 pages.
Office Action and English translation thereof, in corresponding Japanese Application No. 2015-045725, dated Mar. 8, 2016, 6 pages.
Office Action in U.S. Appl. No. 14/581,705, dated May 6, 2016, 11 pages.
Office Action and English language translation thereof, in corresponding Taiwanese Application No. 104133686, dated May 10, 2016, 9 pages.
Extended European Search Report, dated Aug. 9, 2016, pp. 1-8, issued in European Patent Application No. 16167025.2, European Patent Office, Munich, Germany.
Canadian Office Action, dated Nov. 4, 2016, pp. 1-5, issued in Canadian Patent Application No. 2,903,530, Canadian Intellectual Property Office, Gatineau, Quebec, Canada.
Australian Full Examination Report, dated Mar. 1, 2017, pp. 1-6, issued in Australian Patent Application No. 2016201339, Australia Government—IP Australia.
Japanese Office Action, dated Apr. 13, 2017, pp. 1-6, issued in Japanese Patent Application No. 2016-084633, Japanese Patent Office, Chiyoda-ku Tokyo.
European Office Action, dated Jun. 1, 2017, pp. 1-8, issued in European Patent Application No. 16167025.2, European Patent Office, Munich, Germany.
European Office Action, dated Jul. 20, 2017, pp. 1-4, issued in European Patent Application No. 11809603.1-1908, European Patent Office, Munich, Germany.
Office Action in Canadian Application No. 2,921,802, dated Jan. 20, 2017, 4 pages.
Examination Report No. 1 dated Sep. 11, 2017, pp. 1-5, issued in Australian Patent Application No. 2016231582, Australia Government—IP Australia.
International Standard, ISO/IEC 14496-10, Information technology—Coding of audio-visual objects—Part 10: Advanced Video Coding, dated Oct. 1, 2004, pp. 1-280.
Extended European Search Report in corresponding European Application No. 10755924.7, dated Jun. 18, 2013, 9 pages.
International Preliminary Report on Patentability in corresponding International Application No. PCT/JP2010/054441, dated Oct. 18, 2011, 4 pages.
International Search Report, and English language translation thereof, in corresponding International Application No. PCT/JP2010/054441, dated Jun. 15, 2010, 12 pages.
Tran, Trac D., "Video Coding", *ECE Department, The Johns Hopkins University*, Baltimore, MD, 2006, pp. 1-121 (in two documents-'A' and 'B').
Notice of Allowance in corresponding U.S. Appl. No. 14/581,705, dated Nov. 3, 2016, 13 pages.
Ismaeil I et al., "Efficient Motion Estimation Using Spatial and Temporal Motion Vector Prediction", *1999 International Conference on Kobe-Japan, IEEE*, Piscataway, NJ, USA, vol. 1, Oct. 1999, pp. 70-74.
Extended European Search Report in corresponding European Application No. 17179305.2, dated Oct. 9, 2017, 12 pages.
U.S. Office Action, dated Aug. 29, 2017, pp. 1-18, issued in corresponding U.S. Appl. No. 15/348,504, U.S. Patent and Trademark Office, Alexandria, VA.
U.S. Office Action, dated Dec. 14, 2017, pp. 1-18, issued in corresponding U.S. Appl. No. 15/348,504, U.S. Patent and Trademark Office, Alexandria, VA.
Indian Examination Report, dated Feb. 5, 2018, pp. 1-6, issued in corresponding Indian Patent Application No. 7174/DELNP/2011, Intellectual Property India, Mumbai, India.
Korean Office Action with English translation, dated Mar. 7, 2018, pp. 1-11, issued in Korean Patent Application No. 10-2017-7036233, Korean Intellectual Property Office, Daejeon, Republic of Korea.
ITU-T Recommendation H.264, dated Mar. 2005, pp. 1-343, "Advanced video coding for generic audiovisual services," International Telecommunication Union.
European Office Action, dated Jun. 19, 2018, pp. 1-6, issued in European Patent Application No. 11 809 603.1, European Patent Office, Munich, Germany.

\* cited by examiner

Fig. 12
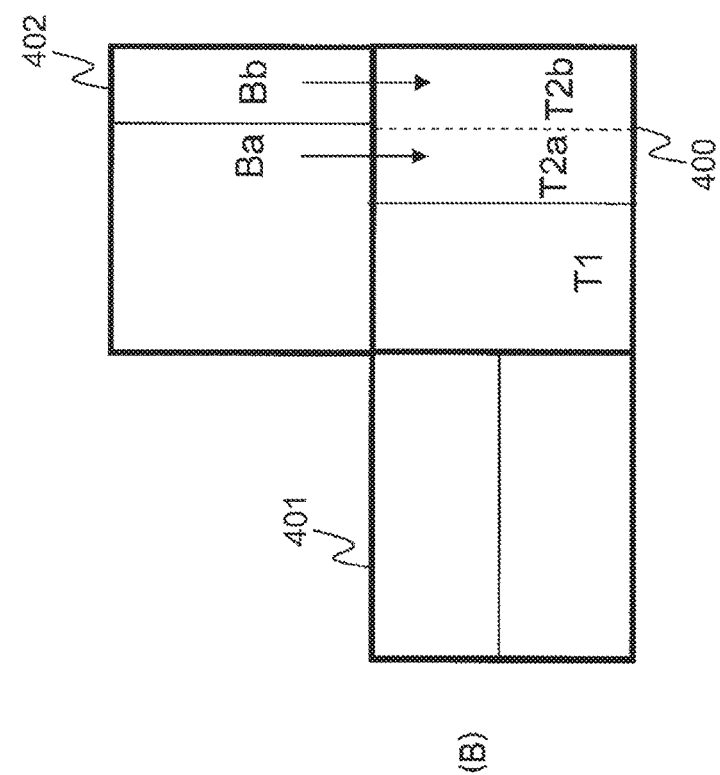
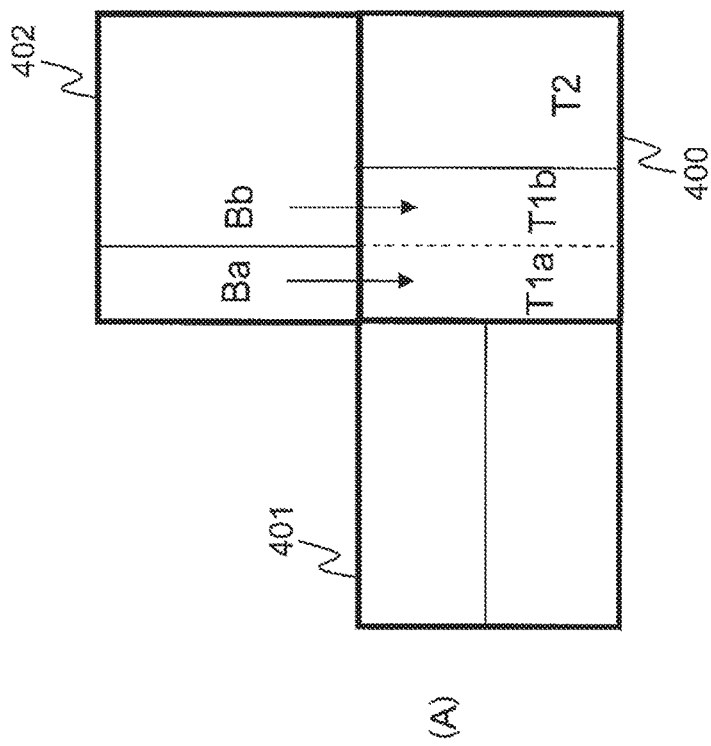

IMAGE PREDICTION ENCODING/DECODING SYSTEM

This application is a continuation application of U.S. application Ser. No. 15/706,424, filed Sep. 15, 2017, which is a continuation application of U.S. application Ser. No. 15/282,580, filed Sep. 30, 2016, which is a continuation of U.S. application Ser. No. 14/872,826, filed Oct. 1, 2015, which is a continuation application of U.S. application Ser. No. 13/745,414, filed Jan. 18, 2013, which is a continuation application of PCT/JP2011/066120, filed Jul. 14, 2011, which claims the benefit of the filing date under 35 U.S.C. § 119(e) of JP2010-163245, filed Jul. 20, 2010, and JP2010-174869, filed Aug. 3, 2010, all of which are incorporated herein by reference.

TECHNICAL FIELD

The present invention relates to an image prediction encoding/decoding system that includes an image predictive encoding device, image predictive encoding method, and image predictive encoding program. The image prediction encoding/decoding system can also include an image predictive decoding device, image predictive decoding method, and image predictive decoding program. Particularly, aspects of the image prediction encoding/decoding system can relate to an image predictive encoding device, image predictive encoding method, image predictive encoding program, image predictive decoding device, image predictive decoding method, and image predictive decoding program to generate a predicted signal of a target block using motion information of surrounding blocks. Still another aspect of the image prediction encoding/decoding system relates to a video encoding device, video encoding method, video encoding program, video decoding device, video decoding method, and video decoding program to generate a predicted signal with motion compensation by a motion vector.

BACKGROUND ART

Compression encoding technologies are used for efficient transmission and storage of still images and video data. The systems of MPEG-1 to 4 and ITU (International Telecommunication Union) H.261 to H.264 are commonly used for video data.

SUMMARY OF INVENTION

Candidates for motion information to be used in block merging of a plurality of prediction blocks resulting from partition of a target encoding block that is serving as an encoding target can be selected by the same method, irrespective of the prediction blocks and surrounding situations. (see, for example, Test Model under Consideration, Joint Collaborative Team on Video Coding (JCT-VC) of ITU-T SG16 WP3 and ISO/IEC JTC1/SC29/WG11, 1st Meeting: Dresden, DE, 15-23 Apr. 2010, Document: JCTVC-A205) For this reason, for example as shown in Fig. (B) of FIG. 2, candidates for motion information in generation of the predicted signal of prediction block T2 can include the motion information of prediction block T1 in the same encoding block. The prediction block partitioning type consisting of the prediction block T1 and prediction block T2 can be prepared on the assumption that the predicted signals of the two blocks are generated using different pieces of motion information. Therefore, it can be unfavorable that the motion information of prediction block T1 is included in the candidates for motion information of prediction block T2. Namely, it can result in inefficient coding.

In embodiments of an image prediction encoding/decoding system, at least one of an image predictive encoding device, image predictive encoding method, image predictive encoding program, image predictive decoding device, image predictive decoding method, or image predictive decoding program are provided in which candidates for motion information to be used in generation of the predicted signal of the target prediction block can be selected based on previously-encoded or previously-decoded prediction information (motion information and prediction block partitioning type) of the target coding block and surrounding coding blocks, to suppress occurrence of inefficient coding. Namely, image prediction encoding/decoding system can provide at least one of the image predictive encoding device, image predictive encoding method, image predictive encoding program, image predictive decoding device, image predictive decoding method, and image predictive decoding program capable of achieving improvement in coding efficiency.

Furthermore, the image prediction encoding/decoding system includes methods of carrying out the motion compensation prediction for each of the sub-partitions obtained by partitioning of a processing target block, such methods are also described in Japanese Patent Application Laid-open No. 2005-277968 or Japanese Patent Application Laid-open No. 2009-246972. In this motion compensation prediction, it is preferable to generate the motion vector predictor for each sub-partition, based on a motion vector of a block prior in the processing order to a processing target sub-partition, and to encode only the differential motion vector between the motion vector of the sub-partition and the motion vector predictor, in terms of code amount.

FIG. 23 is a drawing for explaining the motion compensation prediction. As shown in FIG. 23, a processing target block P may have a sub-partition SP1 in contact with at least one block CP prior in a processing order to the block P, and a sub-partition SP2 having no contact with the block CP. A motion vector V2 of such sub-partition SP2 can be encoded as it is, without use of the motion vector predictor. An example of a method of encoding is described in Japanese Patent Application Laid-open No. 2005-277968. This method is equivalent to a method of setting the motion vector predictor to a zero vector.

On the other hand, in other methods, such as those described in Japanese Patent Application Laid-open No. 2009-246972, a motion vector predictor of sub-partition SP2 can be generated from the motion vector V1 of the sub-partition SP1, where sub-partition SP1 can be another sub-partition in the block P and can be prior in the processing order to the sub-partition SP2. However, the motion vector of the sub-partition SP1 and the motion vector of the sub-partition SP2 can originally be considered to be different from each other. Therefore, the method described in Japanese Patent Application Laid-open No. 2009-246972 may fail to efficiently encode the motion vector of the sub-partition SP2.

Thus, the image prediction encoding/decoding system provides at least one of a video encoding device, video encoding method, and video encoding program capable of achieving improvement in coding efficiency and a video decoding device, video decoding method, and video decoding program corresponding to the video encoding.

A first aspect that may be included in the image prediction encoding/decoding system relates to image predictive encoding.

An image predictive encoding device according to the first aspect of the image prediction encoding/decoding system includes: region partitioning means which partitions an input image into a plurality of regions; prediction information estimation means: which sub-partitions a target region serving as an encoding target resulting from partitioning by the region partitioning means into a plurality of prediction regions, which determines a prediction block partitioning type indicating a number and region shapes of the prediction regions suitable for the target region, which predicts motion information for acquisition of each of signals highly correlated with the respective prediction regions from a previously-reconstructed signal, and which obtains prediction information containing the prediction block partitioning type and the motion information; prediction information encoding means which encodes the prediction information associated with the target region; predicted signal generation means which generates a predicted signal of the target region, based on the prediction information associated with the target region; residual signal generation means which generates a residual signal based on the predicted signal of the target region and a pixel signal of the target region; residual signal encoding means which encodes the residual signal generated by the residual signal generation means; residual signal restoration means which decodes encoded data of the residual signal to generate a reconstructed residual signal; and recording means which adds the predicted signal to the reconstructed residual signal to generate a restored pixel signal of the target region, and which stores the restored pixel signal as the previously-reconstructed signal. The prediction information encoding means is configured as follows: the prediction information encoding means has prediction information storage means which stores previously-encoded prediction information; the prediction information encoding means encodes the prediction block partitioning type of the target region and stores the prediction block partitioning type into the prediction information storage means; based on: the prediction information of a neighboring region neighboring the target region, the number of previously-encoded prediction regions in the target region, and the previously-encoded prediction information of the target region; the prediction information encoding means selects a candidate for motion information to be used in generation of a predicted signal of a target prediction region serving as a next prediction region, from previously-encoded motion information of a region neighboring the target prediction region; according to the number of candidates for the motion information selected, the prediction information encoding means encodes merging block information indicative of generation of the predicted signal of the target prediction region using the selected candidate for motion information and the motion information detected by the prediction information estimation means, or encodes either one of the merging block information and the motion information, and stores the motion information to be used in generation of the predicted signal of the target prediction region, into the prediction information storage means.

The image prediction encoding/decoding system can also include an image predictive encoding method according to the first aspect that comprises: a region partitioning step of partitioning an input image into a plurality of regions; a prediction information estimation step of sub-partitioning a target region serving as an encoding target resulting from partitioning in the region partitioning step, into a plurality of prediction regions, determining a prediction block partitioning type indicating a number and region shapes of prediction regions suitable for the target region, estimating motion information for acquisition of each of signals highly correlated with the respective prediction regions, from a previously-reconstructed signal, and obtaining prediction information containing the prediction block partitioning type and the motion information; a prediction information encoding step of encoding the prediction information associated with the target region; a predicted signal generation step of generating a predicted signal of the target region, based on the prediction information associated with the target region; a residual signal generation step of generating a residual signal based on the predicted signal of the target region and a pixel signal of the target region; a residual signal encoding step of encoding the residual signal generated in the residual signal generation step; a residual signal restoration step of decoding encoded data of the residual signal to generate a reconstructed residual signal; and a recording step of adding the predicted signal to the reconstructed residual signal to generate a restored pixel signal of the target region, and storing the restored pixel signal as the previously-reconstructed signal. The prediction information encoding step is configured as follows: the prediction information encoding step comprises encoding the prediction block partitioning type of the target region and storing the prediction block partitioning type into prediction information storage means storing previously-encoded prediction information; the prediction information encoding step comprises, based on the prediction information of a neighboring region neighboring the target region, the number of previously-encoded prediction regions in the target region, and the previously-encoded prediction information of the target region, selecting a candidate for motion information to be used in generation of a predicted signal of a target prediction region serving as a next prediction region, from previously-encoded motion information of a region neighboring the target prediction region; the prediction information encoding step comprises, according to the number of candidates for motion information selected, encoding merging block information indicative of generation of the predicted signal of the target prediction region using the selected candidate for motion information and the motion information detected in the prediction information estimation step, or encoding either one of the merging block information and the motion information, and storing the motion information to be used in generation of the predicted signal of the target prediction region, into the prediction information storage means.

The image prediction encoding/decoding system can also include an image predictive encoding program according to the first aspect that causes a computer to function as described by at least some the means of the image predictive encoding device described above.

According to the first aspect of the image prediction encoding/decoding system, the candidate for motion information to be used in generation of the predicted signal of the target prediction block can be selected based on the previously-encoded prediction information (motion information and prediction block partitioning type) of the target encoding block and surrounding encoding blocks, which suppresses occurrence of inefficient coding.

In an embodiment, based on the number of previously-encoded prediction regions in the target region, the prediction block partitioning type of the target region, and the prediction block partitioning type of the neighboring region neighboring the target region, the candidate for motion information of the target prediction region serving as the next prediction region may be selected from the previously-encoded motion information of the region neighboring the target prediction region.

In an embodiment, based on the number of previously-encoded prediction regions in the target region and the prediction block partitioning type of the target region, the candidate for motion information of the target prediction region serving as the next prediction region may be selected from the previously-encoded motion information of the region neighboring the target prediction region; when the target region is partitioned into two prediction regions and when the target prediction region is a prediction region to be encoded second in the target region, motion information of a region which is neighboring the target prediction region and which is not included in the target region may be selected as the candidate for motion information to be used in generation of the predicted signal of the target prediction region.

In an embodiment, based on: the number of previously-encoded prediction regions in the target region, the prediction block partitioning type of the target region, the previously-encoded motion information in the target region, and the motion information of the neighboring region neighboring the target region; the candidate for motion information to be used in generation of the predicted signal of the target prediction region serving as the next prediction region may be selected from the previously-encoded motion information of the region neighboring the target prediction region; when the target region is partitioned into two prediction regions, when the target prediction region is a prediction region to be encoded second in the target region, and when the motion information of the prediction region encoded first in the target region is the same as motion information of a region which is neighboring the target prediction region and which is not included in the target region, it may be determined that the motion information of the region neighboring the target prediction region is not used in generation of the predicted signal of the target prediction region, and the motion information may be encoded.

A second aspect that may be included in the image prediction encoding/decoding system relates to image predictive decoding.

An image predictive decoding device according to the second aspect of the image prediction encoding/decoding system comprises: data analysis means which extracts, from compressed data of an image resulting from partitioning into a plurality of regions, and encoding: encoded data of prediction information to indicate a prediction method to be used in prediction of a signal of a target region serving as a decoding target, encoded data of a predicted signal of the target region, and encoded data of a residual signal; prediction information decoding means which decodes the encoded data of the prediction information to restore a prediction block partitioning type indicating a number and region shapes of prediction regions that are sub-partitioned regions of the target region, and motion information for acquisition of each of predicted signals of the respective prediction regions from a previously-reconstructed signal; predicted signal generation means which generates the predicted signal of the target region, based on the prediction information associated with the target region; residual signal restoration means which restores a reconstructed residual signal of the target region from the encoded data of the residual signal; and recording means which adds the predicted signal to the reconstructed residual signal to restore a pixel signal of the target region, and which stores the pixel signal as the previously-reconstructed signal.

The prediction information decoding means can be configured as follows: the prediction information decoding means has prediction information storage means which stores previously-decoded prediction information; the prediction information decoding means decodes the prediction block partitioning type of the target region and stores the prediction block partitioning type into the prediction information storage means; based on the prediction information of a neighboring region neighboring the target region, the number of previously-decoded prediction regions in the target region, and the previously-decoded prediction information of the target region, the prediction information decoding means selects a candidate for motion information to be used in generation of a predicted signal of a target prediction region as a next prediction region, from previously-decoded motion information of a region neighboring the target prediction region; according to the number of candidates for motion information selected, the prediction information decoding means decodes merging block information indicative of generation of the predicted signal of the target prediction region using the selected candidate for motion information and the motion information, or either decodes one of the merging block information and the motion information, and stores the motion information to be used in generation of the predicted signal of the target prediction region, into the prediction information storage means.

An image predictive decoding method according to the second aspect of the image prediction encoding/decoding system comprises: a data analysis step of extracting, from compressed data of an image resulting from partitioning into a plurality of regions and encoding: encoded data of prediction information to indicate a prediction method to be used in prediction of a signal of a target region serving as a decoding target, encoded data of a predicted signal of the target region, and encoded data of a residual signal; a prediction information decoding step of decoding the encoded data of the prediction information to restore a prediction block partitioning type indicating a number and region shapes of prediction regions that are sub-partitioned regions of the target region, and motion information for acquisition of each of predicted signals of the respective prediction regions from a previously-reconstructed signal; a predicted signal generation step of generating the predicted signal of the target region, based on the prediction information associated with the target region; a residual signal restoration step of restoring a reconstructed residual signal of the target region from the encoded data of the residual signal; and a recording step of adding the predicted signal to the reconstructed residual signal to restore a pixel signal of the target region, and storing the pixel signal as the previously-reconstructed signal.

The prediction information decoding step is configured as follows: the prediction information decoding step comprises decoding the prediction block partitioning type of the target region and storing the prediction block partitioning type as previously-decoded prediction information into prediction information storage means that stores previously-decoded prediction information; the prediction information decoding step comprises, based on: the prediction information of a neighboring region neighboring the target region, the number of previously-decoded prediction regions in the target region, and the previously-decoded prediction information of the target region; selecting a candidate for motion information to be used in generation of a predicted signal of a target prediction region serving as a next prediction region, from previously-decoded motion information of a region neighboring the target prediction region; and the prediction information decoding step comprises, according to the number of candidates for motion information selected, decoding merging block information indicative of generation of the predicted signal of the target prediction region using the selected candidate for motion information and the motion information, or decoding either one of the merging block information and the motion information, and storing the motion information to be used in generation of the predicted signal of the target prediction region into the prediction information storage means.

The image prediction encoding/decoding system can also include an image predictive decoding program according to the second aspect that causes a computer to function as described by at least some of the means of the image predictive decoding device described above.

According to the second aspect of the image prediction encoding/decoding system, an image can be decoded from the compressed data generated by the aforementioned image predictive encoding.

In an embodiment, based on the number of previously-decoded prediction regions in the target region, the prediction block partitioning type of the target region, and the prediction block partitioning type of the neighboring region neighboring the target region, the candidate for motion information of the target prediction region serving as the next prediction region may be selected, from the previously-decoded motion information of the region neighboring the target prediction region.

In an embodiment, based on the number of previously-decoded prediction regions in the target region and the prediction block partitioning type of the target region, the candidate for motion information to be used in generation of the predicted signal of the target prediction region serving as the next prediction region may be selected from the previously-decoded motion information of the region neighboring the target prediction region; when the target region is partitioned into two prediction regions and when the target prediction region is a prediction region to be decoded second in the target region, motion information of a region which is neighboring the target prediction region and which is not included in the target region may be selected as the candidate for motion information of the target prediction region.

In an embodiment, based on the number of previously-decoded prediction regions in the target region, the prediction block partitioning type of the target region, the previously-decoded motion region in the target region, and the motion information of the neighboring region neighboring the target region, the candidate for motion information to be used in generation of the predicted signal of the target prediction region serving as the next prediction region may be selected, from the previously-decoded motion information of the region neighboring the target prediction region; when the target region is partitioned into two prediction regions, when the target prediction region is a prediction region to be decoded second in the target region, and when the motion information of the prediction region decoded first in the target region is the same as motion information of a region which is neighboring the target prediction region and which is not included in the target region; it may be determined that the motion information of the region neighboring the target prediction region is not used in generation of the predicted signal of the target prediction region, and the motion information may be decoded.

A third aspect of the image prediction encoding/decoding system relates to video encoding.

The image prediction encoding/decoding system can include a video encoding device according to the third aspect, which comprises partitioning means, sub-partition generation means, motion detection means, predicted signal generation means, motion prediction means, differential motion vector generation means, residual signal generation means, addition means, storage means, and encoding means. The partitioning means partitions an input image in a video sequence into a plurality of partitions. The sub-partition generation means partitions a processing target partition generated by the partitioning means, into a plurality of sub-partitions and generates shape information to specify shapes of the sub-partitions. The motion detection means detects a motion vector of the processing target partition. The predicted signal generation means generates a predicted signal of the processing target partition from a previously-reconstructed image signal, using the motion vector detected by the motion detection means. The motion prediction means generates a motion vector predictor of the processing target partition, based on the shape information generated by the sub-partition generation means and a motion vector of a previously-processed partial region. The previously-processed partial region can be a partition or a sub-partition prior in a processing order to the processing target partition. The differential motion vector generation means generates a differential motion vector, based on a difference between the motion vector used in generation of the predicted signal of the processing target partition and the motion vector predictor. The residual signal generation means generates a residual signal based on a difference between the predicted signal and a pixel signal of the processing target partition. The addition means adds the residual signal to the predicted signal to generate a reconstructed image signal. The storage means stores the reconstructed image signal as a previously-reconstructed image signal. The encoding means encodes: the residual signal generated by the residual signal generation means, the differential motion vector generated by the differential vector generation means, and the shape information generated by the sub-partition generation means; to generate compressed data. When a processing target sub-partition in the processing target partition has no contact with a partition prior in the processing order to the processing target sub-partition, the motion prediction means generates a motion vector predictor of the processing target sub-partition, based on a motion vector of a previously-processed partial region belonging to a domain that also contains the processing target sub-partition or an other domain. The domain and the other domain can be partitioned by an extension line of a boundary between the processing target sub-partition and another sub-partition in the processing target partition.

The image prediction encoding/decoding system can provide a video encoding method according to the third aspect that comprises: (a) a partitioning step of partitioning an input image from a video sequence into a plurality of partitions; (b) a sub-partition generation step of partitioning a processing target partition generated in the partitioning step, into a plurality of sub-partitions and generating shape information to specify shapes of the sub-partitions; (c) a motion detection step of detecting a motion vector of the processing target partition; (d) a predicted signal generation step of generating a predicted signal of the processing target partition from a previously-reconstructed image signal, using the motion vector detected in the motion detection step; (e) a motion prediction step of generating a motion vector predictor of the processing target partition, based on the shape information generated in the sub-partition generation step and a motion vector of a previously-processed partial region as a partition or a sub-partition prior in a processing order to the processing target partition; (f) a differential motion vector generation step of generating a differential motion vector, based on a difference between the motion vector used in generation of the predicted signal of the processing target partition and the motion vector predictor; (g) a residual signal generation step of generating a residual signal based on a difference between the predicted signal and a pixel signal of the processing target partition; (h) an addition step of adding the residual signal to the predicted signal to generate a reconstructed image signal; (i) a storage step of storing the reconstructed image signal as a previously-reconstructed image signal; and (j) an encoding step of encoding: the residual signal generated in the residual signal generation step, the differential motion vector generated in the differential motion vector generation step, and the shape information generated in the sub-partition generation step; to generate compressed data. When a processing target sub-partition in the processing target partition has no contact with a partition prior in the processing order to the processing target sub-partition, the motion prediction step comprises generating a motion vector predictor of the processing target sub-partition, based on a motion vector of a previously-processed partial region which belongs to either a domain containing the processing target sub-partition or an other domain. The domain and the other domain may be partitioned by an extension line of a boundary between the processing target sub-partition and another sub-partition in the processing target partition.

The image prediction encoding/decoding system can also include a video encoding program according to the third aspect that causes a computer to function as described by at least some of the means of the video encoding device described above.

The domain including a sub-partition having no contact with a partition prior in the processing order, out of the two domains defined by the aforementioned extension line of the boundary, is highly likely to have a motion similar to a motion of the sub-partition. Therefore, according to the third aspect, the accuracy of the motion vector predictor improves, the value of the differential motion vector becomes smaller, and the motion vector is encoded with a smaller code amount. Therefore, the encoding efficiency improves.

A fourth aspect of the image prediction encoding/decoding system relates to video decoding.

The image prediction encoding/decoding system can include a video decoding device according to the fourth aspect that comprises decoding means, motion prediction means, vector addition means, predicted signal generation means, addition means, and storage means. The decoding means can decode compressed data to generate a reconstructed residual signal of a processing target partition in an image, a differential motion vector of the processing target partition, and shape information to specify shapes of a plurality of sub-partitions in the processing target partition. The motion prediction means generates a motion vector predictor of the processing target partition, based on the shape information and a motion vector of a previously-processed partial region that is a partition or a sub-partition prior in a processing order to the processing target partition. The vector addition means adds the motion vector predictor generated by the motion prediction means, to the differential motion vector generated by the decoding means, to generate a motion vector of the processing target partition. The predicted signal generation means generates a predicted signal of the processing target partition from a previously-reconstructed image signal, based on the motion vector of the processing target partition. The addition means adds the predicted signal to the reconstructed residual signal generated by the decoding means, to generate a reconstructed image signal. The storage means stores the reconstructed image signal as a previously-reconstructed image signal. When a processing target sub-partition in the processing target partition has no contact with a partition prior in the processing order to the processing target sub-partition, the motion prediction means generates a motion vector predictor of the processing target sub-partition, based on a motion vector of a previously-processed partial region belonging to either a domain containing the processing target sub-partition or an other domain. The domain and the other domain can be partitioned by an extension line of a boundary between the processing target sub-partition and another sub-partition in the processing target partition.

The image prediction encoding/decoding system can also provide a video decoding method according to the fourth aspect that is a method for decoding compressed data to generate a video sequence, comprising: (a) a decoding step of decoding the compressed data to generate a reconstructed residual signal of a processing target partition in an image, a differential motion vector of the processing target partition, and shape information to specify shapes of a plurality of sub-partitions in the processing target partition; (b) a motion prediction step of generating a motion vector predictor of the processing target partition, based on the shape information and a motion vector of a previously-processed partial region as a partition or a sub-partition prior in a processing order to the processing target partition; (c) a vector addition step of adding the motion vector predictor generated in the motion prediction step, to the differential motion vector generated in the decoding step, to generate a motion vector of the processing target partition; (d) a predicted signal generation step of generating a predicted signal of the processing target partition from a previously-reconstructed image signal, based on the motion vector of the processing target partition; (e) an addition step of adding the predicted signal to the reconstructed residual signal generated in the decoding step, to generate a reconstructed image signal; and (f) a storage step of storing the reconstructed image signal as a previously-reconstructed image signal. When a processing target sub-partition in the processing target partition has no contact with a partition prior in the processing order to the processing target sub-partition, the motion prediction step comprises generating a motion vector predictor of the processing target sub-partition, based on a motion vector of a previously-processed partial region belonging to either a domain containing the processing target sub-partition or an other domain. The domain and the other domain being partitioned by an extension line of a boundary between the processing target sub-partition and another sub-partition in the processing target partition.

The image prediction encoding/decoding system can also include a video decoding program according to the fourth aspect that causes a computer to function as described by at least some of the means of the video decoding device described above.

According to the fourth aspect, the motion vector predictor of the sub-partition is generated from a previously-decoded motion vector in the domain containing the sub-partition which has no contact with a partition prior in the processing order. This motion vector predictor is highly likely to be similar to the motion vector of the sub-partition. According to the forgoing embodiments, therefore, the accuracy of the motion vector predictor improves, the value of the differential motion vector becomes smaller, and it becomes feasible to perform decoding from compressed data with a smaller bit amount. Therefore, efficient decoding is achieved.

The image prediction encoding/decoding system comprising at least one of an image predictive encoding device, image predictive encoding method, image predictive encoding program, image predictive decoding device, image predictive decoding method, and image predictive decoding program can provide the effect of more efficient encoding of motion information because the candidate for motion information to be used in generation of the predicted signal of the target prediction block can be selected based on the surrounding previously-encoded or previously-decoded information. Some other aspects of the image prediction encoding/decoding system can use the video encoding device, video encoding method, and video encoding program capable of improving coding efficiency. Furthermore, the image prediction encoding/decoding system can include and/or provide at least some of the video decoding device, video decoding method, and video decoding program corresponding to the foregoing video encoding.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF DRAWINGS

FIG. 12 is a third schematic drawing of an example for explaining processes using motion information of a plurality of neighboring blocks neighboring a target prediction block, as motion information of the target prediction block.

DESCRIPTION OF EMBODIMENTS

A variety of embodiments will be described below in detail with reference to the accompanying drawings. In the description of the drawings identical or equivalent elements will be denoted by the same reference signs, without redundant description.

In encoding systems, an image serving as an encoding target can be partitioned into a plurality of blocks and then an encoding process or a decoding process can be carried out. In intra-picture predictive encoding, a predicted signal can be generated using a neighboring previously-reconstructed image signal (i.e. signal reconstructed from compressed image data) present in the same picture as a target block and then a differential signal obtained by subtracting the predicted signal from a signal of the target block can be encoded. In inter-picture predictive encoding, motion compensation can be performed with reference to a neighboring previously-reconstructed image signal present in a picture different from a target block to generate a predicted signal, and a difference signal obtained by subtracting the predicted signal from a signal of the target block can be encoded.

Figure 22:
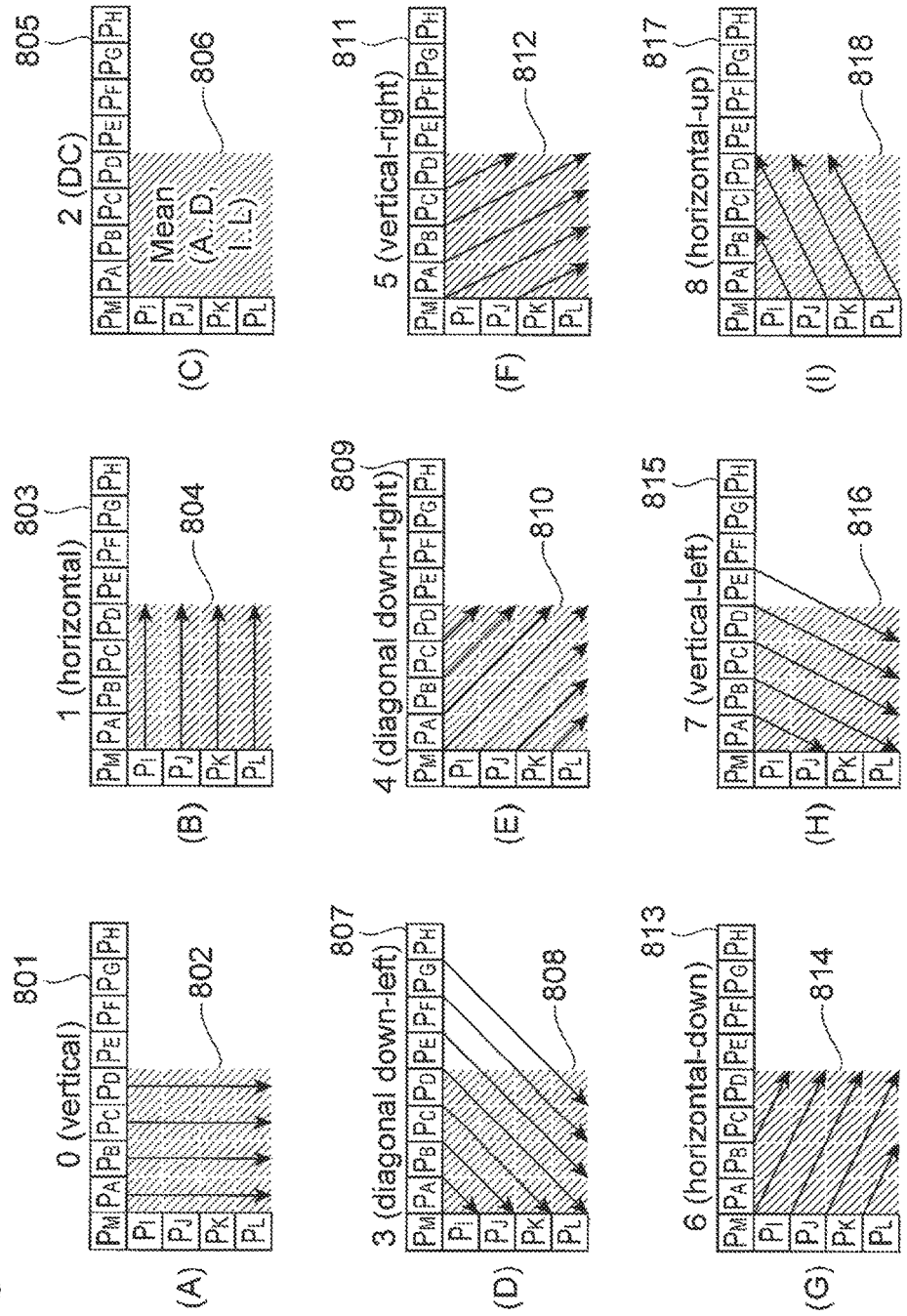
FIG. 22 is a schematic diagram for explaining an example of the conventional intra-picture prediction method.
Figure 23:
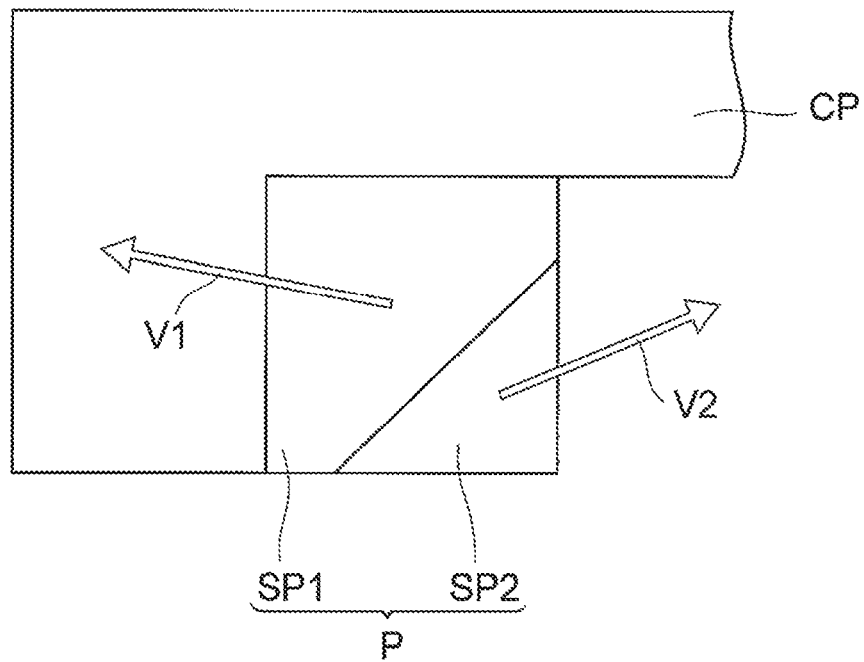
FIG. 23 is a drawing for explaining an example of the motion compensated prediction.

For example, the intra-picture predictive encoding of H.264 employs a method of generating the predicted signal by extrapolating previously-reconstructed pixel values neighboring a block serving as an encoding target, in a predetermined direction. FIG. 22 is a schematic diagram for explaining an example of an intra-picture prediction method such as the method used in ITU H.264. In (A) of FIG. 22, target block 802 is a block serving as an encoding target, and a pixel group 801 consisting of pixels PA-$P_L$ neighboring a boundary of the target block 802 is a neighboring region, which is an image signal previously reconstructed in past processing.

In the case shown in (A) of FIG. 22, the predicted signal can be generated by downwardly extending the pixel group 801 which includes neighboring pixels located immediately above the target block 802. In the case shown in (B) of FIG. 22, the predicted signal can be generated by rightwardly extending previously-reconstructed pixels ($P_I$-$P_L$) located to the left of the target block 804. An example of specific methods for generation of a predicted signal are described, for example, in U.S. Pat. No. 6,765,964. A difference is calculated between each of nine predicted signals generated by the methods shown in (A) to (I) of FIG. 22 in the above-described manner, and the pixel signal of the target block, and the predicted signal with the smallest difference is selected as an optimum predicted signal. As described above, the predicted signal can be generated by extrapolation of pixels. At least part of the contents above are described in U.S. Pat. No. 6,765,964.

In inter-picture predictive encoding, the predicted signal for a block serving as an encoding target can be generated by a method of searching previously-reconstructed pictures for a signal similar to a pixel signal of the target block. A motion vector that is a spatial displacement amount between the target block and a region composed of the detected signal, and a residual signal between the pixel signal of the target block and the predicted signal can then be encoded. The searching technique for a motion vector for each block, such as the searching technique described above can be referred to as block matching.

Figure 21:
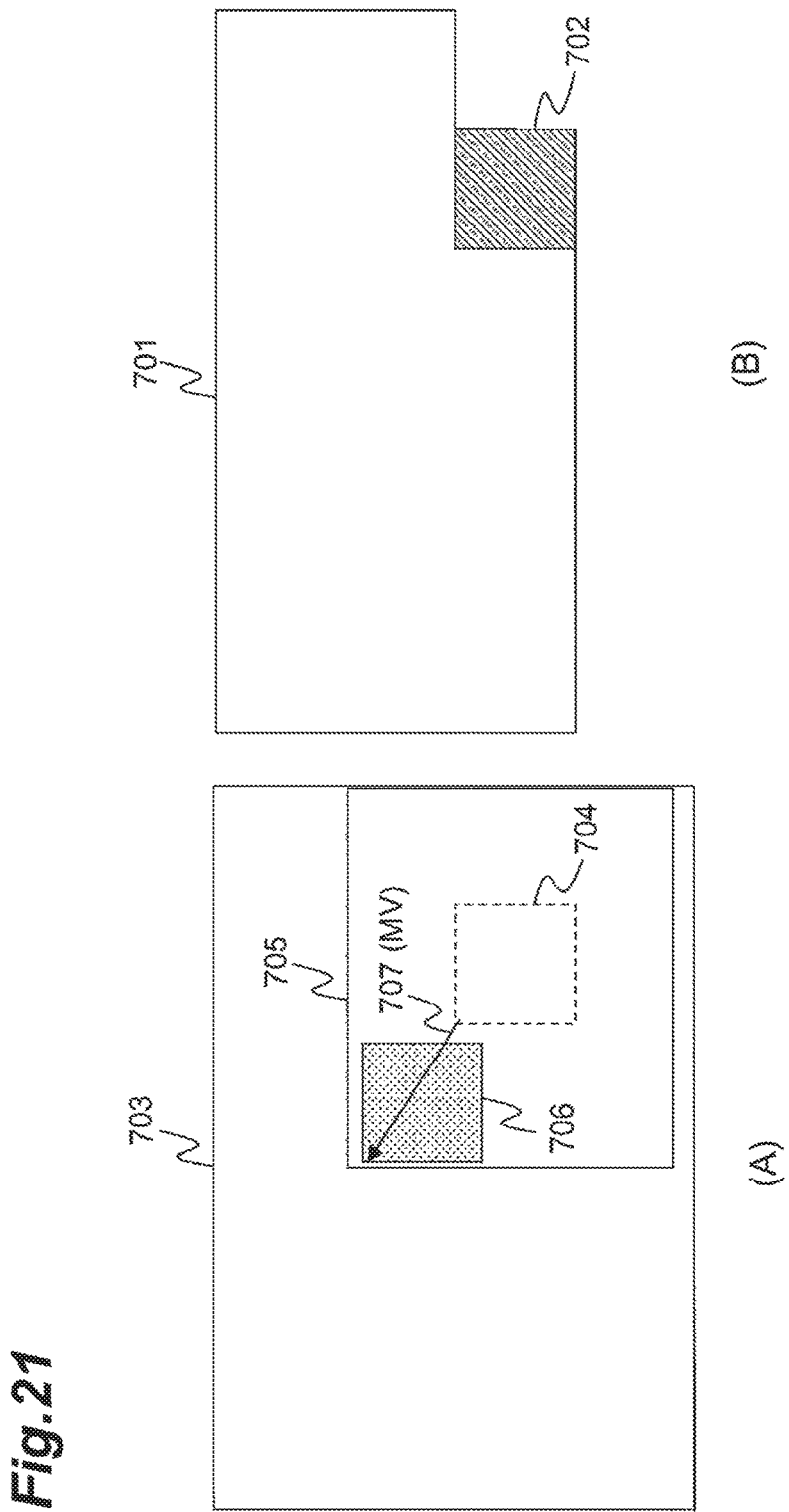
FIG. 21 is a schematic diagram about an example of a motion estimation process (A) and a template matching process (B) in inter-picture prediction.

FIG. 21 is a schematic diagram for explaining a block matching process. The below will describe a procedure of generating a predicted signal for an example of target block 702 on encoding target picture 701. Picture 703 is an example of a previously-reconstructed picture and region 704 is a region located spatially at the same position as target block 702. In an example of the block matching, a search range 705 around the region 704 is set and a region 706 to minimize the sum of absolute differences from the pixel signal of the target block 702 can be detected from a pixel signal of this search range. The signal of this region 706 is determined to be a predicted signal, and a displacement amount from region 704 to region 706 can be detected as a motion vector 707. Also employed can be a method of preparing a plurality of reference pictures 703, selecting a reference picture to be used in block matching for each target block, and detecting reference picture selection information. In some examples, such as in H.264, a plurality of prediction types of different block sizes for encoding of motion vectors can be prepared, in order to adapt for local feature changes of images. At least some examples of prediction types of H.264 are described, for example, in U.S. Pat. No. 7,003,035.

In compression encoding of video data, an encoding order of pictures (frames or fields) may be optional. There can be three types of techniques about the encoding order in the inter-picture prediction to generate the predicted signal with reference to previously-reconstructed pictures. The first technique can be referred to as forward prediction to generate the predicted signal with reference to a past previously-reconstructed picture in a reproduction order, the second technique can be referred to as backward prediction to generate the predicted signal with reference to a future previously-reconstructed picture in the reproduction order, and the third technique can be referred to as bidirectional prediction to perform both forward prediction and backward prediction and average two predicted signals. Examples of some types of inter-picture predictions are described, for example, in U.S. Pat. No. 6,259,739.

Figure 2:
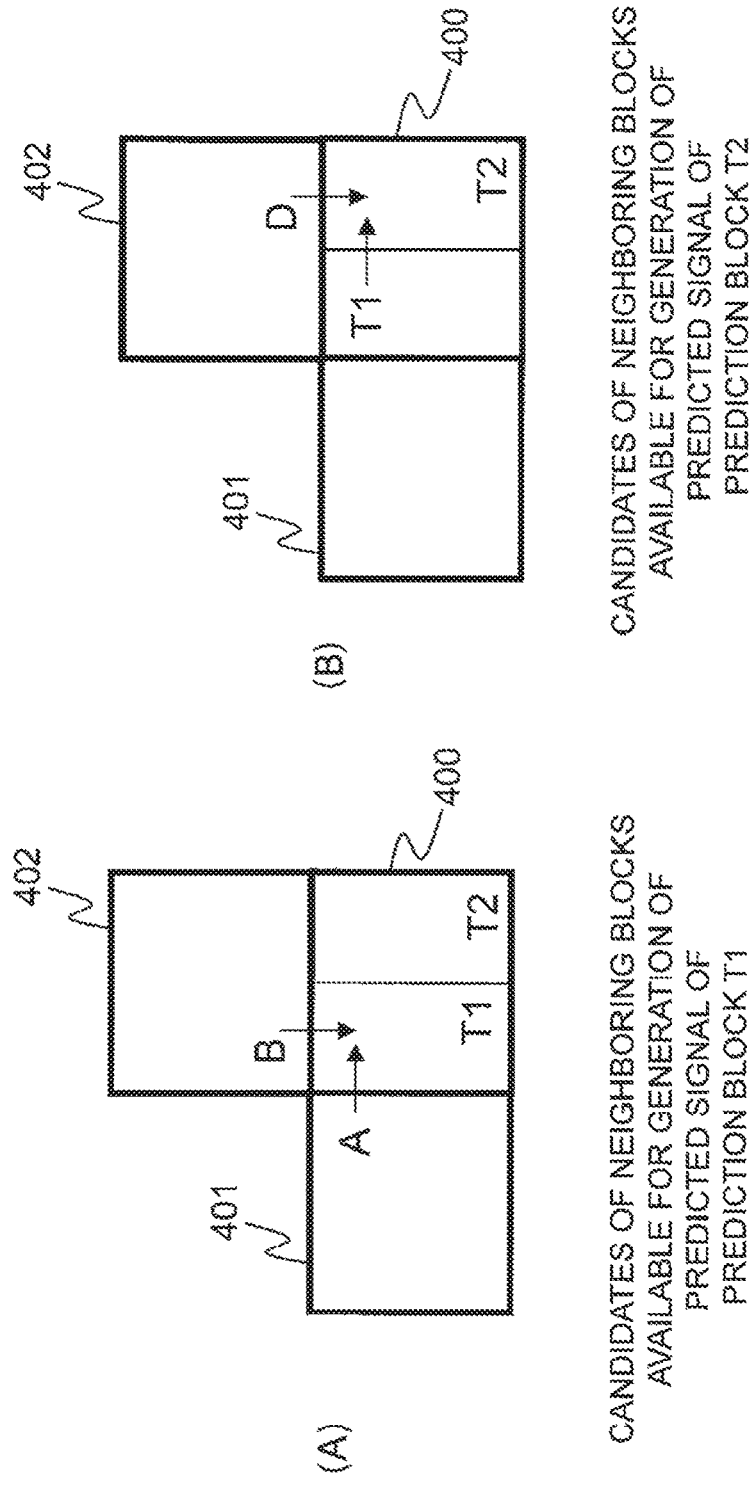
FIG. 2 is a schematic diagram example for explaining candidates for motion information in the conventional block merging.
Figure 20:
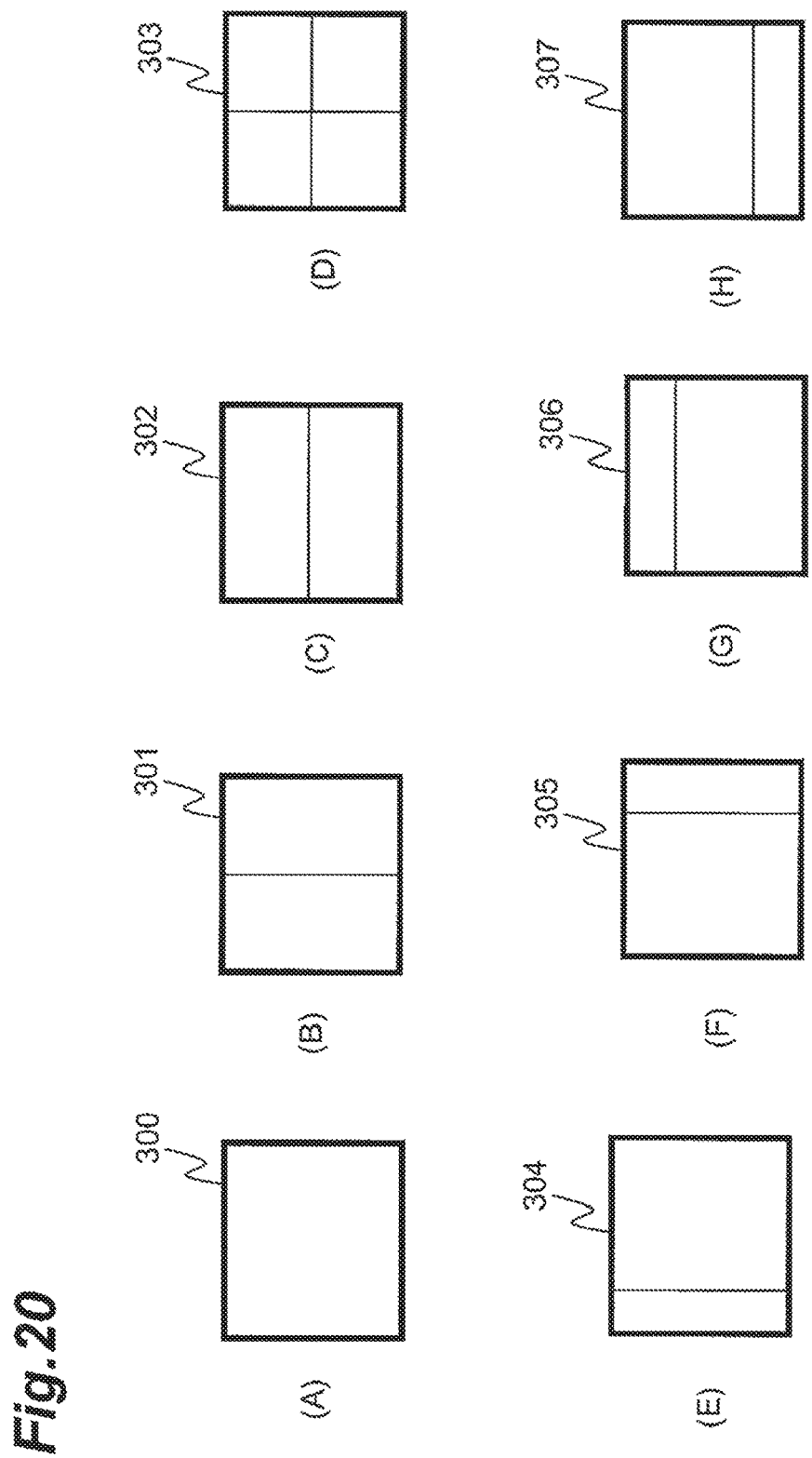
FIG. 20 is a schematic diagram of an example for explaining prediction block partitioning types of encoding blocks.

In HEVC (High efficiency video coding), such as under standardization as a next-generation video encoding system, introduction of asymmetric divisions, or partitions, as shown in the example of (E) to (F) of FIG. 20 can occur as partitioning types of a prediction block, in addition to rectangular bisections shown in the examples of (B) and (C) of FIG. 20 and square quartering shown in the example of (D) of FIG. 20. In an example of HEVC, a further technique can be to use parameters such as motion information (the motion vector, the reference picture information, and an inter-picture prediction mode to identify forward/backward/bidirectional prediction) of a block neighboring a target prediction block serving as a prediction target, on the occasion of generating the predicted signal of the prediction block partitioned in this manner. This prediction technique can generally be referred to as block merging and can enable efficient coding of motion information. (A) of FIG. 2 is a drawing schematically illustrating an example of neighboring blocks in block merging with prediction block T1 generated by vertical partition of encoding block 400. The predicted signal of prediction block T1 can be generated using 1) motion information of neighboring block A, 2) motion information of neighboring block B, or 3) motion information detected in block matching. For example, when an encoder selects the motion information of neighboring block A, the encoder can first set merge identification information (merge_flag) indicative of use of motion information of neighboring block to "merge_flag=1" and transmit the merge identification information (merge_flag) to a decoder. Second, the encoder can set merge block selection information (merge_flag_left) indicative of use of neighboring block A out of neighboring block A and neighboring block B, to "merge_flag_left=1" and transmit the merge block selection information (merge_flag_left) to the decoder. The decoder, receiving the two pieces of information, can identify that the predicted signal of the target prediction block should be generated using the motion information of neighboring block A. Similarly, when the decoder receives "merge_flag=1" and "merge_flag_left=0" (selection of neighboring block B), it can identify that the predicted signal of the target prediction block should be generated using the motion information of neighboring block B; when it receives "merge_flag=0," it can identify that it should further receive the motion information from the encoder, and restore the motion information of the target prediction block. Examples of block merging are also described in U.S. Pat. No. 6,765,964.

In inter-picture prediction, in the standards such as MPEG-1, MPEG-2 and MPEG-4, each picture is partitioned into a set of rectangular blocks without an overlap among them, and a motion vector is associated with each of the blocks. The motion vector is one obtained by motion search for each block and represents a horizontal displacement and a vertical displacement of a current block from a second block used for prediction of the image signal of the current block.

Japanese Patent Application Laid-open No. 2005-277968 describes an example of a method for carrying out motion compensation prediction with higher accuracy in situations where a boundary of motion exists in an oblique direction in a block. An example of this method is to further partition a block into nonrectangular sub-partitions and perform motion compensated prediction for each of the sub-partitions. Japanese Patent Application Laid-open No. 2009-246972 describes an example of a method of further partitioning a block into small rectangular sub-partitions and performing motion compensation prediction for each of the sub-partitions. In examples of this method, for encoding a motion vector of a processing target sub-partition, a motion vector predictor can be generated from a motion vector of a block being in contact with the processing target sub-partition and located prior in a processing order to the sub-partition, and a difference between the motion vector of the processing target sub-partition and the motion vector predictor, i.e., a differential motion vector only can be encoded. In examples of this method, if the processing target sub-partition has no contact with a block prior in the processing order, the motion vector predictor of the processing target sub-partition can be generated from a motion vector of another sub-partition prior in the processing order in the block including the processing target sub-partition.

Figure 1:
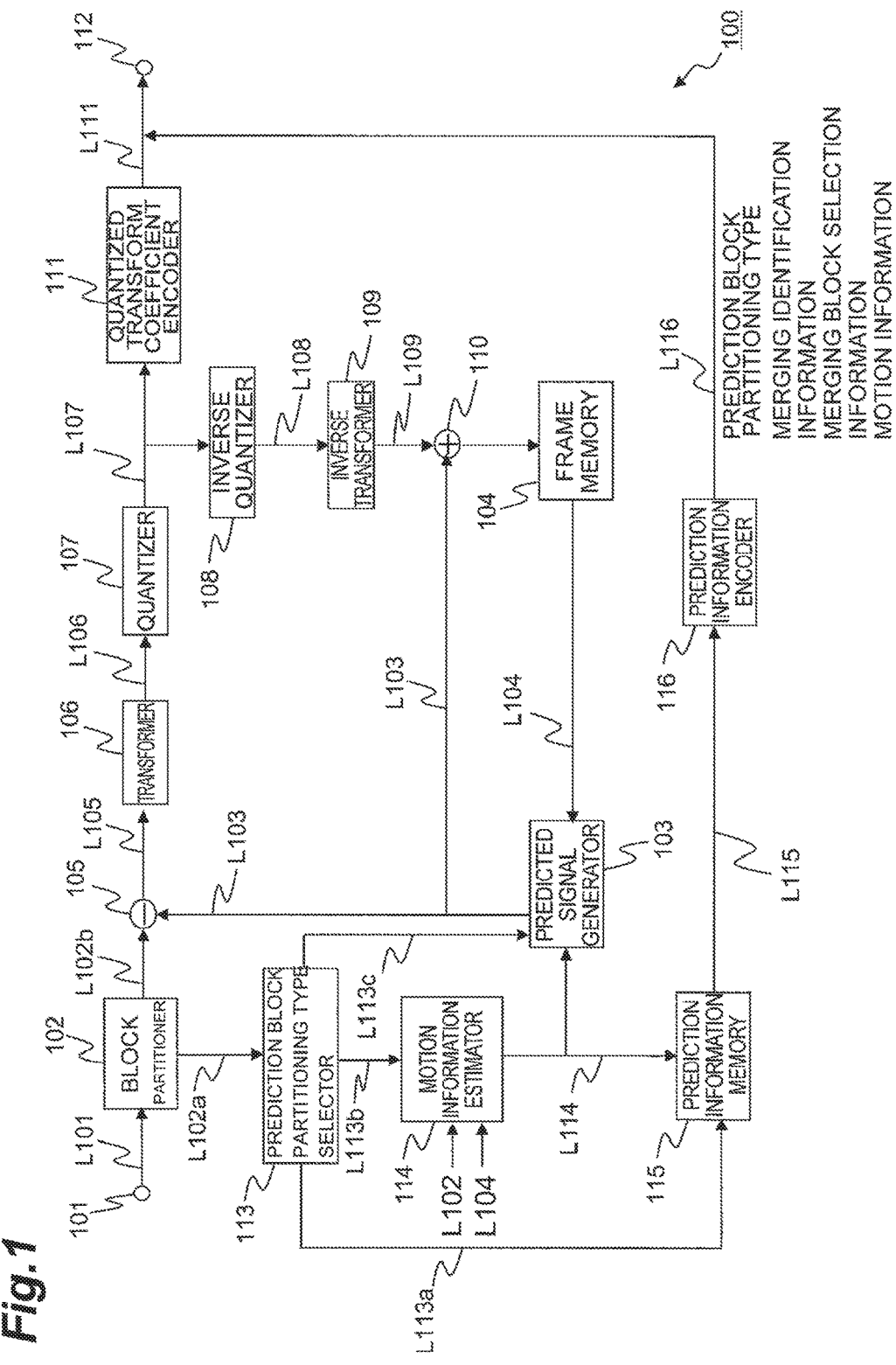
FIG. 1 is a block diagram showing an example image predictive encoding device according to an embodiment.

FIG. 1 is a block diagram showing an image predictive encoding device 100 according to an embodiment. This image predictive encoding device 100 is provided with input terminal 101, block partitioner 102, predicted signal generator 103, frame memory 104, subtracter 105, transformer 106, quantizer 107, inverse quantizer 108, inverse transformer 109, adder 110, quantized transform coefficient encoder 111, output terminal 112, prediction block partitioning type selector 113, motion information estimator 114, prediction information memory 115, and prediction information encoder 116. The image predictive encoding device 100 may be a computing device or computer, including for example software, hardware, or a combination of hardware and software, as described later, capable of performing the described functionality. The image predictive encoding device 100 may be one or more separate systems or devices included in the image prediction encoding/decoding system, or may be combined with other systems or devices within the image prediction encoding/decoding system. In other examples, fewer or additional blocks may be used to illustrate the functionality of the image predictive encoding device 100.

The transformer 106, quantizer 107, and quantized transform coefficient encoder 111 function as residual signal encoding units, or means, and the inverse quantizer and inverse transformer function as residual signal restoration units, or means. The prediction block partitioning type selector 113 and motion information estimator 114 function as prediction information estimation units, or means, and the prediction information memory 115 and prediction information encoder 116 as prediction information encoding units, or means. The term "unit" is defined to include one or more executable parts of a image predictive encoding device or image predictive decoding device. As described herein, the units are defined to include software, hardware, or some combination thereof executable by a processor (described later). Software included in the units may include instructions stored in memory, or any other computer readable storage medium, that are executable by the processor, or any other processor. Hardware included in the units may include various devices, components, circuits, gates, circuit boards, and the like that are executable, directed, and/or controlled for performance by the processor.

The input terminal 101 is a terminal that accepts input of a signal of a video sequence consisting of a plurality of images.

The block partitioner 102 partitions an image serving as an encoding target represented by a signal input from the input terminal 101, into a plurality of regions (encoding blocks). In the present embodiment the encoding target image is partitioned into blocks each consisting of 16×16 pixels, but the image may be partitioned into blocks of any other size or shape. Furthermore, blocks of different sizes may be mixed in a frame.

The prediction block partitioning type selector 113 partitions a target region (target encoding block) serving as an encoding target into prediction regions to be subjected to a prediction process. For example, it selects one of (A) to (H) in FIG. 20 for each encoding block and sub-partitions the encoding block according to the selected mode. Each partitioned region is called a prediction region (prediction block) and each of the partitioning methods (A) to (H) in FIG. 20 is called a prediction block partitioning type. An available method of selecting a prediction block partitioning type is, for example, a method of carrying out each of sub-partitions of the signal of the target encoding block fed via line L102, actually carrying out below-described prediction processing and encoding processing, and selecting a partitioning type to minimize a rate-distortion value calculated from the power of an encoding error signal between the original signal of the encoding block and a reconstructed signal, and a code amount necessary for encoding of the encoding block, but is not limited thereto. The prediction block partitioning type of the target encoding block is output via line L113a, via line L113b, and via line L113c to the prediction information memory 115, to the motion information estimator 114, and to the predicted signal generator 103, respectively.

The motion information estimator 114 detects motion information necessary for generation of a predicted signal of each prediction block in the target encoding block. An applicable method of generation of the predicted signal (prediction method) are inter-picture prediction and the intra-picture prediction (the intra-picture prediction is not shown) as described in the background, but are not limited thereto. It is assumed herein that the motion information is detected by the block matching shown in FIG. 21. An original signal of the target prediction block being a prediction target can be generated from the original signal of the encoding block fed via line L102a and the prediction block partitioning type of the target encoding block fed via line L113b. A predicted signal to minimize the sum of absolute differences for the original signal of the target prediction block is detected from image signals acquired via line L104. In this case, the motion information contains a motion vector, an inter-picture prediction mode (forward/backward/bidirectional prediction), a reference frame number, and so on. The detected motion information is output each via line L114 to the prediction information memory 115 and the prediction information encoder 116.

The prediction information memory 115 stores the input motion information and prediction block partitioning type.

The prediction information encoder 116 selects candidates for motion information to be used in block merging of each prediction block, entropy-encodes prediction information of the target encoding block, and outputs the encoded data via line L116 to the output terminal 112. An applicable method of entropy encoding includes the arithmetic coding, the variable length coding, and so on, but is not limited thereto. The prediction information contains block merging information for execution of block merging using motion information of blocks neighboring the prediction block, in addition to the prediction block partitioning type of the target encoding block and the motion information of the prediction block. The process of the prediction information encoder 116 will be described later.

The predicted signal generator 103 acquires previously-reconstructed signals from the frame memory 104, based on the motion information of each prediction block in the target encoding block fed via line L114 and the prediction block partitioning type fed via line L113c, and generates a predicted signal of each prediction block in the target encoding block.

The predicted signal generated in the predicted signal generator 103 is output via line L103 to the subtracter 105 and the adder 110.

The subtracter 105 subtracts the predicted signal for the target encoding block fed via line L103, from the pixel signal of the target encoding block fed via line L102b after being partitioned by the block partitioner 102, to generate a residual signal. The subtracter 105 outputs the residual signal obtained by the subtraction, via line L105 to the transformer 106.

The transformer 106 is a part that performs a discrete cosine transform on the input residual signal. The quantizer 107 is a part that quantizes transform coefficients obtained by the discrete cosine transform by the transformer 106. The quantized transform coefficient encoder 111 entropy-encodes the quantized transform coefficients obtained by the quantizer 107. The encoded data is output via line L111 to the output terminal 112. An applicable method of entropy encoding includes the arithmetic coding, the variable length coding, and so on, but is not limited thereto.

The output terminal 112 outputs the pieces of information input from the prediction information encoder 116 and the quantized transform coefficient encoder 111, together to the outside.

The inverse quantizer 108 performs inverse quantization on the quantized transform coefficients. The inverse transformer 109 performs an inverse discrete cosine transform to restore a residual signal. The adder 110 adds the restored residual signal to the predicted signal fed via line L103, to reconstruct a signal of the target encoding block, and stores the reconstructed signal into the frame memory 104. The present embodiment employs the transformer 106 and the inverse transformer 109, but another transform process may be employed instead of these transformers. Furthermore, the transformer 106 and the inverse transformer 109 are not always essential. In this manner, for use in generation of the predicted signal of the subsequent target encoding block, the reconstructed signal of the target encoding block subjected to encoding is restored by the inverse process to be stored in the frame memory 104.

Next, the process of the prediction information encoder 116 will be described. The prediction information encoder 116 first selects candidates for motion information to be used in block merging of each prediction block (candidates for motion information to be used in generation of a predicted signal of a target prediction region) from the motion information of blocks neighboring the target prediction block. The block merging refers to generation of the predicted signal of the target prediction block using the motion information of neighboring blocks. Next, the prediction information encoder 116 compares the motion information detected by the motion information estimator 114, with the candidates for motion information thus selected, to determine whether block merging is to be carried out. Then, according to the number of candidates for motion information to be used in block merging, and the applicability of execution of block merging, the prediction information encoder 116 entropy-encodes either or both of block merging information and the motion information, along with the prediction block partitioning type. The block merging information includes merging identification information (merge_flag) to indicate whether the predicted signal of the target prediction block is to be generated using motion information of a neighboring block, i.e., whether block merging is to be carried out, and merging block selection information (merge_flag_left) to indicate which should be used between pieces of motion information of two or more blocks neighboring the target prediction block to generate the predicted signal of the target prediction block.

If there is no candidate for motion information to be used in block merging of each prediction block, there is no need for encoding these two pieces of information, i.e., the merging identification information and the merging block selection information. If there is one candidate for motion information, the merging identification information is encoded; if there are two or more candidates for motion information and if block merging is carried out, the two pieces of information, i.e., the pieces of merging identification information and merging block selection information are encoded. Even with two or more candidates for motion information, there is no need for encoding of the merging block selection information if block merging is not carried out.

Figure 3:
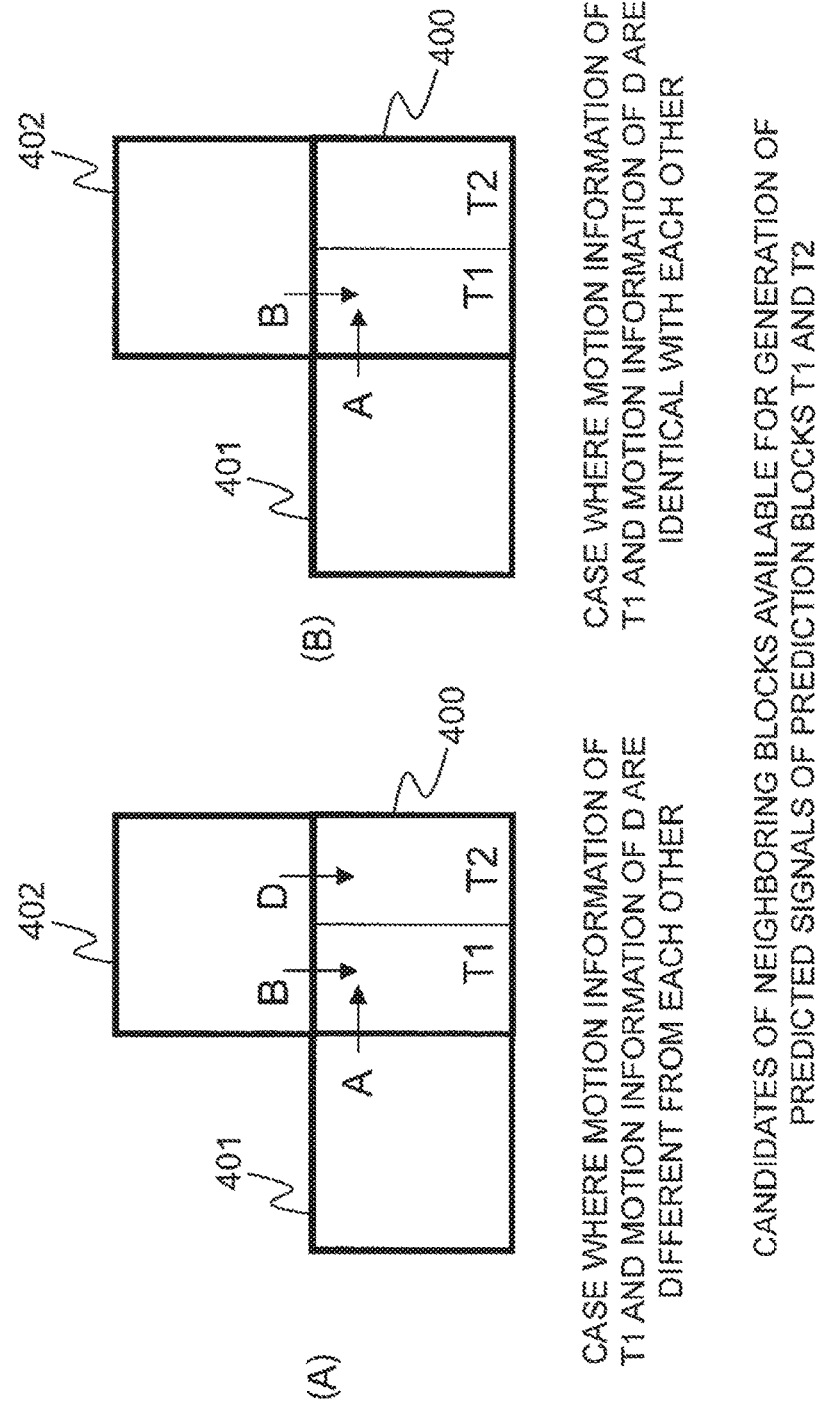
FIG. 3 is a schematic diagram example for explaining candidates for motion information in block merging according to an embodiment.

FIG. 3 is a schematic diagram for explaining a process of selecting candidates for motion information to be used in block merging of a prediction block according to an embodiment. FIG. 3 shows an example of a prediction block partitioning type to vertically bisect the encoding block (or to partition the encoding block into right and left blocks), as in the case of the block 301 shown in (B) of FIG. 20. The below will describe this block 301 as an example, but the same description also applies to blocks 302, 304, 305, 306, and 307.

Selection of a candidate for motion information is carried out based on information below.
1) The number of already-encoded/already-decoded prediction blocks in the target encoding block
2) The prediction block partitioning type of the target encoding block
3) The prediction block partitioning type of a block neighboring the target prediction block
4) The motion information of the already-encoded/already-decoded prediction blocks in the target encoding block
5) The motion information and the prediction mode (intra-picture prediction/inter-picture prediction) of the block neighboring the target prediction block In the example of FIG. 3, a candidate for motion information to be used in block merging is selected using the pieces of information of 1), 2), 4), and 5).

First, it is found from the information of 2) that the total number of prediction blocks in the target encoding block 400 is 2, prediction blocks T1 and T2, and that the encoding block is vertically partitioned into two sub-partitions. It is found from the information of 1) that the next prediction block is either prediction block T1 or prediction block T2.

When the next prediction block is the prediction block T1 (or when the number of already-encoded/already-decoded prediction blocks in the target encoding block is 0), pieces of motion information of neighboring block A and neighboring block B are set as candidates for motion information for block merging (arrows in the drawing indicate that pieces of motion information of neighboring blocks A and B are candidates for motion information to be used in generation of the predicted signal of prediction block T1). On this occasion, if the neighboring block A or B is a block generated by intra-picture prediction or a block outside the picture, the motion information of the block may be excluded from candidates for motion information for block merging (it is also possible to set the motion information to a pseudo default value; for example, the motion vector is set to 0 and the reference frame number to 0). If pieces of motion information of the two neighboring blocks A and B are identical with each other, the motion information of one neighboring block may be excluded from the candidates.

When the next prediction block is the prediction block T2 (or when the number of already-encoded/already-decoded prediction blocks in the target encoding block is 1), as shown in (A) of FIG. 3, the motion information of the neighboring block T1 is excluded from candidates for motion information for block merging. This is because the target encoding block is originally partitioned into two blocks on the assumption that the predicted signals of the prediction block T1 and the prediction block T2 are generated from different pieces of motion information. Namely, this is for avoiding such a situation that the motion information of the prediction block T2 becomes the same as the motion information of the prediction block T1. Since this process provides only one piece of motion information for block merging of the prediction block T2, the cost for encoding of merging block selection information can be reduced (an arrow in the drawing indicates that the motion information of neighboring block D is applicable to generation of the predicted signal of the prediction block T2).

Furthermore, based on the pieces of information of 4) and 5) above, the motion information of the prediction block T1 is compared with the motion information of the neighboring block D and if these pieces of motion information of the prediction block T1 and neighboring block D are identical with each other, the motion information of the neighboring block D is also excluded from candidates for motion information for block merging as shown in (B) of FIG. 3. The reason for it is that if the predicted signal of the prediction block T2 is generated using the motion information of the neighboring block D, pieces of motion information of the prediction blocks T1 and T2 become identical with each other. Owing to this process, the motion information for block merging of the prediction block T2 becomes null, which can reduce the cost for encoding of merging identification information and merging block selection information.

Figure 4:
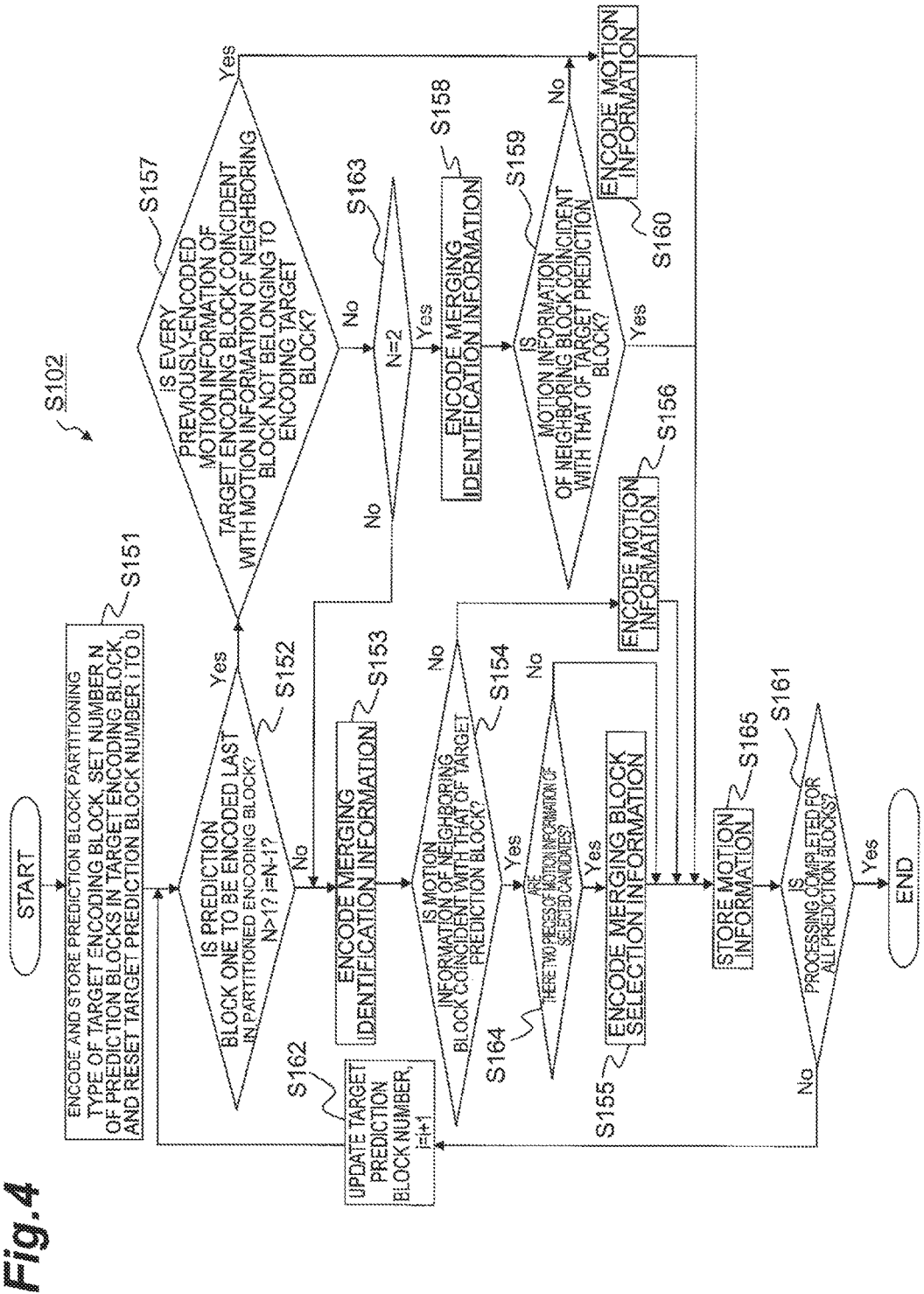
FIG. 4 is a flowchart to illustrate an example processing procedure of a prediction information encoder shown in FIG. 1.

FIG. 4 is a flowchart of the prediction information encoder 116 to substantialize the process of FIG. 3.

First, the prediction information encoder 116 encodes the prediction block partitioning type of the target encoding block and stores the prediction block partitioning type into the prediction information memory 115. At the same time, the prediction information encoder 116 sets the number N of prediction blocks in the target encoding block, based on the encoded prediction block partitioning type, and resets a target prediction block number i to 0 (step S151). Next, the prediction information encoder 116 determines whether a target prediction block is a prediction block to be encoded last in the target encoding block and whether the number of prediction blocks in the target encoding block is not less than 2 (step S152). For example, in the case of N=2, the decision is yes with i=1, and the processing proceeds to step S157. In the case of N=4 ((D) of FIG. 20), the decision becomes yes with i=3. When the decision is no, the processing proceeds to step S153. In the case of FIG. 3, the processing proceeds to step S153 when the target prediction block is the prediction block T1; the processing proceeds to step S157 when the target prediction block is the prediction block T2.

In step S153, the merging identification information is encoded. The merging identification information becomes yes (merge_flag=1, generation of the predicted signal of the target prediction block using a candidate for motion information) if the motion information of the target prediction block coincides with a candidate for motion information for block merging; otherwise, the merging identification information becomes no (merge_flag=0, generation of the predicted signal of the target prediction block using the encoded motion information). Next, when the motion information of the target prediction block coincides with a candidate for motion information for block merging, the processing proceeds to step S164. In step S164, the prediction information encoder 116 determines whether there are two candidates for motion information, and if the number of candidates for motion information is 2, it encodes the merging block selection information and the processing proceeds to step S155. When the number of candidates for motion information is 1, the processing proceeds to step S165. On the other hand, if the motion information of the target prediction block does not coincide with any candidate for motion information for block merging, the processing proceeds to step S156 and the prediction information encoder 116 encodes the motion information detected by the motion information estimator 114, and then proceeds to step S165.

In step S157, the prediction information encoder 116 determines whether every piece of already-encoded motion information of the target encoding block coincides with the motion information of a neighboring block that does not belong to the target encoding block. The description of this step S157 means that, in the case of N=2, the motion information of the prediction block T1 shown in FIG. 3 is compared with the motion information of the neighboring block D. Furthermore, the description of step S157 means that, in the case of N=4 ((D) of FIG. 20), the target prediction block is the lower right partitioned block and the pieces of motion information of the other three prediction blocks (upper left, upper right, and lower left) are compared with each other. When the determination is yes (or when pieces of motion information in comparison are coincident), the number of candidates for motion information to be used in block merging of the target prediction block is 0, as shown in the example of (B) of FIG. 3, and thus the prediction information encoder 116 encodes the motion information detected by the motion information estimator 114, without transmitting the block merging information, and then the processing proceeds to step S165 (step S160). On the other hand, when the determination is no (or when pieces of motion information in comparison are not coincident), the processing proceeds to step S163. In the case of N=4, pieces of motion information of the upper right and lower left blocks in the target encoding block are those of neighboring blocks to the target prediction block. For this reason, application of block merging to the target prediction block (lower right) with coincidence of the motion information of the three prediction blocks (upper left, upper right, and lower left) means that the predicted signals of the four prediction blocks in the target encoding block are all generated using the same motion information. For this reason, in the case where N=4 and where the pieces of motion information of the three prediction blocks (upper left, upper right, and lower left) are identical with each other, the number of candidates for motion information of the target prediction block (lower right) is set to 0.

In step S163, the prediction information encoder 116 determines whether the prediction block partitioning type of the target encoding block is a bisectional type, and if the determination is no, the processing proceeds to step S153 (the description hereinafter is omitted). When the determination in step S163 is yes, the processing proceeds to step S158, in which the prediction information encoder 116 encodes the merging identification information. In this case, since the number of candidates for motion information to be used in block merging of the target prediction block is 1, as in the example of (A) of FIG. 3, there is no need for encoding of the merging block selection information. Next, if the motion information of the target prediction block coincides with the candidate for motion information for block merging, the processing proceeds to step S165. When the motion information of the target prediction block does not coincide with the candidate for motion information for block merging, the processing proceeds to step S160, in which the prediction information encoder 116 encodes the motion information detected by the motion information estimator 114, and then the processing proceeds to step S165.

In step S165, the motion information of the target block is stored into the prediction information memory 115. Subsequently, in step S161 the prediction information encoder 116 determines whether encoding is completed for all the prediction blocks in the target encoding block (whether i=N−1); when i=N−1, this prediction information encoding processing of the target encoding block is terminated; when i<N−1, the number i is updated in step S162 (i=i+1), and the processing returns to step S152 to perform the motion information encoding processing of the next prediction block.

Since the candidates for motion information to be used in block merging of the prediction block can be selected in advance using the pieces of information below, as described above, it becomes feasible to efficiently transmit the block merging information.

Figure 5:
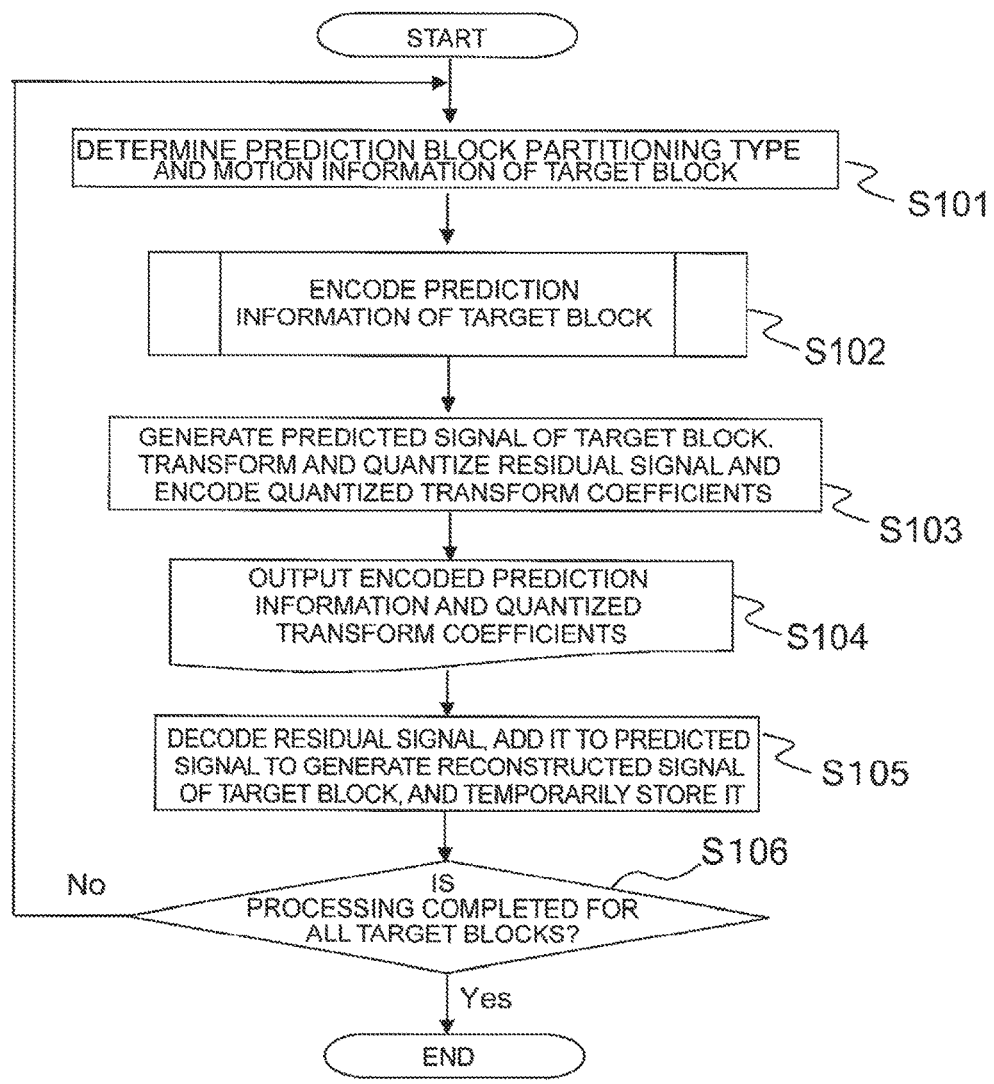
FIG. 5 is a flowchart showing an example procedure of an image predictive encoding method of the image predictive encoding device shown in FIG. 1.

1) The number of already-encoded/already-decoded prediction blocks in the target encoding block
2) The prediction block partitioning type of the target encoding block
4) The motion information of the already-encoded/already-decoded prediction blocks in the target encoding block
5) The motion information and prediction mode (intra-picture prediction/inter-picture prediction) of the block neighboring the target prediction block FIG. 5 is a flowchart showing a procedure of an image predictive encoding method in the image predictive encoding device 100 according to the present embodiment. First, the block partitioner 102 partitions an input picture into 16×16 encoding blocks (the picture may be partitioned into blocks of other size or shape, or blocks of different sizes may be mixed in the frame). Then the prediction block partitioning type selector 113 and the motion information estimator 114 determine the prediction block partitioning type of the target encoding block serving as an encoding target and the motion information of each of prediction blocks thereof (step S101). Next, the prediction information encoder 116 encodes the prediction information (step S102, FIG. 4).

Next, the predicted signal generator 103 generates the predicted signal of the target encoding block, based on the prediction block partitioning type of the target encoding block and the motion information of each of the prediction blocks, and a residual signal indicative of a difference between a pixel signal of the target encoding block and the predicted signal is transformed and encoded by the transformer 106, quantizer 107, and quantized transform coefficient encoder 111 (step S103). The encoded data of the prediction information and the quantized transform coefficients is then output through the output terminal 112 (step S104).

For predictive encoding of the subsequent target encoding block, the encoded residual signal is decoded by the inverse quantizer 108 and the inverse transformer 109 after these processes or in parallel with these processes. Then the adder 110 adds the decoded residual signal to the predicted signal to reconstruct a signal of the target encoding block. The reconstructed signal is stored as a reference picture into the frame memory 104 (step S105). If the processing is not completed for all the target encoding blocks, the processing returns to step S101 to carry out the processing for the next target encoding block. When the processing is completed for all the target encoding blocks, the processing is terminated (step S106).

Figure 6:
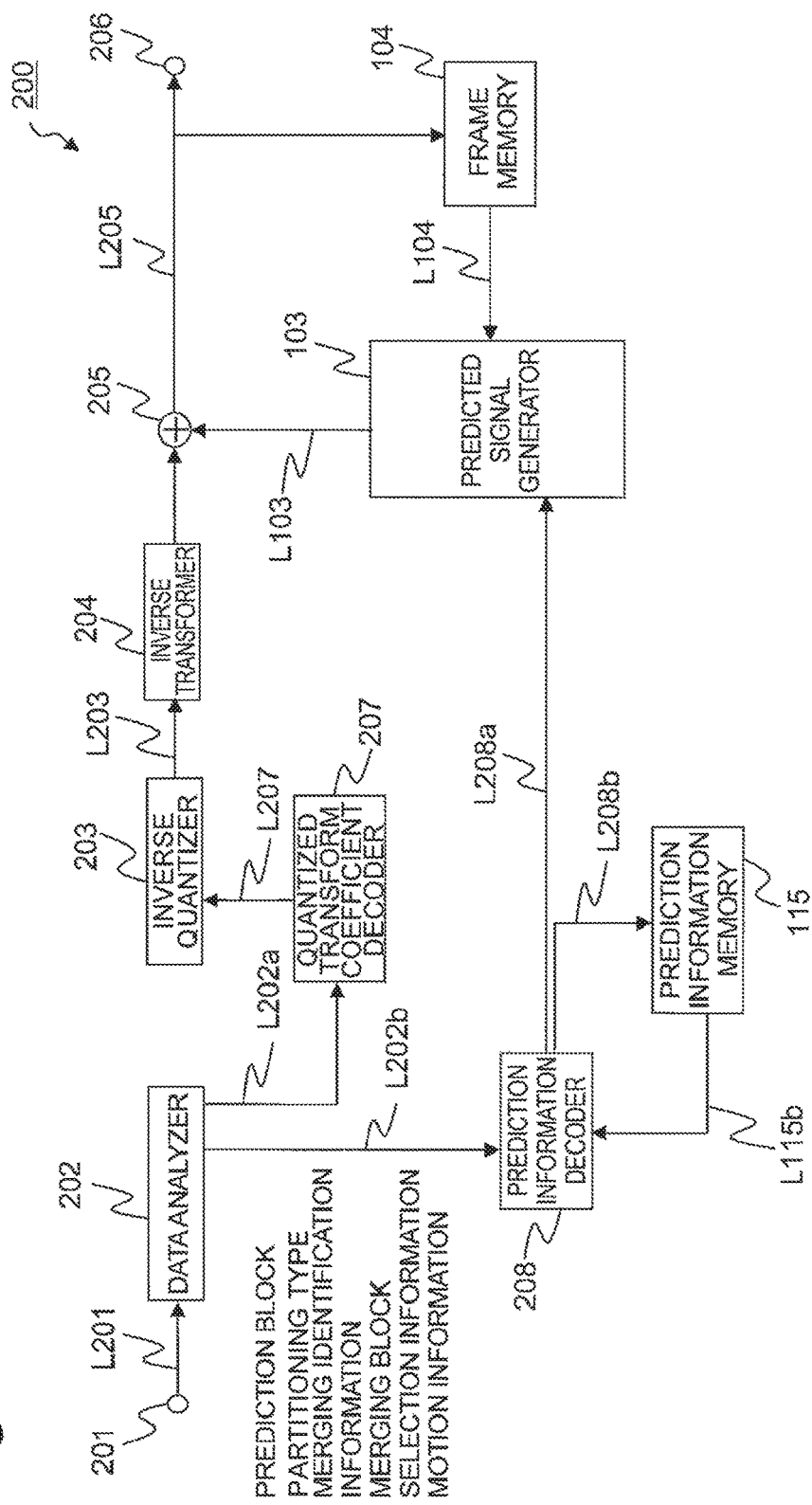
FIG. 6 is a block diagram showing an example image predictive decoding device according to an embodiment.

Next, image predictive decoding according to an embodiment will be described. FIG. 6 is a block diagram showing an image predictive decoding device 200 according to an embodiment. This image predictive decoding device 200 is provided with input terminal 201, data analyzer 202, inverse quantizer 203, inverse transformer 204, adder 205, output terminal 206, quantized transform coefficient decoder 207, prediction information decoder 208, frame memory 104, predicted signal generator 103, and prediction information memory 115. The image predictive decoding device 200 may be a computing device or computer, including for example software, hardware, or a combination of hardware and software, as described later, capable of performing the described functionality. The image predictive decoding device 200 may be one or more separate systems or devices included in the image prediction encoding/decoding system, or may be combined with other systems or devices within the image prediction encoding/decoding system. In other examples, fewer or additional blocks may be used to illustrate the functionality of the image predictive decoding device 1000.

The inverse quantizer 203, inverse transformer 204, and quantized transform coefficient decoder 207 function as residual signal decoding means. The decoding means by the inverse quantizer 203 and the inverse transformer 204 may be implemented using any means other than these. Furthermore, the inverse transformer 204 may be excluded. The prediction information memory 115 and the prediction information decoder 208 function as prediction information decoding means.

The input terminal 201 accepts input of compressed data resulting from the compression encoding by the aforementioned image predictive encoding method. This compressed data contains the information of quantized transform coefficients resulting from transformation, quantization, and entropy encoding of the residual signal, for each of a plurality of partitioned encoding blocks, and encoded data of the prediction information for generation of the predicted signal of the blocks. The prediction information herein contains the block merging information for execution of block merging using the motion information as candidates for block merging, in addition to the prediction block partitioning type of the target encoded block and the motion information of prediction blocks. Furthermore, the motion information contains the motion vector, the inter-picture prediction mode (forward/backward/bidirectional prediction), the reference frame number, and so on.

The data analyzer 202 analyzes the compressed data input through the input terminal 201, separates the data about the target encoded block serving as a decoding target into encoded data of quantized transform coefficients and encoded data of prediction information, and outputs them via line L202a and via line L202b to the quantized transform coefficient decoder 207 and to the prediction information decoder 208, respectively.

The prediction information decoder 208 selects a candidate for motion information to be used in block merging of each prediction block and entropy-decodes the encoded data of the prediction information associated with the target encoded block. The decoded prediction information is output via line L208a and via line L208b to the predicted signal generator 103 and to the prediction information memory 115, respectively. The prediction information memory 115 stores the input prediction information. The processing of the prediction information decoder 208 will be described later.

The predicted signal generator 103 acquires previously-reconstructed signals from the frame memory 104, based on the prediction information of the target encoded block fed via line L208a, and generates a predicted signal of each prediction block in the target encoded block. The predicted signal thus generated is output via line L103 to the adder 205.

The quantized transform coefficient decoder 207 entropy-decodes the encoded data of quantized transform coefficients of the residual signal in the target encoded block and outputs the result via line L207 to the inverse quantizer 203.

The inverse quantizer 203 performs inverse quantization of the residual signal information of the target encoded block fed via line L207. The inverse transformer 204 performs an inverse discrete cosine transform of the inversely quantized data.

The adder 205 adds the predicted signal generated by the predicted signal generator 103, to the residual signal restored by the inverse quantizer 203 and the inverse transformer 204, and outputs a reconstructed pixel signal of the target encoded block via line L205 to the output terminal 206 and the frame memory 104. The output terminal 206 outputs the signal to the outside of the decoding device 200 (e.g., to a display).

The frame memory 104 stores the reconstructed image output from the adder 205, as a reference picture which is stored as a reconstructed image for reference for the next decoding processing.

Figure 7:
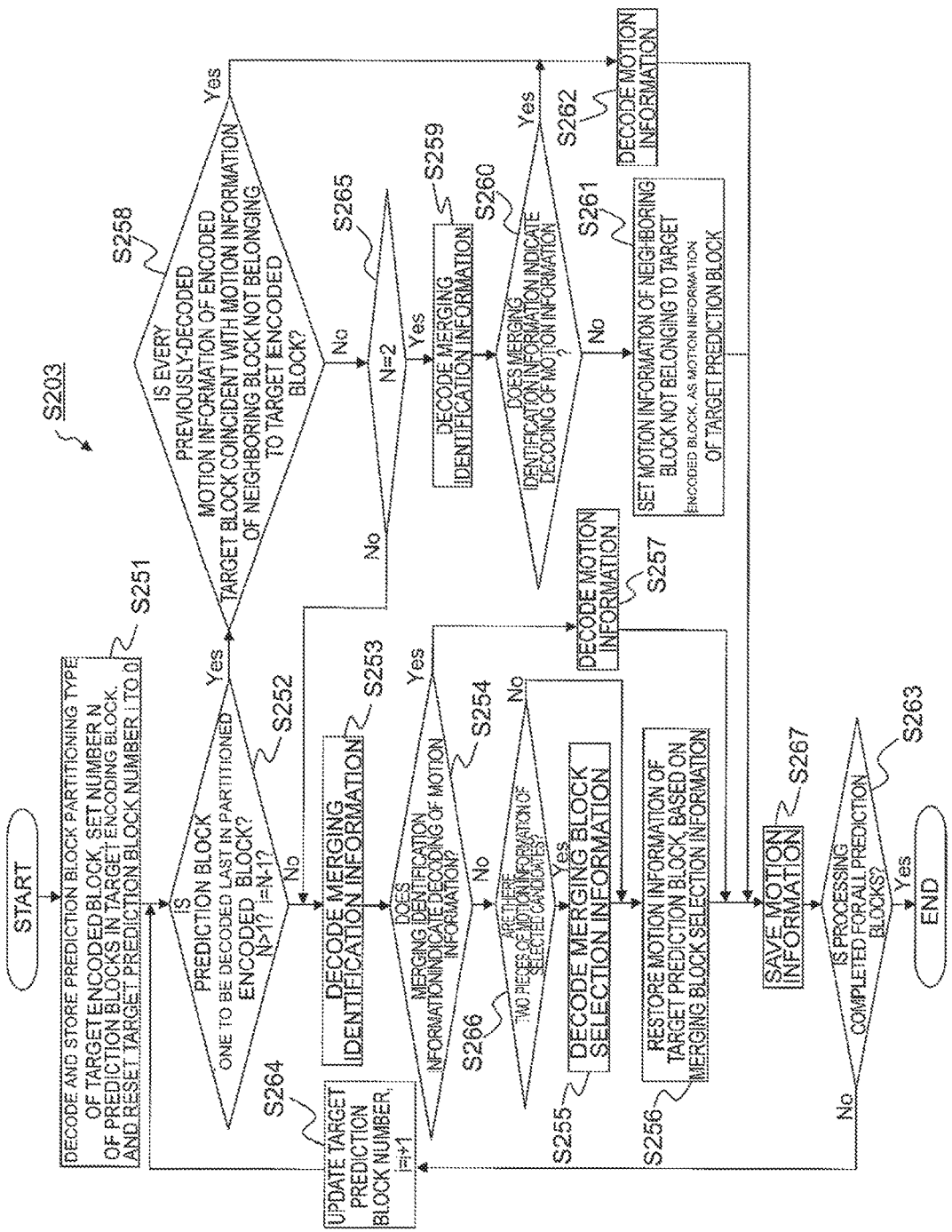
FIG. 7 is a flowchart to illustrate an example processing procedure of a prediction information decoder shown in FIG. 6.

FIG. 7 is a flowchart of the prediction information decoder 208 to implement the processing of FIG. 3.

First, the prediction information decoder 208 decodes the prediction block partitioning type of the target encoded block and stores it in the prediction information memory 115. At the same time, the prediction information decoder 208 sets the number N of prediction blocks in the target encoded block, based on the decoded prediction block partitioning type, and resets the target prediction block number i to 0 (step S251). Next, the prediction information decoder 208 determines whether a target prediction block is a prediction block to be decoded last in the target encoded block and whether the number of prediction blocks in the target encoded block is not less than 2 (step S252). For example, in the case of N=2, the determination is yes with i=1 and the processing proceeds to step S258. In the case of N=4 ((D) of FIG. 20), the determination is yes with i=3. When the determination is no, the processing proceeds to step S253. In FIG. 3, the processing proceeds to step S253 when the target prediction block is the prediction block T1; the processing proceeds to step S258 when the target prediction block is the prediction block T2.

In step S253, the merging identification information is decoded. When the merging identification information is yes (merge_flag=1) herein, the merging identification information indicates that the predicted signal of the target prediction block is to be generated using a candidate for motion information. On the other hand, when the merging identification information is no (merge_flag=0), the predicted signal of the target prediction block is generated using the decoded motion information. In next step S254, the prediction information decoder 208 determines whether the merging identification information indicates decoding of motion information, i.e., whether the value of merge_flag is 0. When the decoded value of merge_flag is 0, the prediction information decoder 208 decodes the motion information for generation of the predicted signal of the target prediction block (step S257) and then the processing proceeds to step S267. When the value of merge_flag is 1, the prediction information decoder 208 determines in step S266 whether the number of candidates for motion information to be used in block merging is 2, and when the number of candidates is 2, the merging block selection information is decoded and the processing proceeds to step S256 (step S255). When the number of candidates for motion information to be used in block merging of the target prediction block is 1, the processing proceeds to step S256. In step S256, when the number of candidates for motion information is 1, the prediction information decoder 208 determines the motion information thereof as the motion information of the target prediction block. When the number of candidates for motion information is 2, the prediction information decoder 208 determines the motion information of the neighboring block indicated by the merging block selection information, as the motion information of the target prediction block.

In step S258, the prediction information decoder 208 determines whether every piece of already-decoded motion information of the target encoded block coincides with the motion information of a neighboring block that does not belong to the target encoded block. The description of this step S258 means that, in the case of N=2, the motion information of the prediction block T1 shown in FIG. 3 is compared with the motion information of the neighboring block D. Furthermore, the description of this step S258 means that, in the case of N=4 ((D) of FIG. 20), the target prediction block is the lower right partitioned block and the pieces of motion information of the three other prediction blocks (upper left, upper right, and lower left) are compared with each other. When the determination is yes (or when the pieces of motion information in comparison are coincident), the number of candidates for motion information to be used in block merging of the target prediction block is 0, as shown in the example of (B) in FIG. 3, the prediction information decoder 208 decodes the motion information to be used for generation of the predicted signal of the target prediction block, without decoding the block merging information, and the processing proceeds to step S267 (step S262). On the other hand, when the determination is no (or when the pieces of motion information in comparison are not coincident), the processing proceeds to step S265. In the case of N=4, the pieces of motion information of the upper right and the lower left blocks in the target encoded block are those of neighboring blocks to the target prediction block. For this reason, application of block merging to the target prediction block (lower right) when coincidence of the pieces of motion information of the three prediction blocks (upper left, upper right, and lower left) means that the predicted signals of the four prediction blocks in the target encoded block are generated all from the same motion information. For this reason, in the case where N=4 and where the pieces of motion information of the three prediction blocks (upper left, upper right, and lower left) are identical with each other, the number of candidates for motion information of the target prediction block (lower right) is set to 0.

In step S265, the prediction information decoder 208 determines whether the prediction block partitioning type of the target encoded block is a bisectional type, and if the determination is no, the processing proceeds to step S253 (the description hereinafter is omitted). When the determination in step S265 is yes, the processing proceeds to step S259, in which the prediction information decoder 208 decodes the merging identification information. In this case, as in the example of (A) of FIG. 3, the number of candidates for motion information to be used in block merging of the target prediction block is 1, and therefore there is no need for decoding of the merging block selection information.

In next step S260, the prediction information decoder 208 determines whether the merging identification information indicates decoding of motion information, i.e., whether the value of merge_flag is 0. When the decoded value of merge_flag is 0, the prediction information decoder 208 decodes the motion information for generation of the predicted signal of the target prediction block (step S262) and the processing proceeds to step S267. When the value of merge_flag is 1, the processing proceeds to step S261. In step S261, since the number of candidates for motion information is 1, as shown in (A) of FIG. 3, the prediction information decoder 208 determines the motion information of the neighboring block D as the motion information of the target prediction block and the processing proceeds to step S267.

In step S267, the motion information of the restored prediction block is stored into the prediction information memory 115. Subsequently, in step S263, the prediction information decoder 208 determines whether the decoding is complete for all the prediction blocks in the target encoded block (whether i=N−1); when i=N−1, this prediction information decoding processing of the target encoded block is terminated; when i<N−1, the number i is updated in step S264 (i=i+1) and the processing returns to step S252 to perform the motion information decoding processing of the next prediction block.

Figure 8:
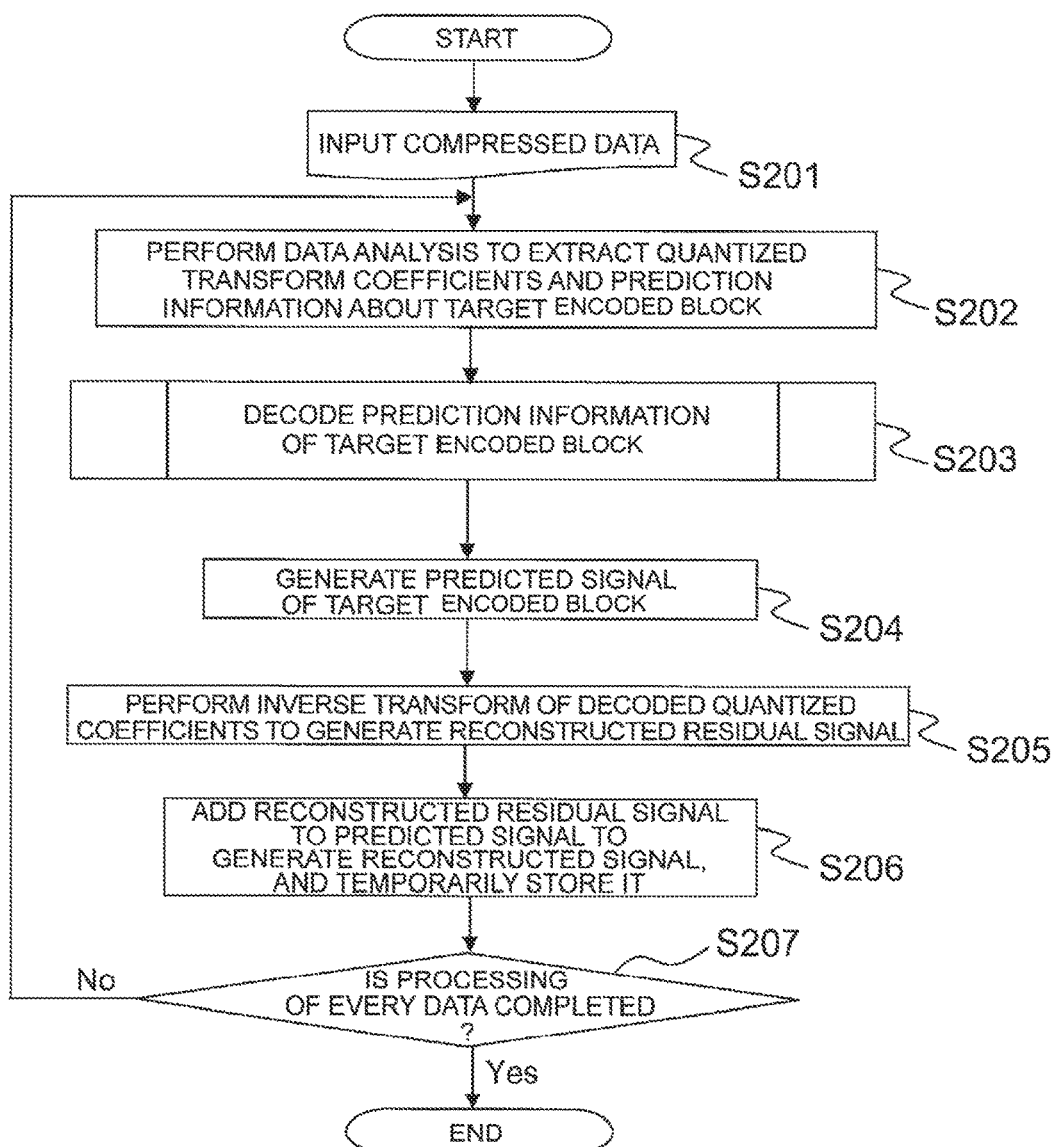
FIG. 8 is a flowchart showing an example procedure of an image predictive decoding method of the image predictive decoding device shown in FIG. 6.

Next, an image predictive decoding method in the image predictive decoding device 200 shown in FIG. 6 will be described using FIG. 8. First, compressed data is input through the input terminal 201 (step S201). Then the data analyzer 202 performs data analysis of the compressed data to extract the encoded data of the prediction information and the quantized transform coefficients about a target region of a decoding target (S202). The prediction information is decoded by the prediction information decoder 208 (S203).

Thereafter, based on the restored prediction information, the predicted signal generator 103 generates the predicted signal of the target encoded block (S204).

The quantized transform coefficients decoded by the quantized transform coefficient decoder 207 are subjected to the inverse quantization in the inverse quantizer 203 and to the inverse transformation in the inverse transformer 204, to generate a reconstructed residual signal (S205). Then the generated predicted signal is added to the reconstructed residual signal to generate a reconstructed signal, and this reconstructed signal is stored into the frame memory 104, for reconstruction of the next target of encoded block (step S206). If there is next compressed data, the processes of S204 to S206 are repeatedly carried out (S207) to process the entire data to the last.

The above described the examples in which the number of neighboring blocks to the prediction block is not more than 2, and the below will focus attention on situations in which the number of neighboring blocks in contact with upper and left block boundaries to a prediction block is not less than 3.

Figure 9:
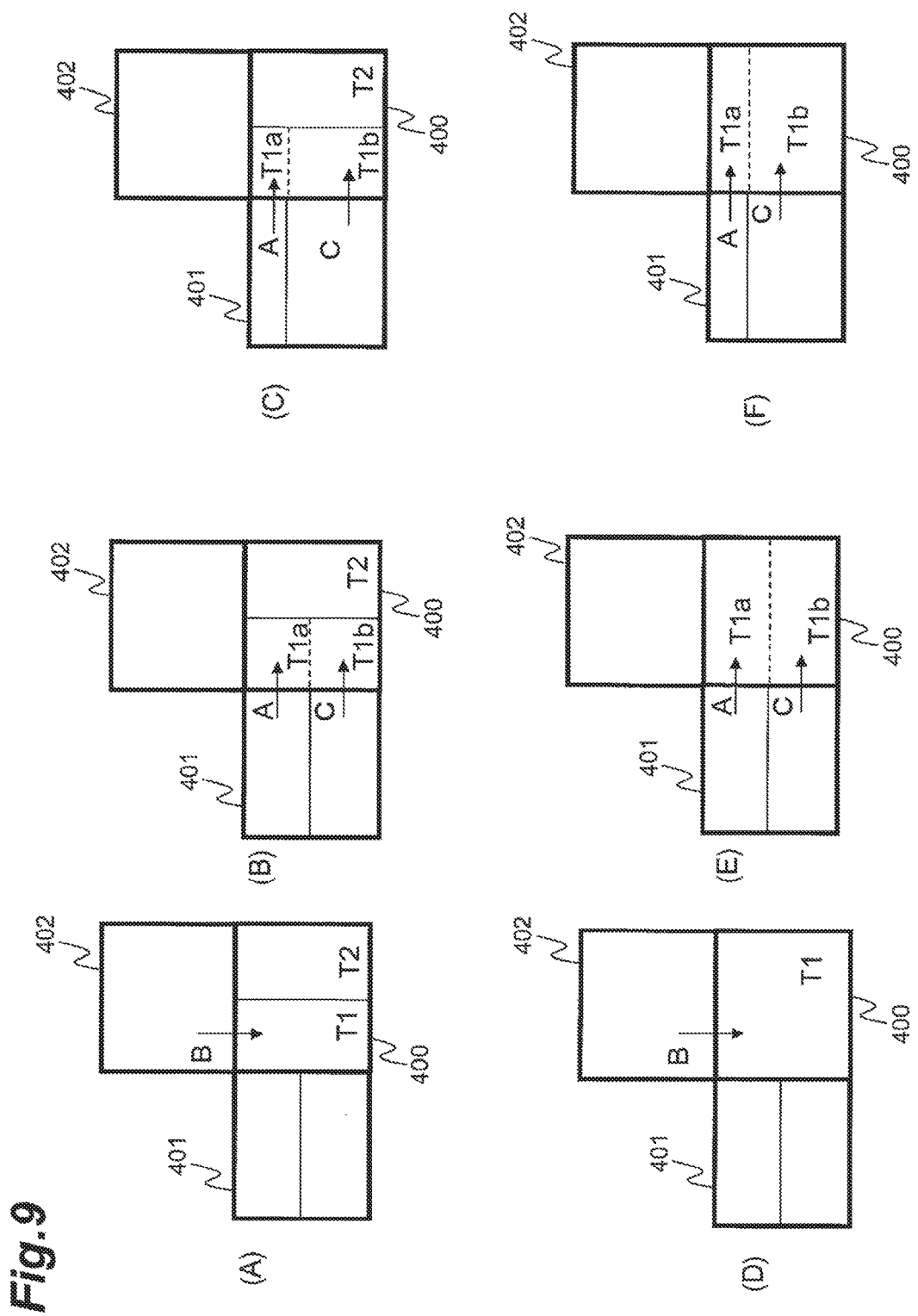
FIG. 9 is a first schematic drawing of an example for explaining processes using motion information of a plurality of neighboring blocks neighboring a target prediction block, as motion information of the target prediction block.

The example of FIG. 3 concerned the case where there were two neighboring blocks in contact with a prediction block, but there are situations in which a prediction block is in contact with two or more neighboring blocks, depending upon combinations of the prediction block partitioning types of an encoded block and neighboring blocks thereto. FIG. 9 shows an example where three neighboring blocks are in contact with a prediction block. The block 301 in FIG. 20 will be described as an example herein, but the same description also applies to the blocks 302, 304, 305, 306, and 307.

In (A) and (B) of FIG. 9, a target encoded block 400 has two prediction blocks resulting from vertical bisection of the block 400, whereas a block 401 in contact with the left side of the prediction block T1 is horizontally bisected (or partitioned into two upper and lower blocks). For this reason, the prediction block T1 is in contact with three neighboring blocks A, B, and C. In this case, when it is preliminarily determined on the encoding side and on the decoding side that neighboring blocks are represented by two neighboring blocks A and B in contact with the upper left corner of the target prediction block, the number of neighboring blocks is always limited to 2 and therefore the technique described above is applicable.

On the other hand, it is also possible to employ a technique of virtually horizontally bisecting the prediction block T1 according to the prediction block partitioning type of the neighboring block 401, as shown in (B) of FIG. 9. In this case, the target prediction block T1 is partitioned into blocks T1a and T1b and the predicted signal of block T1a and the predicted signal of T1b are generated using two pieces of motion information belonging to the neighboring blocks A and C, respectively.

On this occasion, the merging block selection information can be efficiently encoded without change in the configuration of the block merging information, by such a rule that selected candidates for merging block selection information are two pieces of the motion information of the neighboring block B in (A) of FIG. 9 and the combination of pieces of motion information of the neighboring blocks A and C in (B) of FIG. 9.

On the other hand, in the case where either of (A) of FIG. 9 and (B) of FIG. 9 is identified by the merging block selection information and where (B) of FIG. 9 is selected, it is also possible to adopt a method of further transmitting second merging identification information for each virtual block and identifying generation of the predicted signal of the virtual block based on the motion information of the neighboring block, or encoding/decoding of the motion information.

It is also possible to adopt a method without partition of the prediction block T1 in which selected candidates for the merging block selection information in the prediction block T1 are three pieces of motion information of neighboring blocks A, B, and C and in which the motion information to be used in generation of the predicted signal of T1 is selected from the three pieces of information, but changes below are needed in this case.

1. A flow of "acquiring the prediction block partitioning type of the neighboring block and deriving the number of blocks neighboring the prediction block" is added prior to step S164 in FIG. 4 and step S266 in FIG. 7.
2. Step S164 in FIG. 4 and step S266 in FIG. 7 are changed to "Are there two or more pieces of motion information of selected candidates?"
3. The merging block selection information is extended to information to select one out of three or more candidates.

Figure 11:
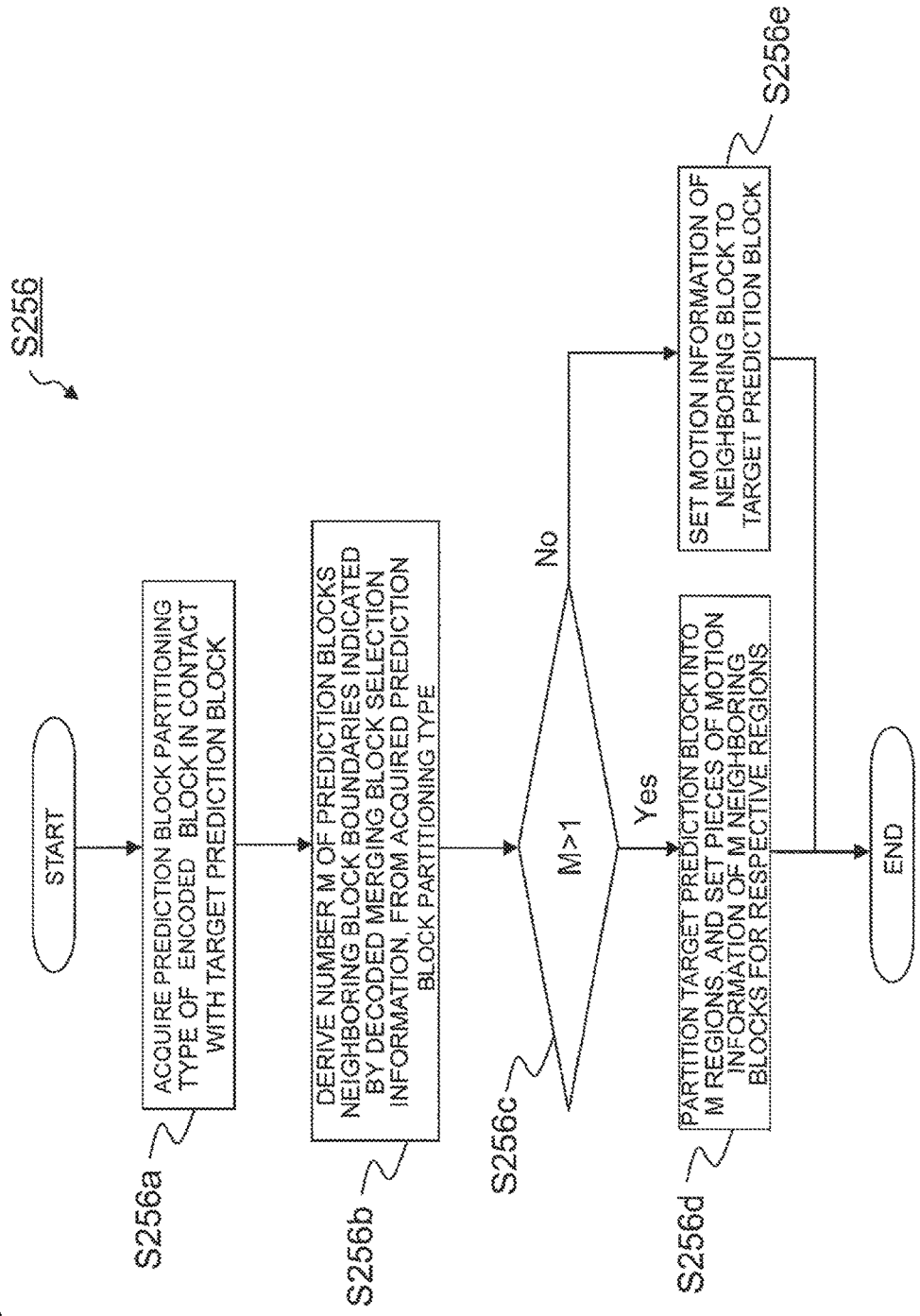
FIG. 11 is a flowchart to illustrate an example of a process using motion information of a plurality of neighboring blocks neighboring a target prediction block, as motion information of the target prediction block.

This processing of block merging shown in (A) and (B) of FIG. 9 can be implemented by extending step S256 in FIG. 7 to the processing shown in FIG. 11. First in step S256a, the prediction block partitioning type of an encoded block in contact with the target prediction block is acquired. In next step S256b, the number M of prediction blocks neighboring block boundaries indicated by the decoded merging block selection information is derived from the acquired prediction block partitioning type. For example, in the case of (B) of FIG. 9, M=2. Furthermore, in step S256c, it is determined whether the value of M is larger than 1 (M>1). In the case of M>1, at step S256d, the target prediction block is partitioned into M virtual blocks, and pieces of motion information of M neighboring blocks are set to the M partitioned virtual blocks (it can also be contemplated that merging identification information is additionally sent for each virtual block and it is determined whether the motion information is to be decoded). In the case of M=1, at step S256e, the motion information of a neighboring block serving as a candidate for block merging is set to the motion information of the target prediction block.

According to FIGS. 7 and 11 as described above, the selection of candidate for motion information in the example of FIG. 9 is carried out based on the pieces of information below.
1) The number of already-encoded/already-decoded prediction blocks in the target encoded block
2) The prediction block partitioning type of the target encoded block
3) The prediction block partitioning type of the block neighboring the target prediction block
In this manner, the information of 3), which is not used in the selection of candidate for motion information in the example of FIG. 3, is used in the cases where there are three or more candidates for motion information.

(C) of FIG. 9 shows an example in which the block neighboring the left side of the prediction block 400 is asymmetrically bisected. In this case, it is also possible to adopt the technique of virtually horizontally bisecting the prediction block T1 according to the prediction block partitioning type of the neighboring block 401 (into blocks T1a and T1b). Namely, the predicted signal of the target prediction block T1 can be generated using a combination of pieces of motion information of neighboring blocks A and C in (C) of FIG. 9 as candidates for motion information for block merging of the prediction block T1.

In cases where the prediction block partitioning type of the encoding block is a type in which the number of prediction block is 1 like the block 300 in FIG. 20, as shown in (D) to (F) of FIG. 9, it is also possible to apply the technique of virtually horizontally partitioning the prediction block T1 (block 400) according to the prediction block partitioning type of neighboring block 401 (partition into a plurality of blocks arranged in the vertical direction), and generating the predicted signal for each block. Furthermore, in cases where the neighboring block 402 is vertically partitioned (into a plurality of blocks arranged in the horizontal direction), which are not shown, it is possible to apply a technique of virtually vertically partitioning the prediction block T1 (block 400) according to the prediction block partitioning type of the neighboring block 402 and generating the predicted signal for each block.

Figure 10:
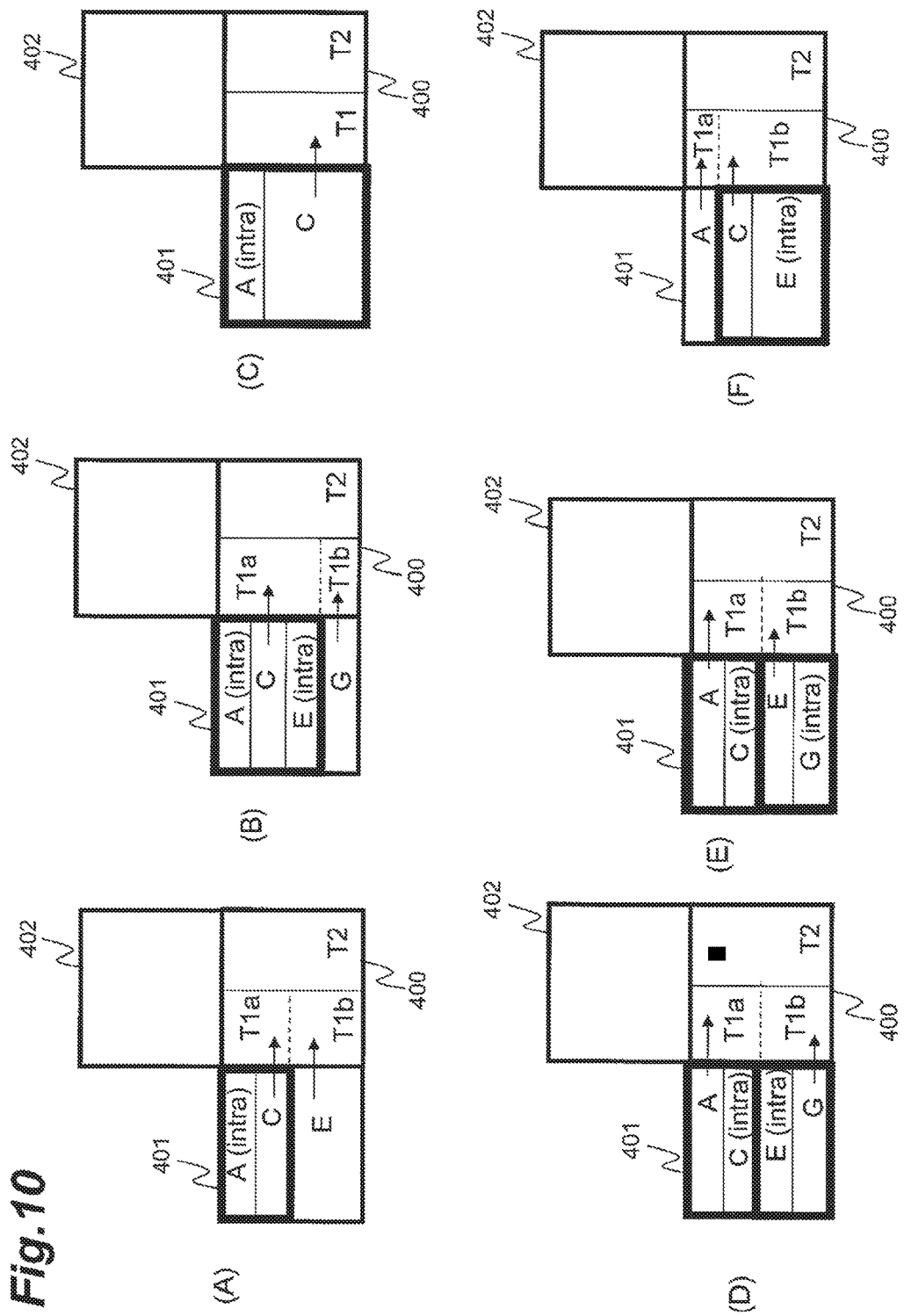
FIG. 10 is a second schematic drawing of an example for explaining processes using motion information of a plurality of neighboring blocks neighboring a target prediction block, as motion information of the target prediction block.

In cases where a block neighboring the prediction block includes an intra-picture predicted block (intra), it is also possible to apply the technique of virtually partitioning the prediction block and generating the predicted signal, by preliminarily determining rules. (A) to (F) of FIG. 10 show examples in which an intra-picture predicted block (intra) is included in a plurality of neighboring blocks A, C, E, and G in contact with the left side of the prediction block. Based on the prediction block partitioning type of the neighboring block and the prediction mode (inter-picture/intra-picture prediction) in the prediction information, the intra-picture predicted block in the neighboring block is virtually integrated with an inter-picture predicted block with motion information (thick lines in the drawing). In these examples, an intra-picture predicted block is virtually integrated with an inter-picture predicted block which is closer to the upper left corner of the neighboring block and which is closest to the intra-picture block. As a consequence, the prediction block T1 is virtually partitioned according to the number of inter-picture predicted blocks in the neighboring block, as shown in (A) to (F) of FIG. 10. In this manner, even in the cases where the neighboring block includes an intra-picture predicted block (intra), the generation of the predicted signal by block merging can be carried out using the motion information of the inter-picture predicted block in the neighboring block.

There are no restrictions on the rules of integrating the intra-picture predicted block with the inter-picture predicted block in the neighboring block. It can be contemplated that a plurality of rules as described above are prepared and a rule is selected for each frame or for each slice to implement encoding.

In this case, the selection of a candidate for motion information is carried out based on pieces of information below.
1) The number of already-encoded/already-decoded prediction blocks in the target encoding/encoded block
2) The prediction block partitioning type of the target encoding/encoded block
3) The prediction block partitioning type of the block neighboring the target prediction block
5) The prediction mode (intra-picture prediction/inter-picture prediction) of the block neighboring the target prediction block FIG. 12 shows examples in which the encoding block 400 and neighboring block 402 are similarly vertically bisected but their partitioned shapes are different. In these examples, the prediction block T1 (block including blocks T1a and T1b) in (A) of FIG. 12 and the prediction block T2 (block including blocks T2a and T2b) in (B) of FIG. 12 also have three neighboring blocks. For T1 in (A) of FIG. 12, the processing flow of FIG. 11 is applied to step S256 in FIG. 7, whereby it becomes feasible to execute the block merging by setting pieces of motion information of blocks Ba and Bb to respective blocks T1a and T1b resulting from virtual vertical bisection of the prediction block T1. For T2 in (B) of FIG. 12, a processing flow of FIG. 13 described below is applied to step S261 in FIG. 7, whereby it becomes feasible to execute the block merging by setting pieces of motion information of blocks Ba and Bb to respective blocks T2a and T2b resulting from virtual vertical bisection of the prediction block T2. On this occasion, it is also possible to adopt the method of transmitting second merging identification information for each virtual block and identifying either generation of the predicted signal of the virtual block based on the motion information of the neighboring block or encoding/decoding of motion information.

It is also possible to adopt a method in which the prediction block T2 is not partitioned, two pieces of motion information of block Ba and block Bb are defined as candidates for motion information to be used in block merging of the prediction block T2, and one of the pieces of motion information of block Ba and block Bb is selected as motion information to be used in generation of the predicted signal of T2, but in that case, it is necessary to extend the flow of FIG. 7 as described below.
1. A flow of "acquiring the prediction block partitioning type of the neighboring block and deriving the number of blocks neighboring the prediction block" is added after step S158 in FIG. 4 and after step S259 in FIG. 7.
2. Step S159 in FIG. 4 and step S260 in FIG. 7 are changed to "Are there two or more pieces of motion information of selected candidates?"
3. A step of performing encoding/decoding of block selection information is added after step S159 in FIG. 4 and after step S260 in FIG. 7.

Figure 13:
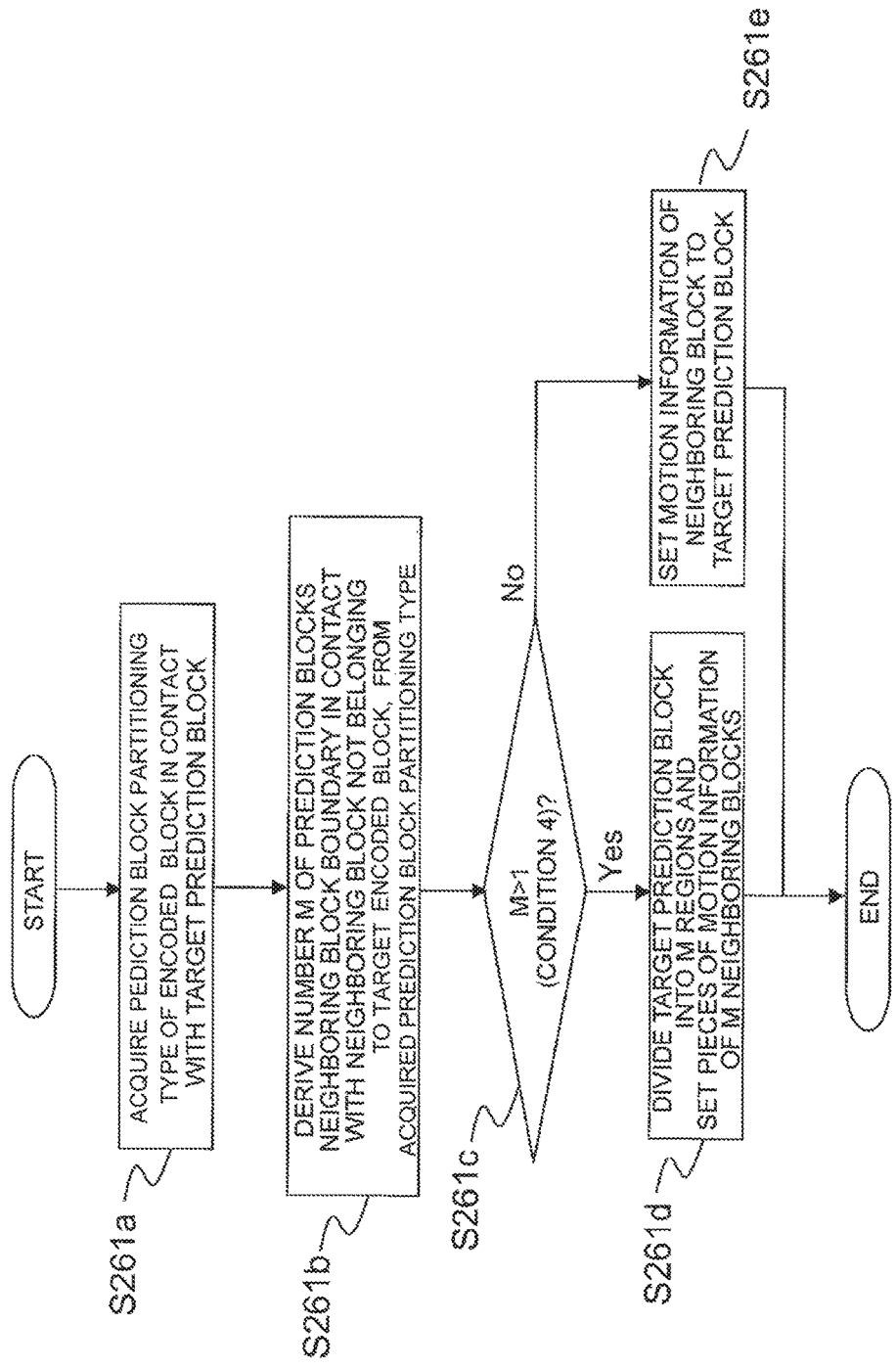
FIG. 13 is a second example of a flowchart to illustrate a process using motion information of a plurality of neighboring blocks neighboring a target prediction block, as motion information of the target prediction block.

The flow of FIG. 13 will be described below. In FIG. 13, first in step S261a, the prediction block partitioning type of the encoded block in contact with the target prediction block is acquired. In next step S261b, the number M of prediction blocks neighboring block boundaries in contact with the neighboring block not belonging to the target encoded block is derived from the acquired prediction block partitioning type. For example, in the case shown in (B) of FIG. 12, M=2.

Furthermore, it is determined in step S261c whether the value of M is larger than 1 (M>1). In the case of M>1, the target prediction block is partitioned into M virtual blocks and pieces of motion information of M neighboring blocks are set to the M partitioned virtual blocks (it is also possible to additionally send the merging identification information for each virtual block and determine whether the motion information is to be decoded). In the case of M=1, the motion information of the neighboring block as a candidate for block merging is set as the motion information of the target prediction block.

According to FIGS. 12 and 13 as described above, the selection of a candidate for motion information in the example of FIG. 11 is carried out based on the pieces of information below.
1) The number of already-encoded/already-decoded prediction blocks in the target encoding/encoded block
2) The prediction block partitioning type of the target encoding/encoded block
3) The prediction block partitioning type of the block neighboring the target prediction block It should be noted that although FIG. 11 described the example of vertical partitioning, the same processing is also applicable to examples of horizontal partitioning (division into a plurality of blocks arranged in the vertical direction) like blocks 306 and 307 in FIG. 20.

It is possible to adopt further modifications described below.

(Candidates for Motion Information)

Figure 14:
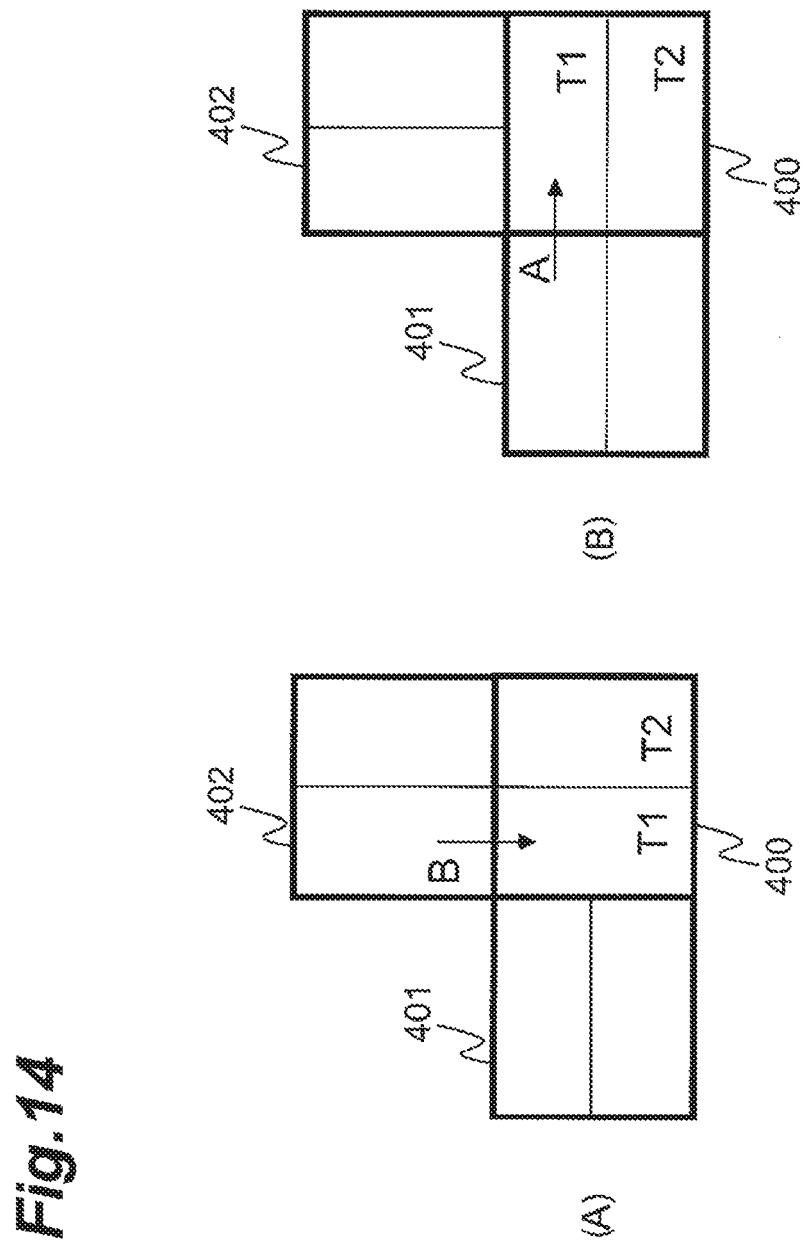
FIG. 14 is a second example of a schematic diagram for explaining candidates for motion information in block merging according to an embodiment.
Figure 15:
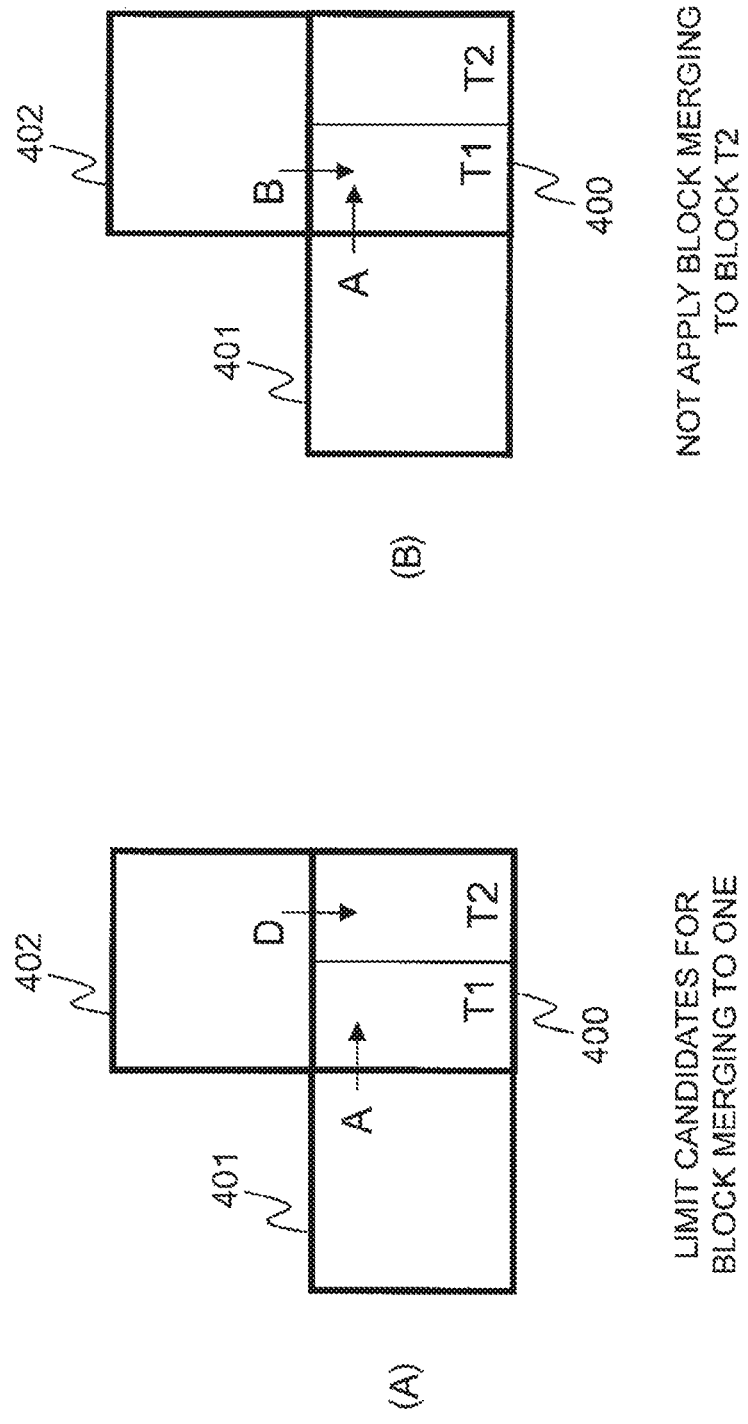
FIG. 15 is a third example of a schematic diagram for explaining candidates for motion information in block merging according to an embodiment.

In the above description the pieces of motion information of blocks in contact with the upper side and the left side of the prediction block were defined as candidates for block merging, but it is also possible to set a limitation based on the prediction block partitioning types of the target encoding/encoded block and neighboring blocks, as shown in (A) and (B) of FIG. 14 and (A) of FIG. 15. (A) and (B) of FIG. 14 show examples where there are two neighboring blocks and where the motion information of neighboring blocks on the side in contact with two or more neighboring blocks out of the upper side and the left side of the prediction block is excluded from candidates for block merging. In this case, there is no need for encoding of the merging block selection information, which can reduce additional information. The candidates for motion information to be used in block merging of the prediction block T1 in (A) of FIG. 14 and the prediction block T1 in (B) of FIG. 14 are determined to be pieces of motion information of block B and block A, respectively.

(A) of FIG. 15 shows a technique of automatically selecting candidates for motion information to be used in block merging of prediction blocks T1 and T2, based on the prediction block partitioning type of the target encoding/encoded block.

(B) of FIG. 15 shows an example in which the prediction block to which the block merging is applied is limited according to the prediction block partitioning type of the target encoding block and the number of already-encoded/already-decoded blocks in the target encoding block. In the example shown in FIG. 3, when the motion information of block T1 is coincident with that of the block D, the motion information of block D is excluded from candidates for motion information to be used block merging of block T2; whereas, in the case shown in (A) of FIG. 15, without comparison between the motion information of block T1 and the motion information of block D, the block D is excluded from candidates for block merging, based on the number of already-encoded/decoded prediction blocks in the target encoding/encoded block. In this manner, the prediction block to which block merging is applied may be limited by the number of motion vectors to be encoded in the target encoding block.

Furthermore, it is also possible to place a limitation, according to block sizes of two neighboring blocks in contact with the upper left corner of the prediction block and the block size of the prediction block. For example, when the size of the right side of the neighboring block in contact with the left side of the target prediction block is smaller than a preset size (e.g., a half or a quarter of the length of the left side of the prediction block), the motion information of the neighboring block may be excluded from candidates for block merging of the target prediction block.

When the limitation is set on candidates for motion information as described above, the code amount of block merging information can be reduced.

(Selection of Candidate for Motion Information)

The selection of candidate for motion information is carried out based on the pieces of information below, but a method of using the information is not limited to the methods described above. The means to select the candidates for motion information using these pieces of information can be implemented by the configurations of FIG. 1 and FIG. 6.

1) The number of already-encoded/already-decoded prediction blocks in the target encoding/encoded block
2) The prediction block partitioning type of the target encoding/encoded block
3) The prediction block partitioning type of the block neighboring the target prediction block
4) The motion information of already-encoded/already-decoded prediction blocks in the target encoding/encoded block
5) The motion information and prediction mode (intra-picture prediction/inter-picture prediction) of the block neighboring the target prediction block (Encoding of Prediction Block)

In the above-described description the encoding/decoding of the prediction blocks in the encoding block is carried out in a raster scan order, but the above-described selection of candidate for motion information to be used in the block merging is also applicable to cases where the prediction blocks are encoded/decoded in any order. For example, in the example of FIG. 3, where the prediction block T2 of the target encoding/encoded block 400 is first encoded/decoded, the motion vector of the prediction block T2 is not included as a candidate for motion information to be used in block merging of the prediction block T1.

(Shape of Block)

In the above-described description the partial regions in the encoding block were always rectangular, but they may be any shape. In this case, shape information may be included in the prediction information of the encoding block.

(Transformer and Inverse Transformer)

The transformation process of the residual signal may be carried out in a fixed block size, or the transformation process may be carried out after a target region is sub-partitioned according to partial regions.

(Prediction Information)

In the above-described description the generation method of the predicted signal was described as inter-picture prediction (prediction using the motion vector and reference frame information), but the generation method of the predicted signal is not limited to this. The aforementioned predicted signal generation process is also applicable to the intra-picture prediction and the prediction method including luminance compensation or the like. In this case, the prediction information contains mode information, luminance compensation parameters, and so on.

In FIG. 10 the intra-picture predicted block in the neighboring block is virtually integrated with the inter-picture predicted block, but it is also possible to adopt a method in which the prediction block is virtually partitioned, regardless of the prediction mode of the neighboring block, and partial signals in the prediction block are predicted by intra-picture prediction.

(Color Signal)

The foregoing description contains no particular description of color format, but the predicted signal generation process may also be carried out for color signal or color-difference signal, independently of luminance signal. The predicted signal generation process may also be carried out in synchronism with the process of luminance signal.

(Block Noise Removal Process)

Although the foregoing description states nothing, the reconstructed picture may be subjected to a block noise removal process and in that case, it is preferable to perform the noise removal process for boundary portions of partial regions. In the cases where the prediction block is virtually partitioned in the examples shown in FIGS. 9, 10, and 12, the block noise removal process may also be applied to a boundary between virtually partitioned blocks.

The image predictive encoding method and/or the image predictive decoding method according to the embodiments of the image prediction encoding/decoding system can also be provided as stored in the form of programs in a recording medium. Examples of recording media include recording media such as floppy disks (registered trademark), CD-ROMs, DVDs, or ROMs, or semiconductor memories, or the like.

Figure 16:
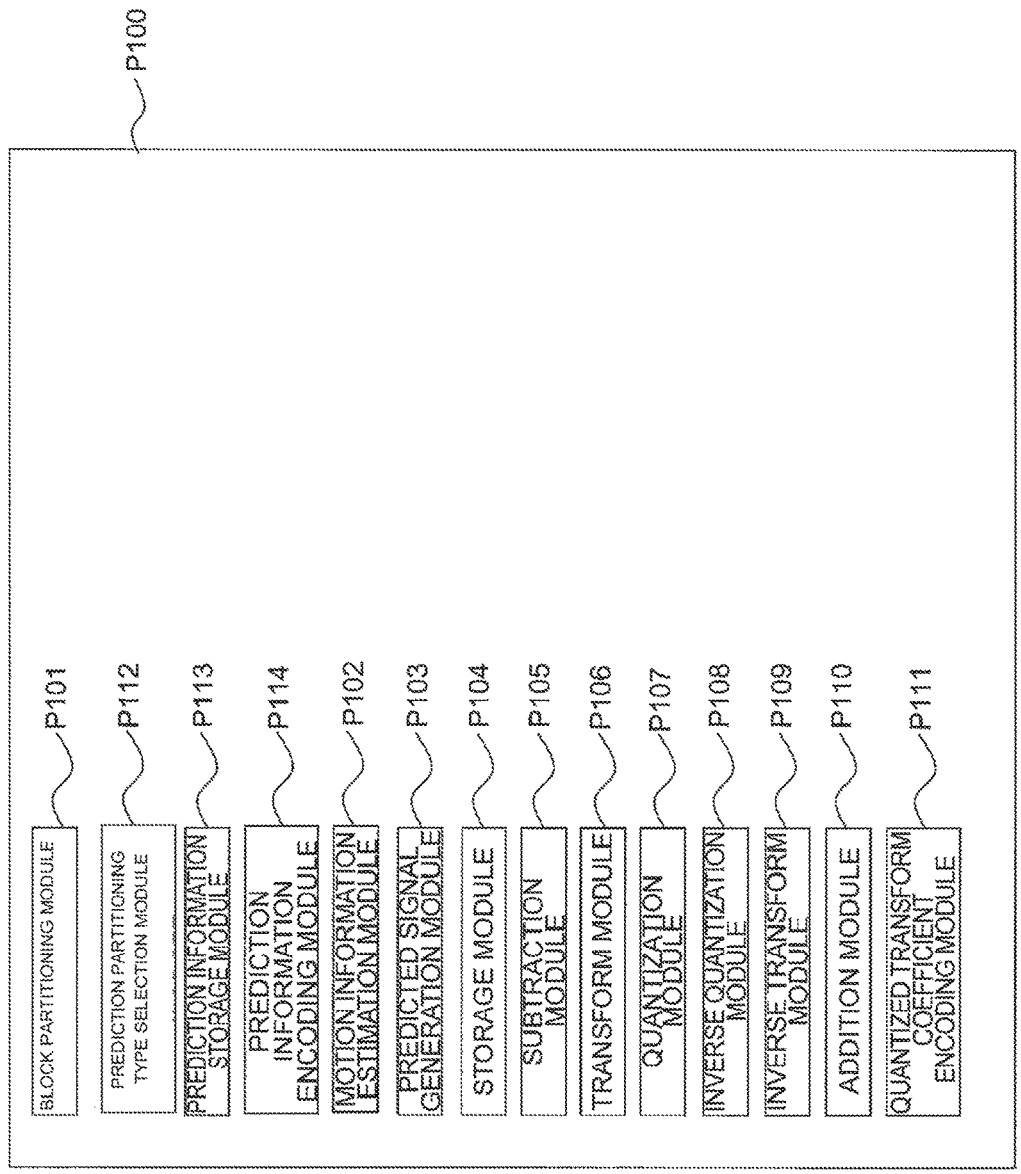
FIG. 16 is a block diagram showing an example of a program capable of executing the image predictive encoding method according to an embodiment.

FIG. 16 is a block diagram showing modules of a program which can execute the image predictive encoding method. The image predictive encoding program P100 is provided with block partitioning module P101, motion information estimation module P102, predicted signal generation module P103, storage module P104, subtraction module P105, transform module P106, quantization module P107, inverse quantization module P108, inverse transform module P109, addition module P110, quantized transform coefficient encoding module P111, prediction partitioning type selection module P112, prediction information storage module P113, and prediction information encoding module P114. The functions implemented upon execution of the respective modules by a computer are the same as the functions of the aforementioned image predictive encoding device 100. Namely, the block partitioning module P101, motion information estimation module P102, predicted signal generation module P103, storage module P104, subtraction module P105, transform module P106, quantization module P107, inverse quantization module P108, inverse transform module P109, addition module P110, quantized transform coefficient encoding module P111, prediction partitioning type selection module P112, prediction information storage module P113, and prediction information encoding module P114 cause the computer to execute the same functions as the block partitioner 102, motion information estimator 114, predicted signal generator 103, frame memory 104, subtracter 105, transformer 106, quantizer 107, inverse quantizer 108, inverse transformer 109, adder 110, quantized transform coefficient encoder 111, prediction block partitioning type selector 113, prediction information memory 115, and prediction information encoder 116, respectively.

Figure 17:
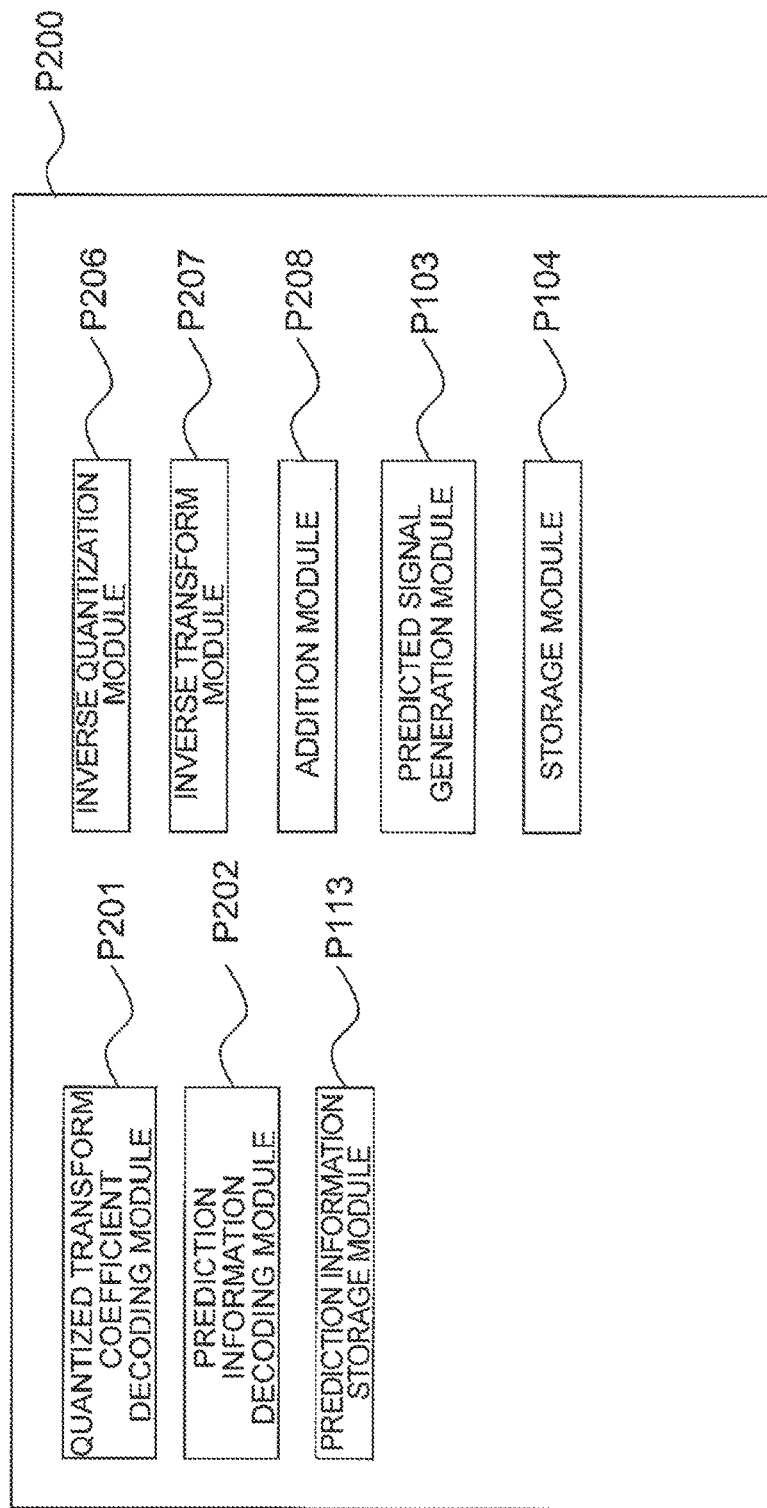
FIG. 17 is a block diagram showing an example of a program capable of executing the image predictive decoding method according to an embodiment.

FIG. 17 is a block diagram showing modules of a program which can execute the image predictive decoding method. The image predictive decoding program P200 is provided with quantized transform coefficient decoding module P201, prediction information decoding module P202, prediction information storage module P113, inverse quantization module P206, inverse transform module P207, addition module P208, predicted signal generation module P103, and storage module P104.

The functions implemented upon execution of the respective modules are the same as those of the respective components of the aforementioned image predictive decoding device 200. Namely, the quantized transform coefficient decoding module P201, prediction information decoding module P202, prediction information storage module P113, inverse quantization module P206, inverse transform module P207, addition module P208, predicted signal generation module P103, and storage module P104 cause the computer to execute the same functions as the quantized transform coefficient decoder 207, prediction information decoder 208, prediction information memory 115, inverse quantizer 203, inverse transformer 204, adder 205, predicted signal generator 103, and frame memory 104, respectively.

The image predictive encoding program P100 or the image predictive decoding program P200 configured as described above can be stored in a recording medium SM and executed by the computer described below. Alternatively or in addition, at least a portion of the previously described image predictive encoding program P100 or the image predictive decoding program P200 may be stored in a working memory, and/or a memory, which are also non-transitory computer readable storage mediums.

Figure 18:
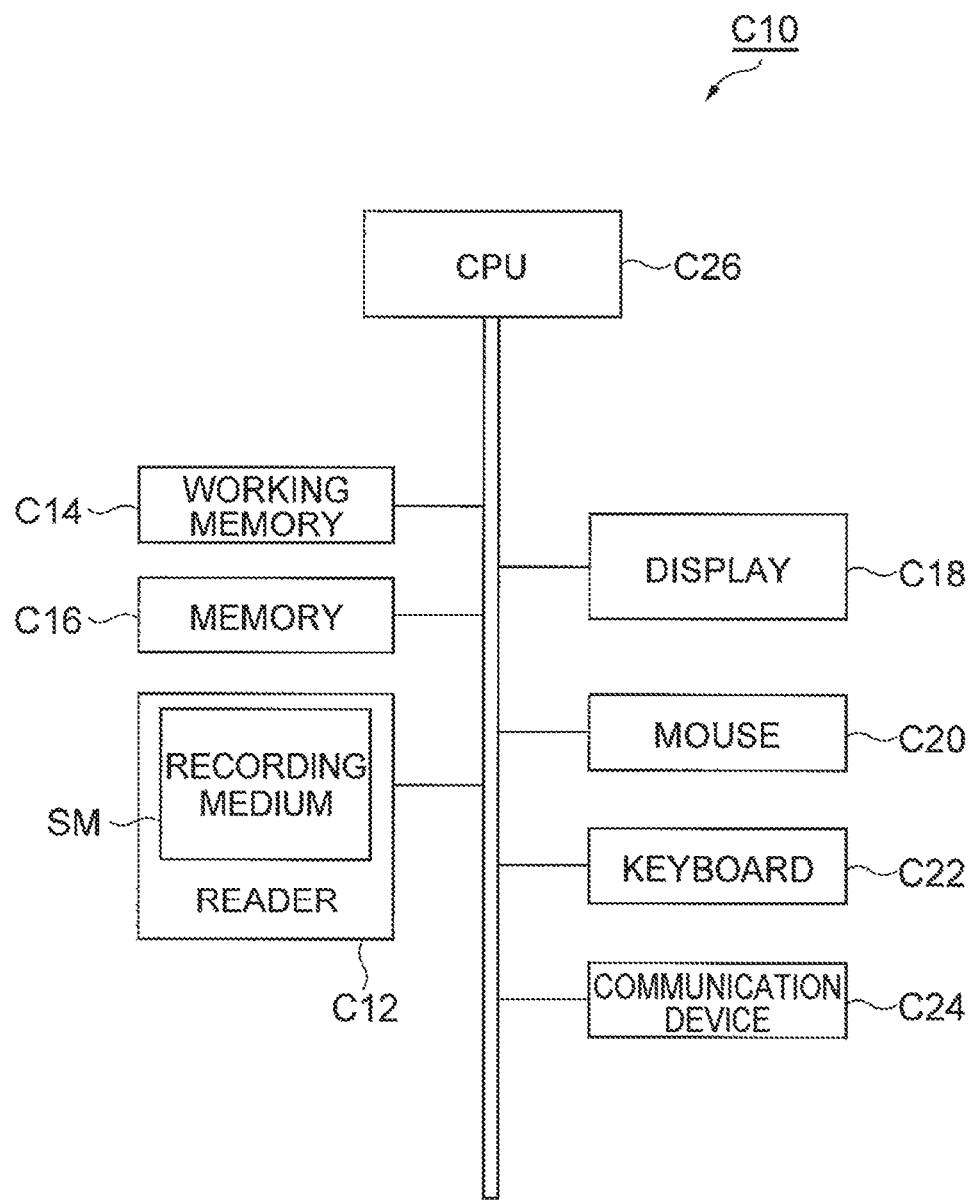
FIG. 18 is a drawing showing an example of a hardware configuration of a computer for executing a program recorded in a recording medium.
Figure 19:
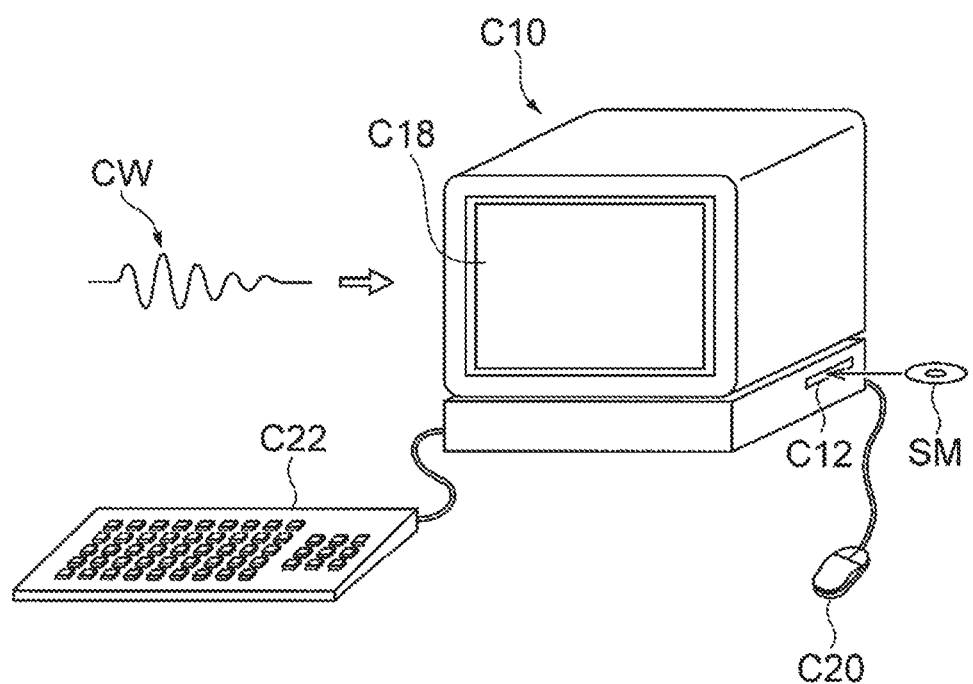
FIG. 19 is a perspective view of an example of a computer for executing a program stored in a recording medium.

FIG. 18 is a drawing showing an example hardware configuration of a computer for executing the programs recorded in the recording medium and/or a computer readable storage medium. FIG. 19 is a perspective view of an example computer for executing the programs stored in the recording medium. Equipment to execute the programs stored in the recording medium is not limited to computers, but may be any device, or combination of devices, such as a DVD player, a set-top box, a cell phone, or the like provided with a CPU and configured to perform processing and control based on software.

As shown in FIG. 19, the computer C10 is provided with a reading device C12 such as a floppy disk drive unit, a CD-ROM drive unit, or a DVD drive unit, a communication port such as a universal serial bus port (USB), Bluetooth port, an infrared communication port, or any other type of communication port that allows communication with an external device, such as another computer or memory device. The computer 30 may also include a working memory C14, such as a random access memory (RAM), in which an operating system is resident, a memory C16 to store programs, such as at least part of programs stored in the recording medium SM. The working memory C14 and memory C16 may be one or more computer readable storage medium, and can include a solid-state memory such as a memory card or other package that houses one or more non-volatile read-only memories. Further, the computer readable storage medium can be a random access memory or other volatile re-writable memory. Additionally or alternatively, the computer-readable storage medium can include a magneto-optical or optical medium, such as a disk or tapes or any other storage device to capture carrier wave signals such as a signal communicated over a transmission medium. A digital file attachment to an e-mail, stored in a storage device, or other self-contained information archive or set of archives may be considered a distribution medium that is a tangible storage medium. Accordingly, the embodiments are considered to include any one or more of a computer-readable storage medium or a distribution medium and other equivalents and successor media, in which data or instructions may be stored. In addition, the computer C10 may have a user interface that includes a monitor device C18 such as a display, a mouse C20 and a keyboard C22 as input devices, or any other mechanism or device that allows a user to interface with the computer C10. In addition, the computer C10 may include a communication device C24 for transmission and reception of data and others, and a central processing unit (CPU) C26 to control execution of programs. The processor C26 may be one or more one or more general processors, digital signal processors, application specific integrated circuits, field programmable gate arrays, digital circuits, analog circuits, combinations thereof, and/or other now known or later developed devices for analyzing and processing data. In one example, when the recording medium SM is put into the reading device C12, the computer C10 becomes accessible to the image predictive encoding/decoding program at least a portion of which can be stored in the recording medium SM, through the reading device C12, and becomes able to operate as the image encoding device and/or the image decoding device according to the embodiment of the image prediction encoding/decoding system, based on the image encoding or decoding program. In other examples, the recording medium SM provides enablement or initialization of at least a part of the image encoding or decoding program stored in at least one of the working memory 14 and the memory 16.

As shown in the example of FIG. 18, the image predictive encoding program and the image decoding program may be provided in the form of computer data signal CW superimposed on a carrier wave, through a network. In this case, the computer C10 becomes able to execute the image predictive encoding program or the image predictive decoding program after the image predictive encoding program or the image decoding program received by the communication device C24 is stored in the memory C16.

Figure 24:
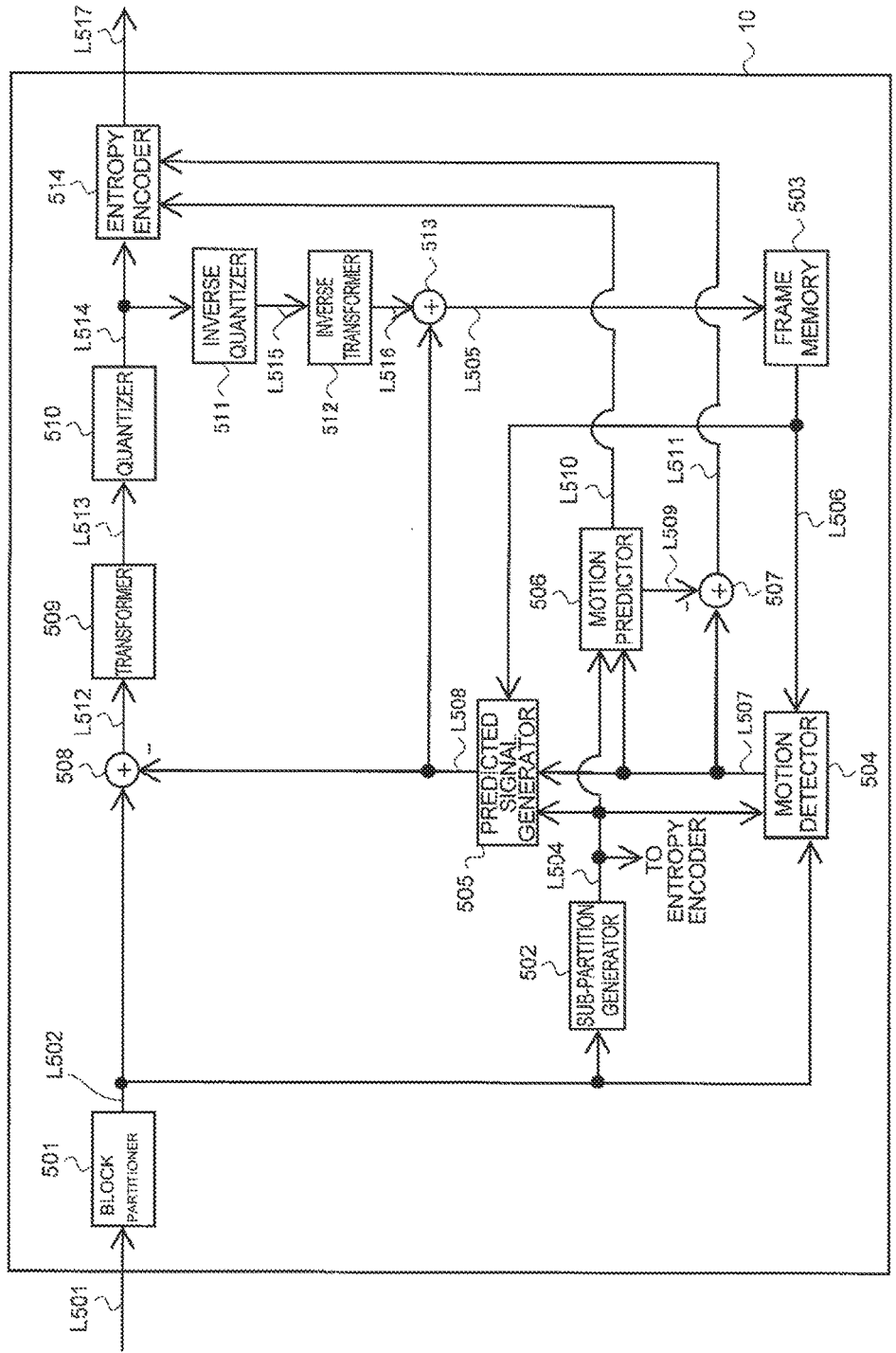
FIG. 24 is a drawing schematically showing a configuration of a video encoding device according to an embodiment.

Still another embodiment will be described below. FIG. 24 is a drawing schematically showing a configuration of a video encoding device according to an embodiment. The video encoding device 10 shown in FIG. 24 is provided with block partitioner 501, sub-partition generator 502, frame memory 503, motion detector 504, predicted signal generator 505, motion predictor 506, subtracter 507, residual signal generator 508, transformer 509, quantizer 510, inverse quantizer 511, inverse transformer 512, adder 513, and entropy encoder 514. An input image signal (video signal) fed into this video encoding device 10 is composed of a time sequence of image signals of frame units (hereinafter referred to as frame image signals).

The block partitioner 501 sequentially selects frame image signals, or input images serving as encoding targets from the input image signal fed via line L501. The block partitioner 501 partitions an input image into a plurality of partitions, or blocks. The block partitioner 501 sequentially selects the plurality of blocks as encoding target blocks and outputs a pixel signal of each of the target blocks (hereinafter referred to as a target block signal) via line L502.

In the video encoding device 10, encoding processing described below is carried out in block units. The block partitioner 501 may partition, for example, an input image into a plurality of blocks each having 8×8 pixels. However, the blocks may be any size and shape. The blocks may be, for example, blocks each having 32×16 pixels or blocks each consisting of 16×64 pixels.

Figure 25:
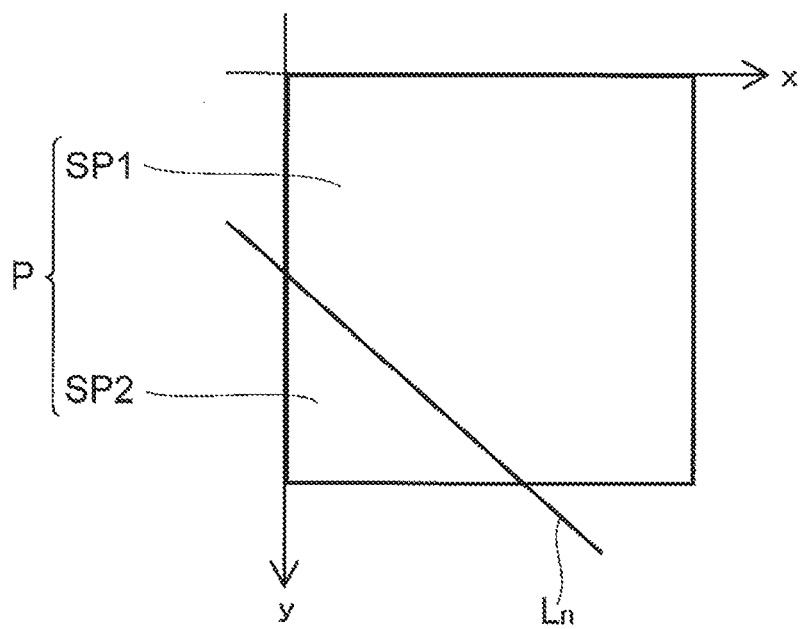
FIG. 25 is a drawing for explaining an example of generation of sub-partitions.

The sub-partition generator 502 partitions a target block fed via line L502, into a plurality of sub-partitions. FIG. 25 is a drawing for explaining the generation of sub-partitions. As shown in FIG. 25, the sub-partition generator 502 partitions the target block P into two sub-partitions SP1 and SP2 by a straight line Ln expressed by the linear expression of formula (1).

$$y=mx+k \quad (1)$$

For example, the sub-partition generator 502 can be configured as follows: with changes of the parameters m and k, it obtains a predicted signal of the sub-partition SP1 and a predicted signal of the sub-partition SP2, and determines m and k that minimize an error between the predicted signal of the sub-partition SP1 and an image signal of the sub-partition SP1 and an error between the predicted signal of the sub-partition SP2 and an image signal of the sub-partition SP2, as parameters of the straight line Ln.

The sub-partition generator 502 outputs the parameters m and k in formula (1) thus determined, as shape information to specify the shapes of the sub-partitions in the target block P, i.e., as shape information to specify the shapes of the first sub-partition SP1 and the second sub-partition SP2, via line L504.

The linear expression expressing the straight line Ln may be any one. For example, the straight line Ln may be one expressed by formula (2).

$$y=-x/\tan\theta+\rho/\sin\theta \quad (2)$$

In this case, the shape information is $\theta$ and $\rho$.

The shape information may be information indicative of two arbitrary points that the straight line Ln passes, e.g., intersections between the straight line and boundaries of the block P. The block does not always have to be partitioned by a straight line, but the sub-partitions may be generated based on a pattern selected from a plurality of patterns prepared in advance. In this case, information such as an index to specify the selected pattern can be used as shape information.

In the description below, coordinates are set with an origin at the uppermost and leftmost position of the target block, a sub-partition including the uppermost and leftmost pixel in the target block P is defined as a first sub-partition, and the other as a second sub-partition. It is, however, noted that any defining method is applicable herein: for example, a sub-partition that does not include the position of the center in the target block can be defined as a first sub-partition, and the other as a second sub-partition. In this case, the shape information may be intersection information of block boundaries or pattern identification information.

The frame memory 503 stores signals of previously-reconstructed images fed via line L505, i.e., frame image signals having been encoded in the past (which will be referred to hereinafter as reference frame image signals). The frame memory 503 outputs the reference frame images signal via line L506.

The motion detector 504 receives the target block signal fed through line L502, the shape information of the block fed through line L504, and the reference frame image signals fed through line L506. The motion detector 504 searches image signals in a predetermined range of the reference frame image signals, for a signal similar to an image signal of a sub-partition serving as a processing target, and calculates a motion vector. This motion vector is a spatial displacement amount between a region in a reference frame image signal having a pixel signal similar to the image signal of the sub-partition serving as a processing target, and the target block. The motion detector 504 outputs the motion vector thus calculated, via line L507.

The motion detector 504 may be configured, at the same time, to also detect a motion vector for a target block and to determine whether a predicted signal is to be generated for each of two sub-partitions resulting from partitioning of the target block. This determination may be such determination that if an error between the predicted signal of the target block and the image signal of the target block is smaller than errors between the predicted signals of two sub-partitions generated by partition of the target block, and the image signals of the two sub-partitions, the target block is not partitioned into the sub-partitions. When this determination is made, information indicative of the result of the determination is encoded as partition applicability information and the shape information may be encoded only if the partition applicability information indicates that a target block is to be partitioned into sub-partitions.

The predicted signal generator 505 generates the predicted signal of the image signal of the sub-partition serving as a processing target, based on the motion vector fed via line L507 and the block shape information fed via line L504, from the image signal in the predetermined range of the reference frame image signal fed via line L506.

The predicted signal generator 505 combines the predicted signals of the respective sub-partitions in the target block to generate the predicted signal of the target block. The predicted signal generator 505 outputs the predicted signal thus generated, via line L508. The predicted signal may be generated by intra-picture prediction, instead of the inter-picture prediction.

The motion predictor 506 generates a motion vector predictor of a processing target sub-partition in a target block, based on the block shape information fed via line L504, the motion vector fed via line L507, and a motion vector of a block prior in order to the processing target sub-partition or a motion vector of an already-processed partial region that is a sub-partition. The motion predictor 506 outputs the motion vector predictor thus generated, via line L509.

The motion predictor 506 may select one motion vector predictor out of a plurality of candidates for motion vector predictor. In this case, the motion predictor 506 also outputs indication information to specify the selected motion vector predictor, via line L510. If the candidates for motion vector predictor of the processing target sub-partition are narrowed down to one according to a predetermined rule shared with the decoder side, the output of the indication information may be omitted.

The subtracter 507 subtracts the motion vector predictor fed via line L509, from the motion vector of the processing target sub-partition fed via line L507, to generate a differential motion vector. The subtracter 507 outputs the differential motion vector thus generated, via line L511.

The residual signal generator 508 subtracts the predicted signal of the target block fed via line L508, from the target block signal fed via line L502, to generate a residual signal. The residual signal generator 508 outputs the residual signal thus generated, via line L512.

The transformer 509 performs orthogonal transformation of the residual signal fed via line L512, to generate transform coefficients. The transformer 509 outputs the transform coefficients thus generated, via line L513. This orthogonal transformation may be performed, for example, by DCT. However, the transformation used by the transformer 509 may be any transformation.

The quantizer 510 quantizes the transform coefficients fed via line L513, to generate quantized transform coefficients. The quantizer 510 outputs the quantized transform coefficients thus generated, via line L514.

The inverse quantizer 511 performs inverse quantization of the quantized transform coefficients fed via line L514, to generate inversely-quantized transform coefficients. The inverse quantizer 511 outputs the inversely-quantized transform coefficients thus generated, via line L515.

The inverse transformer 512 performs inverse orthogonal transformation of the inversely-quantized transform coefficients fed via line L515, to generate a reconstructed residual signal. The inverse transformer 512 outputs the reconstructed residual signal thus generated, via line L516. The inverse transformation used by the inverse transformer 512 is a process symmetric with the transformation of the transformer 509.

The transformation is not always essential, and the video encoding device does not always have to be provided with the transformer 509 and the inverse transformer 512. Likewise, the quantization is not always essential, and the video encoding device does not always have to be provided with the quantizer 510 and the inverse quantizer 511.

The adder 513 adds the reconstructed residual signal input via line L516, to the predicted signal of the target block fed via line L508, to generate a reconstructed image signal. The adder 513 outputs the reconstructed image signal as a previously-reconstructed image signal via line L505.

The entropy encoder 514 encodes the quantized transform coefficients fed via line L514, the shape information of the target block fed via line L504, the indication information of the motion vector predictor fed via line L510, and the differential motion vector fed via line L511. The entropy encoder 514 multiplexes codes generated by encoding, to generate a compressed stream, and then outputs the compressed stream through line L517.

The entropy encoder 514 may use any encoding method such as the arithmetic coding or the run-length coding. The entropy encoder 514 may adaptively determine an occurrence probability in arithmetic coding of the indication information of the motion vector predictor fed via line L510, based on the shape information of the target block fed via line L504. For example, the entropy encoder 514 may set a high value as an occurrence probability of the indication information to indicate a motion vector of a partial region in contact with a processing target sub-partition.

Figure 26:
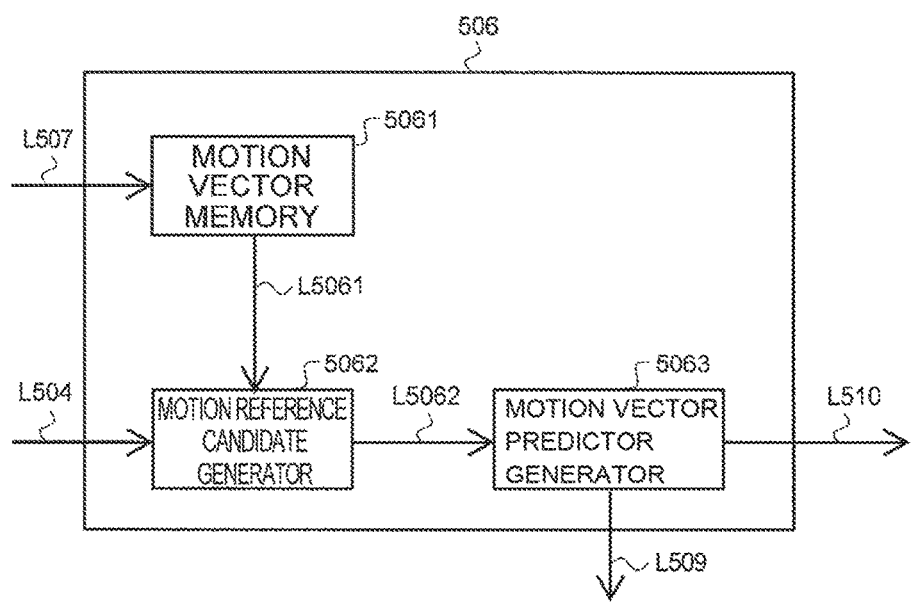
FIG. 26 is a drawing showing an example of a configuration of a motion predictor in an embodiment.

FIG. 26 is a drawing showing a configuration of the motion predictor according to an embodiment. As shown in FIG. 26, the motion predictor 506 has a motion vector memory 5061, a motion reference candidate generator 5062, and a motion vector predictor generator 5063.

The motion vector memory 5061 stores motion vectors of previously-processed partial regions and outputs the previously-encoded motion vectors via line L5061, for derivation of a motion vector predictor of a processing target sub-partition.

The motion reference candidate generator 5062 generates candidates for the motion vector predictor from the motion vectors of the partial regions fed via line L5061, by a below-described method, based on the shape information fed via line L504. The motion reference candidate generator 5062 outputs the candidates for motion vector predictor thus generated, via line L5062.

The motion vector predictor generator 5063 selects a candidate that minimizes the difference from the motion vector of the processing target sub-partition, from the candidates for motion vector predictor fed via line L5062. The motion vector predictor generator 5063 outputs the selected candidate as a motion vector predictor via line L509. It also outputs the indication information to specify the selected candidate, via line L510.

If the number of candidates generated in the motion reference candidate generator is limited to one, the output of the indication information can be omitted. There are no restrictions on a method to limit the number of candidates to one, but any method can be applied, for example, such as a method of using an intermediate value of three candidates, a method of using an average of two candidates, and a method of defining a priority order for selection of one out of a plurality of candidates.

Figure 27:
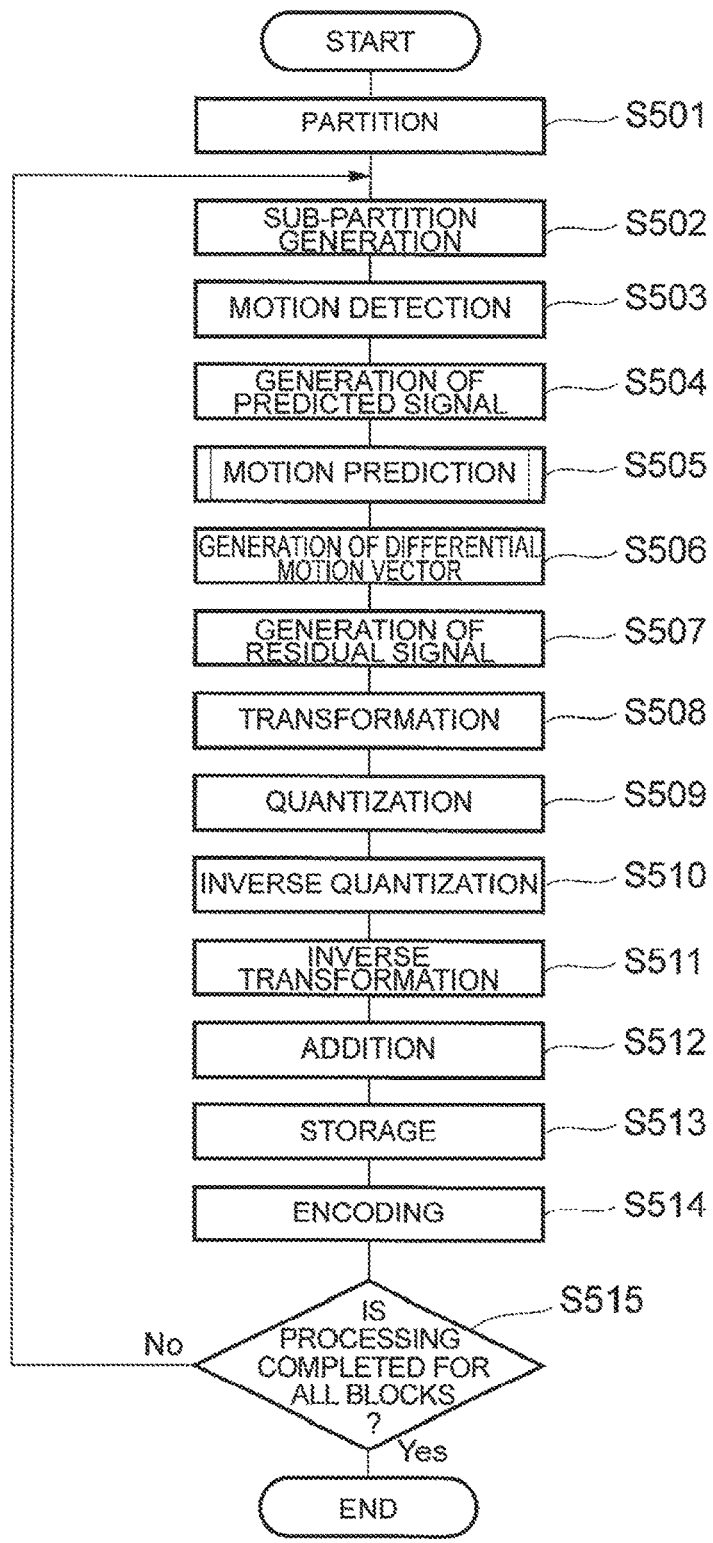
FIG. 27 is a flowchart of an example of a video encoding method according to an embodiment.

The below will describe the operation of the video encoding device 10 and also describe a video encoding method according to an embodiment. FIG. 27 is a flowchart of the video encoding method according to an embodiment.

In an embodiment, as shown in FIG. 27, the block partitioner 501 first partitions an input image into a plurality of blocks, in step S501. In next step S502, the sub-partition generator 502 partitions a target block into a plurality of sub-partitions, as described above. The sub-partition generator 502 also generates the shape information as described above.

In step S503, the motion detector 504 then obtains a motion vector of a processing target sub-partition, as described above. In subsequent step S504, the predicted signal generator 505 generates a predicted signal of the target block, using the motion vectors of the respective sub-partitions in the target block and the reference frame image signals, as described above.

In step S505, the motion predictor 506 then obtains a motion vector predictor. Furthermore, the motion predictor 506 generates the indication information to specify a candidate selected from a plurality of candidates for the motion vector predictor. The details of the process of this step S505 will be described later. In subsequent step S506, the subtracter 507 calculates the difference between the motion vector of each subblock and the motion vector predictor to generate a differential motion vector as described above.

In step S507, the residual signal generator 508 then obtains the difference between the image signal of the target block and the predicted signal to generate a residual signal. In subsequent step S508, the transformer 509 performs orthogonal transformation of the residual signal to generate transform coefficients. In subsequent step S509, the quantizer 510 quantizes the transform coefficients to generate quantized transform coefficients. In subsequent step S510, the inverse quantizer 511 performs inverse quantization of the quantized transform coefficients to generate inversely-quantized transform coefficients. In subsequent step S511, the inverse transformer 512 performs inverse transformation of the inversely-quantized transform coefficients to generate a reconstructed residual signal.

In step S512, the adder 513 then adds the predicted signal of the target block to the reconstructed residual signal to generate a reconstructed image signal. In subsequent step S513, the reconstructed image signal is stored as a previously-reconstructed image signal in the frame memory 503.

In step S514, the entropy encoder 514 then encodes the quantized transform coefficients, the shape information of the target block, the indication information of the motion vector predictor, and the differential motion vector.

In next step S515, it is determined whether all blocks have been processed. If the processing is not completed for all the blocks, the processing from step S502 is continued for an unprocessed block as a target. On the other hand, if the processing is completed for all the blocks, the processing is terminated.

Figure 28:
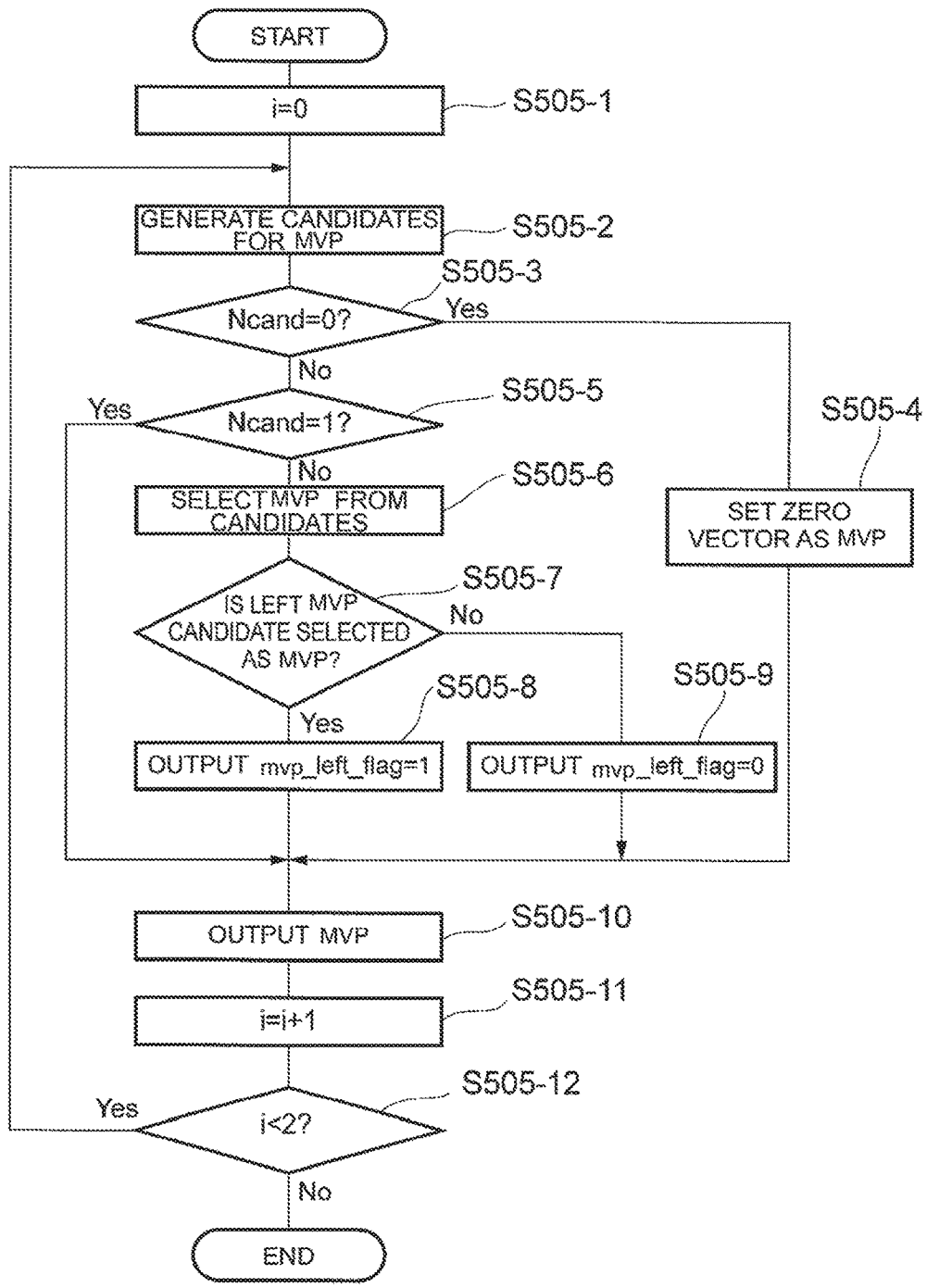
FIG. 28 is a flowchart showing an example of a process of the motion predictor according to an embodiment.

The operation of the motion predictor 506 will be described below in more detail. FIG. 28 is a flowchart showing the process of the motion predictor according to an embodiment. The motion predictor 506 outputs the motion vector predictor (hereinafter MVP) and the indication information to specify MVP, according to the flowchart shown in FIG. 28.

In the process of the motion predictor 506, as shown in FIG. 28, the value of counter i is first set to 0, in step S505-1. It is assumed below that the process for the first sub-partition is carried out with i=0 and the process for the second sub-partition is carried out with i=1.

Next, step S505-2 is to generate candidates for MVP of a processing target sub-partition from motion vectors of previously-processed partial regions, according to a below-described method. The number of candidates for MVP is two in the present example. Namely, candidates for MVP may be set as follows: a motion vector of a previously-processed partial region located to the left of the processing target sub-partition and a motion vector of a previously-processed partial region located above the processing target sub-partition are set as candidates for the motion vector predictor of the processing target sub-partition. In step S505-2, the number of generated candidates is set in Ncand.

Next, in step S505-3, it is determined whether NCand is "0." When NCand is "0" (Yes), the processing proceeds to step S505-4. When NCand is not "0" (No), the processing proceeds to step S505-5.

In step S505-4, MVP is set to a zero vector and the processing proceeds to step S505-10. On this occasion, MVP may be set to a motion vector of a predetermined block, a motion vector of a partial region processed immediately before the processing target sub-partition, or the like, instead of the zero vector.

In step S505-5, it is determined whether NCand is "1." When NCand is "1" (Yes), the processing proceeds to step S505-10. When NCand is not "1" (No), the processing proceeds to step S505-6.

In step S505-6, a MVP is selected from the candidates for MVP generated in step S505-2. The MVP to be selected can be a candidate that minimizes the difference from the motion vector of the processing target sub-partition.

Next, S505-7 is to determine whether the MVP selected in step S505-6 is a left candidate, i.e., a motion vector of the left partial region. When the MVP selected in step S505-6 is the left candidate (Yes), the processing proceeds to step S505-8. When the MVP selected in step S505-6 is not the left candidate (No), the processing proceeds to step S505-9.

In step S505-8, the indication information mvp_left_flag=1 to indicate that the MVP is the motion vector of the partial region located to the left of the processing target sub-partition is output. On the other hand, in step S505-9 the indication information mvp_left_flag=0 to indicate that the MVP is the motion vector of the partial region located above the processing target sub-partition is output.

Next, in step S505-10, the MVP remaining as a candidate is output. In subsequent step S505-11, "1" is added to the value of counter i.

Next, in step S505-12, it is determined whether the value of counter i is smaller than "2." When the value of counter i is smaller than "2" (Yes), the processing proceeds to step S505-2. When the value of counter i is not smaller than "2" (No), the processing is terminated.

If step S505-2 is configured to limit the number of generated candidates to one, the steps S505-5, S505-6, S505-7, S505-8, and S505-9 can be omitted. There are no restrictions on this limiting method, but it is possible to adopt, for example, such a method as a method of using an intermediate value of three candidates, a method of using an average of two candidates, or a method of determining a priority order for selection of one out of a plurality of candidates, as described above in the description of the motion vector predictor generator 5063. In the configuration wherein the number of candidates generated in step S505-2 is limited to one, when NCand is not "0" in step S505-3 (No), the processing proceeds to step S505-10.

Figure 29:
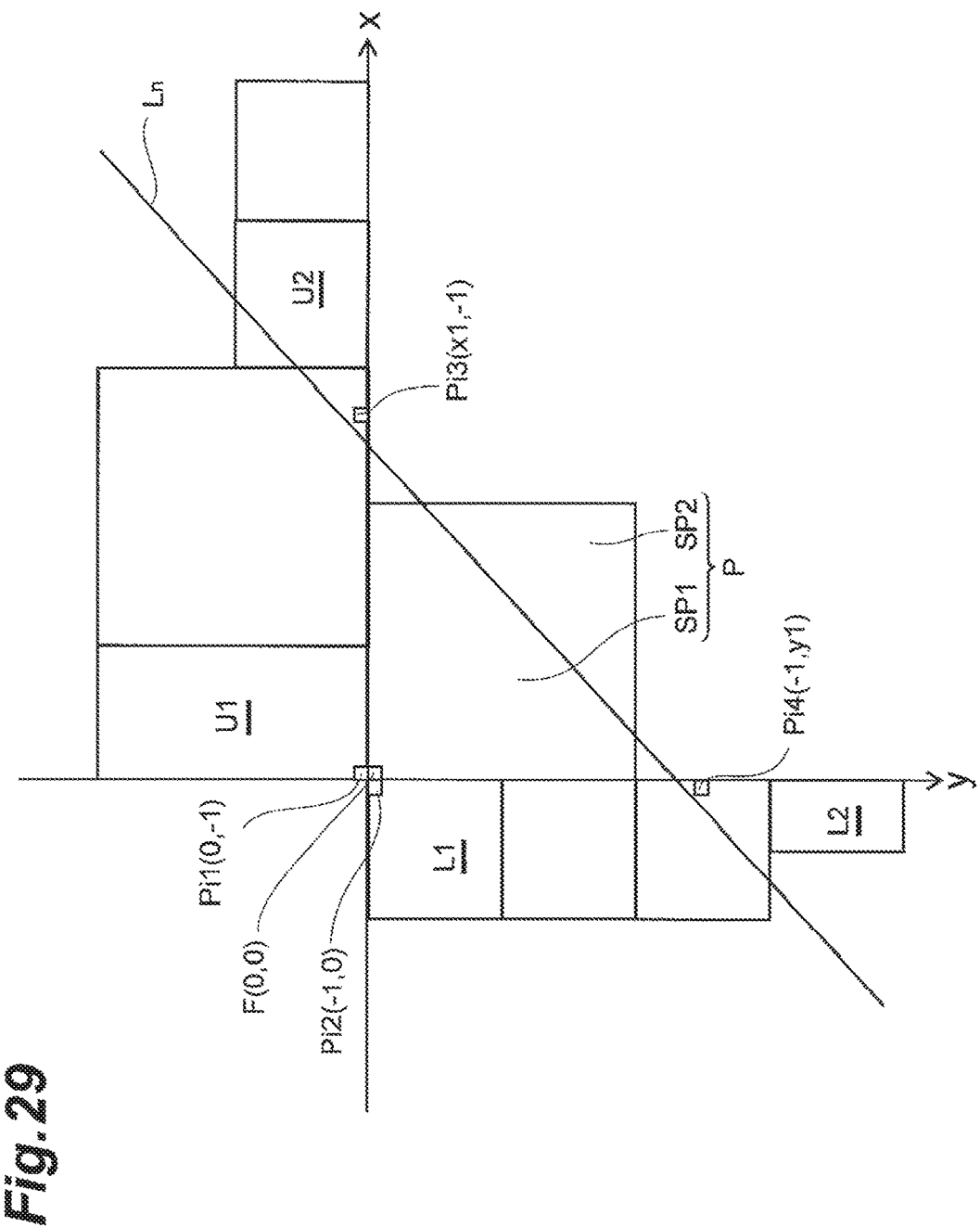
FIG. 29 is a drawing showing an example of sub-partitions of a target partition and surrounding partial regions.

The method of generating candidates for the motion vector predictor of the processing target sub-partition in step S505-2 will be described below in more detail. FIG. 29 is a drawing showing an example of sub-partitions of a target block and surrounding partial regions.

The motion reference candidate generator 5062, as shown in FIG. 29, refers to partial region U1 and partial region L1 for the first sub-partition SP1 and, when each of the partial regions is one having been processed by inter-picture prediction, the motion reference candidate generator 5062 employs the motion vector of the partial region as a candidate for the motion vector predictor of the first sub-partition SP1. Similarly, the motion reference candidate generator 5062 refers to partial region U2 or partial region L2 for the second sub-partition to generate candidates for the motion vector predictor of the second sub-partition. The partial regions U1, L1, U2, and L2 herein are blocks or sub-partitions around the target block P and regions serving as units of generation of the predicted signal. The partial regions may be blocks prepared for generation of candidates for the motion vector predictor (e.g., blocks generated by partition in a single shape), irrespective of the units of generation of the predicted signal.

The partial region U1 is a partial region including a pixel Pi1(0,−1) neighboring above to the uppermost and leftmost pixel F(0,0) of the first sub-partition SP1, which is a previously-processed partial region in contact with the sub-partition SP1. The partial region L1 is a partial region including a pixel Pi2(−1,0) neighboring left to the uppermost and leftmost pixel F(0,0) of the first sub-partition SP1, which is a partial region in contact with the first sub-partition SP1. The partial region U2 is a partial region neighboring right to a partial region including a pixel Pi3(x1,−1), which is a partial region in contact with the x-axis. The partial region L2 is a partial region neighboring below to a partial region including a pixel Pi4(−1,y1), which is a partial region in contact with the y-axis.

The x-coordinate x1 of the pixel Pi3 and the y-coordinate y1 of the pixel Pi4 may be calculated by formula (3) and formula (4).

$$x1 = \operatorname{ceil}(-k/m) \tag{3}$$

$$y1 = \operatorname{ceil}(k) \tag{4}$$

Formulae (3) and (4) are formulae obtained by applying the function ceil(z) to values resulting from substitution of y=0 and x=0, respectively, into the linear expression (1) to express an extension line Ln of a boundary as a partition between the first sub-partition SP1 and the second sub-partition SP2. The function ceil(z) is called a ceiling function, which is a function for deriving a minimum integer of not less than z, for real number z.

A floor function may be employed instead of the ceil function. The function floor(z) is called a floor function, which is a function for deriving a maximum integer of not more than z, for real number z.

Furthermore, x1 and y1 may be calculated by formulae (5) and (6).

$$x1 = \text{ceil}((-1-k)/m) \quad (5)$$

$$y1 = \text{ceil}(-m+k) \quad (6)$$

Formulae (5) and (6) are formulae obtained by applying the function ceil(z) to values resulting from substitution of y=−1 and x=−1, respectively, into formula (1).

Whether the partial regions U2 and L2 are existent is determined as described below. Conditions for existence of the partial region U2 are that it is in a picture and that formula (7) is satisfied. Conditions for existence of the partial region L2 are that it is in a picture and that formula (8) is satisfied.

$$0 < x1 \quad (7)$$

$$0 < y1 \quad (8)$$

When the condition of formula (7) is not satisfied, the partial region L2 exists between the second sub-partition SP2 and the partial region U2. In that case, the partial region U2 more distant from the second sub-partition SP2 than the partial region L2 closer to the second sub-partition SP2 is less likely to have a motion vector close to that of the second sub-partition SP2. In this case, the motion vector of the partial region U2 can be excluded from candidates for the motion vector predictor by the condition of formula (7).

Likewise, when the condition of formula (8) is not satisfied, the partial region U2 exists between the second sub-partition SP2 and the partial region L2. In that case, the partial region L2 more distant from the second sub-partition SP2 than the partial region U2 closer to the second sub-partition SP2 is less likely to have a motion vector close to that of the second sub-partition SP2. In that case, the motion vector of the partial region U2 can be excluded from candidates for the motion vector predictor by the condition of formula (8).

In an example, the conditions defined by formulae (9) and (10) below may be used instead of the conditions of formulae (7) and (8).

$$0 < x1 < \text{blocksize}X \quad (9)$$

$$0 < y1 < \text{blocksize}Y \quad (10)$$

Here, blocksizeX and blocksizeY are the number of horizontal pixels and the number of vertical pixels in the target block P. For example, when the target block P is a block of 8×8 pixels, blocksizeX=8 and blocksizeY=8.

By using the condition of formula (9) or formula (10), it is possible to exclude from candidates for the motion vector predictor, a motion vector of a partial region having no contact with the second sub-partition SP2, out of the partial region U2 and the partial region L2. This allows only candidates for the motion vector predictor with conceivably high prediction accuracy to be left.

When the partial regions U1, L1, U2, and L2 are set as described above, candidates for the motion vector predictor of each sub-partition are generated from motion vectors of previously-processed partial regions located on the same side with respect to the extension line of the boundary between sub-partitions.

As long as the candidates for the motion vector predictor of the sub-partition SP2 are generated from motion vectors of partial regions in the same domain as the sub-partition SP2 with respect to the extension line Ln of the boundary between the sub-partition SP2 and the other sub-partitions of the target block including the sub-partition SP2, the generation method of the motion vector predictor is not limited to that in the above-described embodiment. For example, the partial region U2 may be a partial region including the pixel Pi3 and the partial region L2 may be a partial region including the pixel Pi4.

A condition that the entire partial region is present in the same domain as the sub-partition SP2 with respect to the line Ln may be added as a condition for the motion vector of the partial region to be added to candidates for the motion vector predictor of the sub-partition SP2. In this case, it is possible to employ, for example, a method of inspecting positions of all the corners of the partial region.

Figure 30:
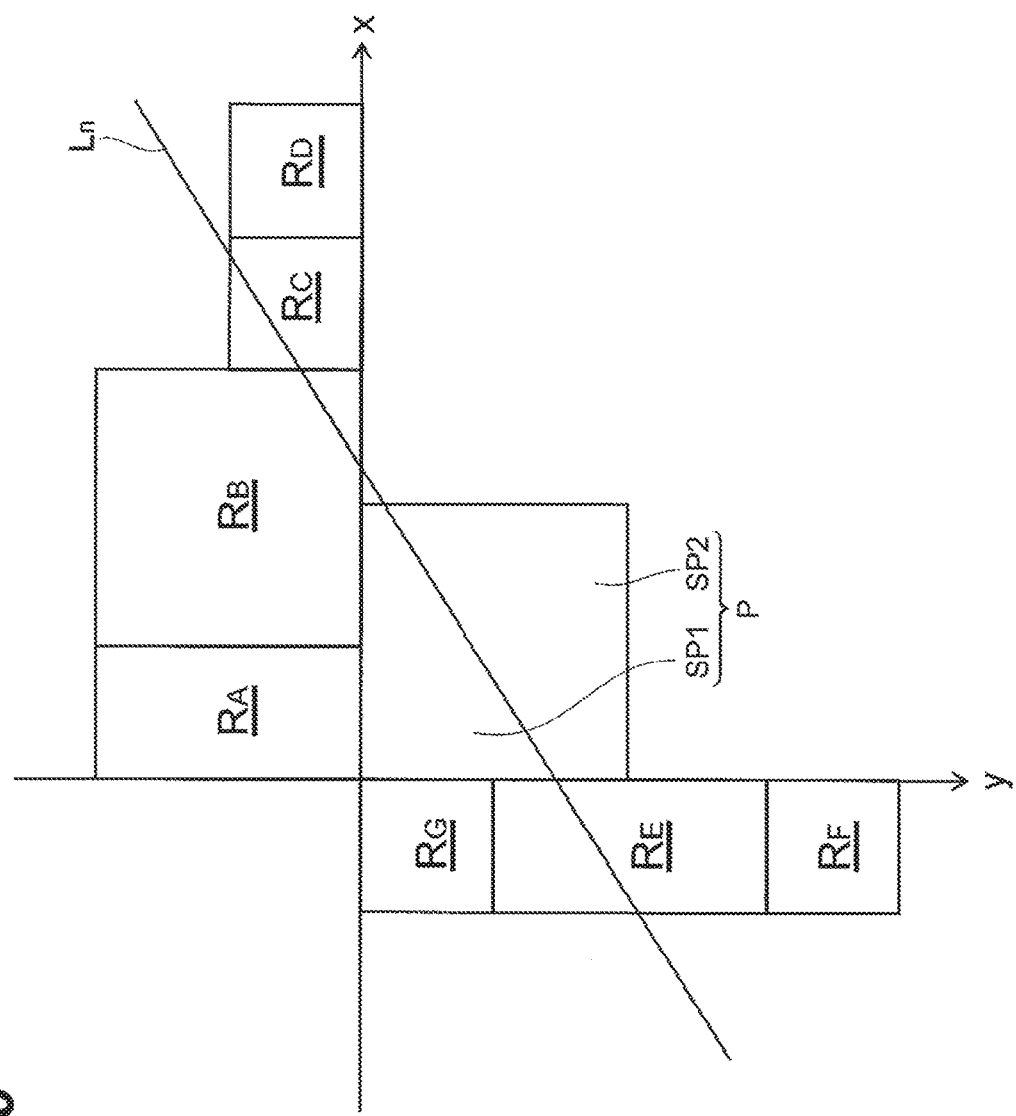
FIG. 30 is a drawing showing another example of sub-partitions of a target block and surrounding partial regions.

Even if a partial region is not completely included in the same domain as a sub-partition with respect to the extension line, the motion vector of the partial region may be employed as a candidate for the motion vector predictor of the sub-partition. FIG. 30 is a drawing showing another example of sub-partitions of a target block and surrounding partial regions. As shown as an example in FIG. 30, motion vectors of partial regions $R_A$, $R_B$, $R_G$, and $R_E$ may be used as candidates for the motion vector predictor of the first sub-partition SP1. A motion vector predictor of partial region $R_E$ may be added to candidates for the motion vector predictor of the second sub-partition SP2.

In the description about FIGS. 28 and 29, the number of motion vectors serving as candidates for the motion vector predictor was at most two, but it is also possible to select two from the motion vectors obtained by any of the above-described conditions. For example, the motion vector of the partial region U2 shown in FIG. 29, and a motion vector of a partial region neighboring the partial region U2 may be selected as candidates for the motion vector predictor. Likewise, the motion vector of the partial region L2 and a motion vector of a partial region neighboring the partial region U2 may be selected as candidates for the motion vector predictor. Furthermore, three or more motion vectors may be selected as candidates for the motion vector predictor from the motion vectors specified by any of the above-described conditions. Moreover, an average or a median of a plurality of candidates for the motion vector predictor may be added to candidates for the motion vector predictor.

The block shape information can be used as a method for limiting the number of candidates for the motion vector predictor generated in step S505-2 in FIG. 28 to at most one. For example, out of previously-encoded partial regions in contact with a processing target sub-partition, a motion vector of a partial region with a maximum length of a portion in contact with the sub-partition may be added as a candidate for the motion vector predictor. It is also possible to employ a motion vector of a previously-encoded partial region with a minimum shortest distance from a processing target sub-partition, as a candidate for the motion vector predictor of the sub-partition.

Figure 31:
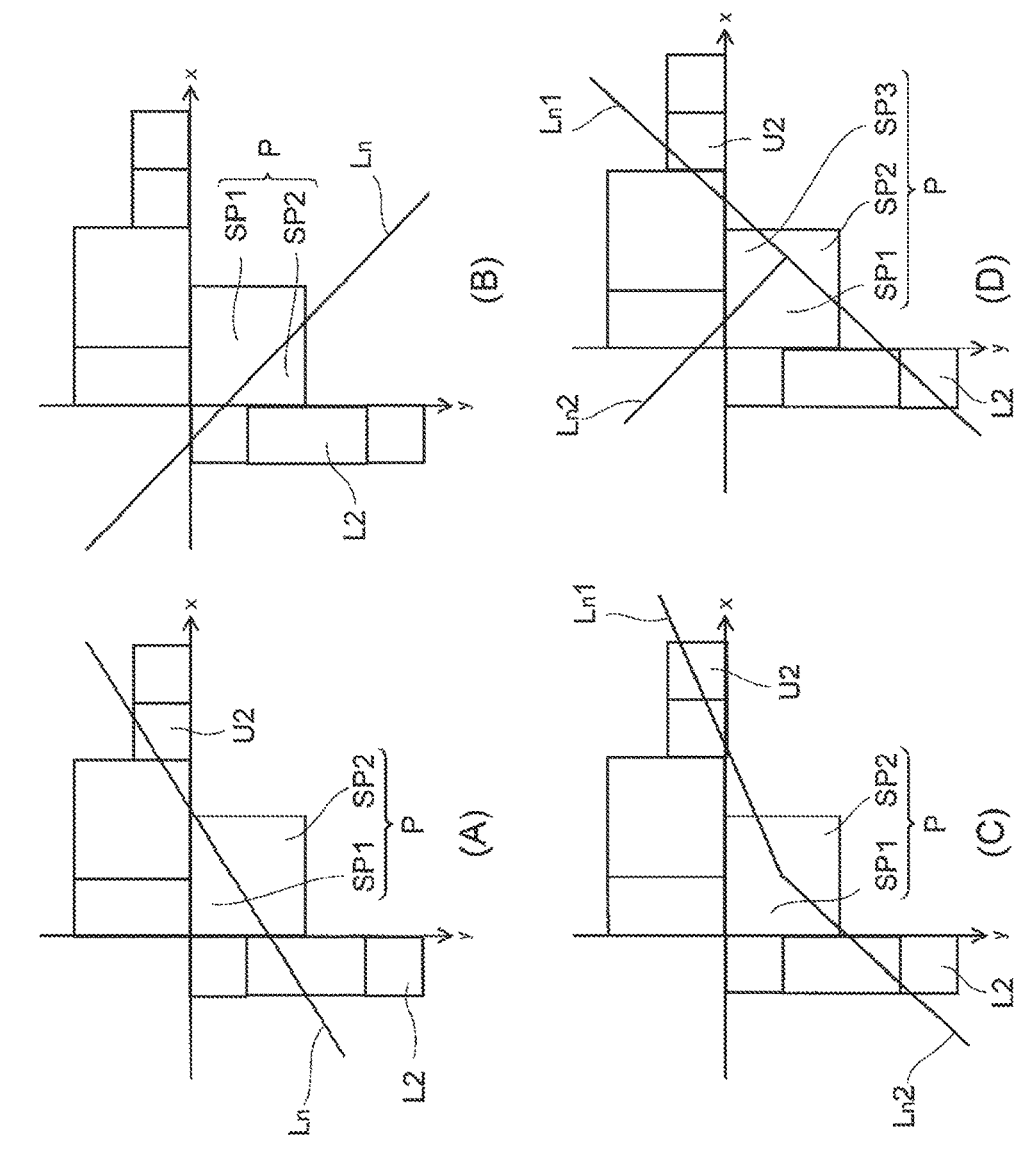
FIG. 31 is a drawing showing still other examples of sub-partitions of a target block and surrounding partial regions.

The above-described generation methods of candidates for the motion vector predictor can be applied to sub-partitions of any shape. FIG. 31 is a drawing showing further examples of sub-partitions of a target block and surrounding partial regions. (A) of FIG. 31 shows sub-partitions defined by a line Ln with a coordinate of y-intercept and a slope different from those of the line Ln shown in FIG. 29. (B) of FIG. 31 shows sub-partitions defined by a line Ln with a slope approximately symmetric with that of the line Ln with respect to the y-axis and with a coordinate of y-intercept different from that of the line Ln shown in FIG. 29. (C) of FIG. 31 shows sub-partitions defined by two lines Ln1 and Ln2. (D) of FIG. 31 shows sub-partitions defined by two lines Ln1 and Ln2 intersecting with each other. When the extension line of the boundary as shown in (A) to (D) of FIG. 31 is used as reference, the partial regions L2 and U2 with motion vectors that can be candidates for the motion vector predictor of the sub-partition SP2 can be specified by the aforementioned generation methods of candidates for the motion vector predictor.

It is noted that the sub-partitions are not limited only to those partitioned by a straight line. For example, in the case where the shapes of sub-partitions are selected out of predetermined patterns, a motion vector of a previously-encoded partial region belonging to the same domain as a processing target sub-partition with respect to an extension line of a boundary between sub-partitions can be used as a candidate for the motion vector predictor. If patterns of sub-partition shapes are preliminarily defined, it is also possible to preliminarily determine a partial region with a motion vector to be adopted as a candidate for the motion vector predictor, for each shape pattern. The patterns may include the patterns to partition a target block into rectangular sub-partitions.

The aforementioned selection method of the motion vector predictor can also be applied as a method of selecting a motion vector in generation of a predicted signal of a processing target sub-partition using motion vectors of previously-encoded partial regions. Namely, the predicted signal of the processing target sub-partition may be generated using the motion vector predictor selected in step S505-2 in FIG. 28. In this case, there is no need for encoding of the differential motion vector and therefore the motion vector predictor output from the motion predictor 506 is not output to the subtracter 507 but to the predicted signal generator 505.

Furthermore, the video encoding device 10 may be configured to determine whether the differential motion vector is to be encoded, and to encode application information to specify the result of the determination. In this modification, the motion predictor 506 may include a function to switch output of the motion vector predictor either to the subtracter 507 or to the predicted signal generator 505, based on the application information.

In this modification, it is unfavorable that motion vectors of all the sub-partitions in a target block become identical with each other, because the partitioning of the target block becomes meaningless. Namely, on the occasion of generating the candidates for motion vector of a processing target sub-partition in step S505-2 in FIG. 28, a motion vector of a previously-encoded sub-partition in the target block may be excluded from the candidates. For example, in the case where the target block is partitioned into two sub-partitions and where the motion vector of the first sub-partitions is first encoded, the motion vector of the first sub-partitions is excluded from the candidates for the motion vector predictor of the second sub-partitions. If the motion vector of the first sub-partitions is the same as that of the partial region U2, the motion vector of the partial region U2 does not have to be used in generation of the motion vector predictor of the second sub-partition.

If whether the differential motion vector is to be encoded is indicated, the occurrence probability in arithmetic coding of the aforementioned application information may be adaptively determined according to the sub-partition shape information. For example, the occurrence probability for the application information to indicate that the differential motion vector of the first sub-partition is not encoded can be set higher than that for the application information to indicate that the differential motion vector of the second sub-partition is not encoded. The reason for it is as follows: the second sub-partition may have no contact with any previously-encoded partial region, while the first sub-partition always has a contact with a previously-encoded partial region; therefore, the setting of the occurrence probabilities as described above may reduce a code amount of the application information.

Figure 32:
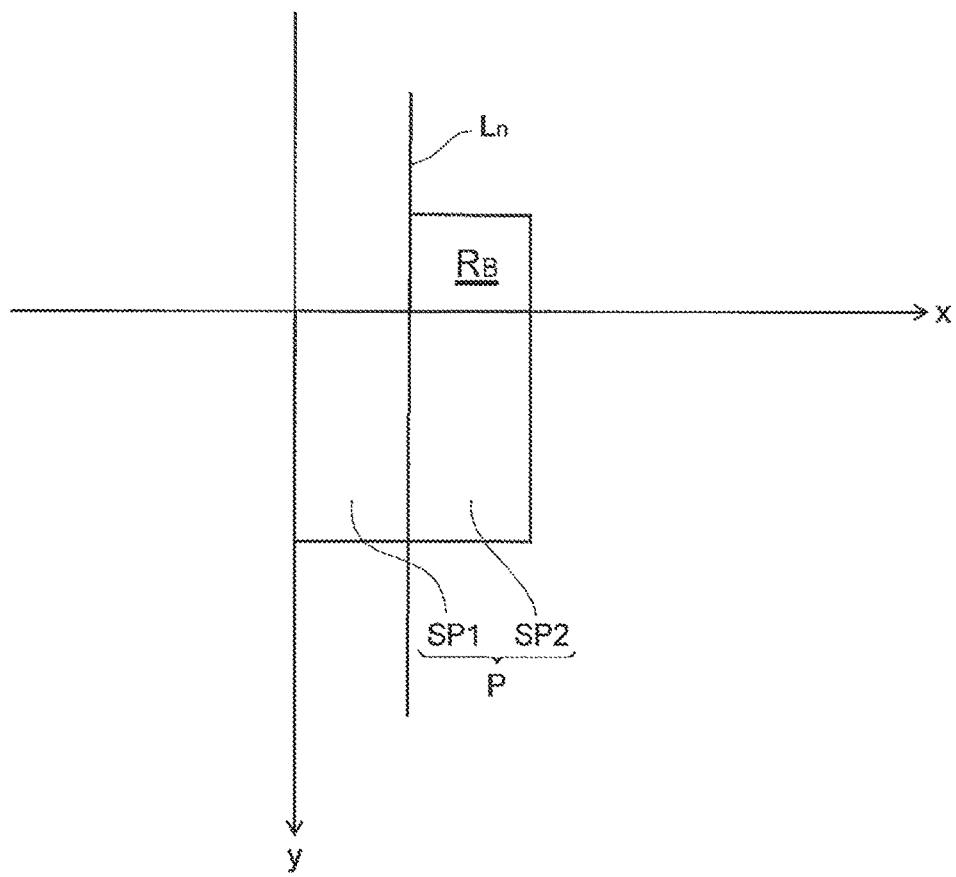
FIG. 32 is a drawing showing still another example of sub-partitions of a target block and a surrounding partial region.

The effect of one embodiment will be described with reference to FIG. 32 showing an example of partitioning of a target block into rectangular sub-partitions, for simplicity. In this example, the target block P is partitioned into a left sub-partition SP1 and a right sub-partition SP2 by a straight line Ln. In this example, a motion vector of the first sub-partition SP1 and a motion vector of a partial region $R_B$ are candidates for the motion vector predictor of the second sub-partition SP2.

In the example shown in FIG. 32, if the predicted signal of the second sub-partition SP2 is generated using the motion vector of the first sub-partition SP1, the predicted signal of the first sub-partition SP1 and the predicted signal of the second sub-partition SP2 will be generated using the same motion vector, which makes partitioning of the target block into two sub-partitions meaningless. For this reason, the predicted signal of the second sub-partition SP2 may be generated using the motion vector of the partial region $R_B$ above the sub-partition SP2. In the example shown in FIG. 32, therefore, it is preliminarily determined between the encoding device and the decoding device that the predicted signal of the second sub-partition SP2 is to be generated using the motion vector of the partial region $R_B$, which reduces candidates for the motion vector predictor and which eliminates a need for transmitting indication information to indicate one motion vector predictor out of a plurality of candidates for the motion vector predictor.

Furthermore, a method for the video encoding device 10 to determine whether the differential motion vector needs to be encoded (in which the motion predictor 506 switches the output of the motion vector predictor either to the subtracter 507 or to the predicted signal generator 505 on the basis of the application information) is discussed. At this time, if the motion vector of the partial region $R_B$ is the same as that of the first sub-partition SP1, selection of either of the two candidates for the motion vector predictor results in the same motion vector predictor of the second sub-partition SP2 as the motion vector of the first sub-partition SP1. Therefore, it is preliminarily determined between the encoding device and the decoding device that if the two candidates for motion vector predictor are identical with each other, the predicted signal of the second sub-partition SP2 is to be generated by the motion vector resulting from addition of the differential motion vector and the motion vector predictor, which eliminates a need for transmitting the application information to indicate whether the differential motion vector is to be encoded, in addition to the indication information.

Figure 33:
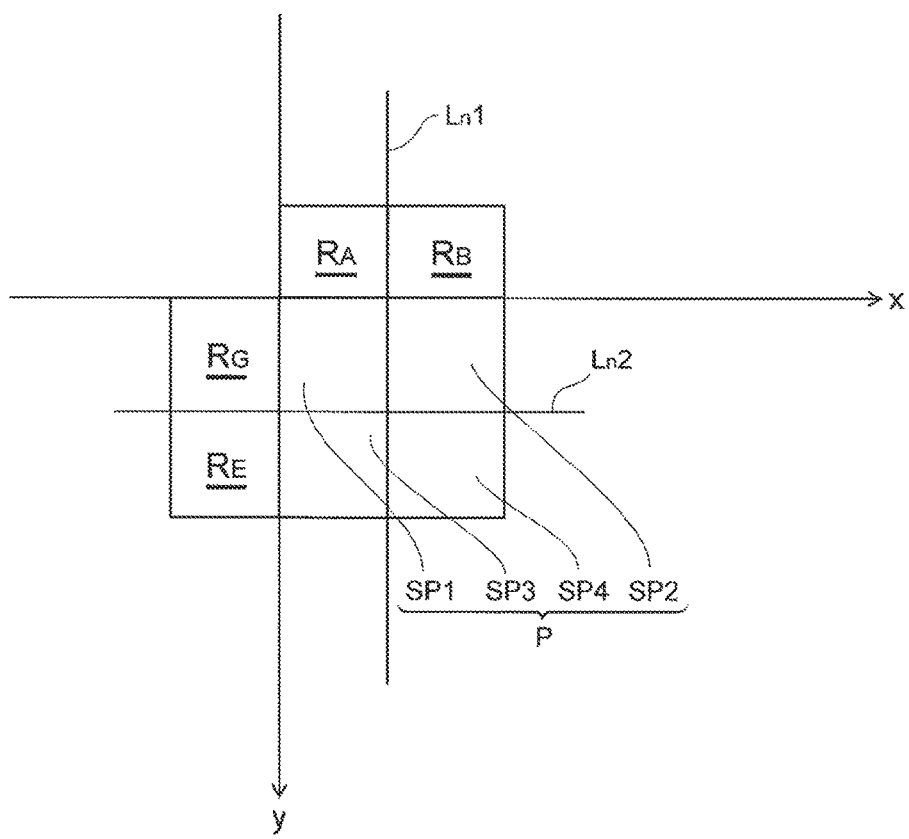
FIG. 33 is a drawing showing still another example of sub-partitions of a target block and surrounding partial regions.

In cases where a target block is partitioned into three or more sub-partitions as shown in FIG. 33, partitioning of the target block is meaningful if the first sub-partition SP1, second sub-partition SP2, and third sub-partition SP3 have the same motion vector and the fourth sub-partition SP4 only has a different motion vector. In such cases, therefore, the predicted signal of the second sub-partition SP2 and the predicted signal of the third sub-partition SP3 may be generated using the motion vector of the first sub-partition SP1, instead of motion vectors of partial region $R_B$ and partial region $R_E$, respectively. However, for the fourth sub-partition SP4, if the motion vectors of the second sub-partition SP2 and the third sub-partition SP3 are the same, two candidates for the motion vector predictor become identical with each other; therefore, by preliminarily determining a rule between the encoding device and the decoding device, it becomes unnecessary to transmit the indication information to indicate one motion vector predictor. Furthermore, if the first sub-partition SP1, second sub-partition SP2, and third sub-partition SP3 have the same motion vector and if the predicted signal of the fourth sub-partition SP4 is generated using the motion vector of the second sub-partition SP2 or the third sub-partition SP3, the four sub-partitions all will have the same motion vector; therefore, by preliminarily determining a rule between the encoding device and the decoding device, it also becomes unnecessary to transmit the application information to indicate whether the differential motion vector is to be encoded, in addition to the indication information.

Figure 34:
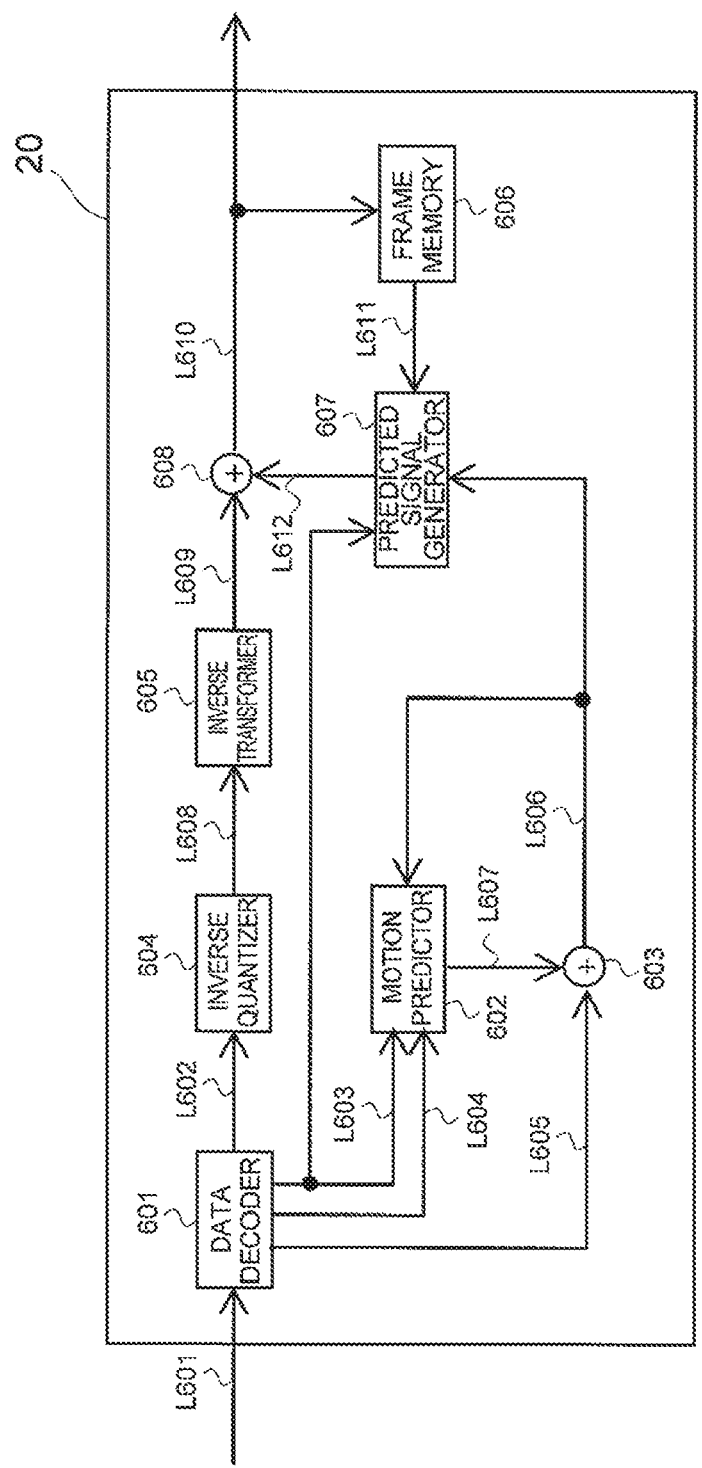
FIG. 34 is a drawing schematically showing an example of a configuration of a video decoding device according to an embodiment.

A video decoding device according to an embodiment will be described below. FIG. 34 is a drawing schematically showing a configuration of the video decoding device according to an embodiment. The video decoding device 20 shown in FIG. 34 is a device that can generate a video sequence by decoding a compressed stream generated by the video encoding device 10.

As shown in FIG. 34, the video decoding device 20 is provided with data decoder 601, motion predictor 602, adder 603, inverse quantizer 604, inverse transformer 605, frame memory 606, predicted signal generator 607, and adder 608.

The data decoder 601 analyzes a compressed stream input via line L601. The data decoder 601 sequentially performs the processing described below, for each block as a decoding target (hereinafter a target block).

The data decoder 601 decodes encoded data associated with the target block in the compressed stream to restore the quantized transform coefficients of the target block, and outputs the quantized transform coefficients via line L602. The data decoder 601 also decodes encoded data to restore the shape information of the target block, and outputs the shape information via line L603. On this occasion, the partition applicability information to indicate whether the target block needs to be partitioned is restored, and if the partition applicability information indicates no need for partitioning of the target block, the shape information does not have to be restored.

The data decoder 601 also decodes the encoded data to restore the indication information for each sub-partition in the target block, i.e., the information to indicate one of a plurality of candidates for motion vector predictor, and outputs the indication information via line L604. The data decoder 601 also decodes the encoded data to restore the differential motion vector of the target block, and outputs the differential motion vector via line L605. Furthermore, the data decoder 601 can adaptively determine the occurrence probability in decoding of encoded data on the occasion of restoring the indication information of the motion vector predictor, based on the shape information of the target block. A method for implementing it can be, for example, to set a higher occurrence probability for the indication information to indicate a motion vector of a partial region in contact with a processing target sub-partition, as a motion vector predictor.

The motion predictor 602 generates a motion vector predictor of a processing target sub-partition, based on the shape information fed via line L603 and motion vectors of partial regions prior in a processing order, fed via line L606, and based on the indication information fed via line L604, and outputs the motion vector predictor via line L607. By narrowing down candidates for the motion vector predictor to one by a predetermined method, it is also possible to omit the input of the indication information.

The adder 603 adds the motion vector predictor fed via line L607, to the differential motion vector fed via line L605, to generate a motion vector of a target block or a motion vector of a sub-partition in the target block, and outputs the motion vector via line L606.

The inverse quantizer 604 performs inverse quantization of the quantized transform coefficients fed via line L602, to generate inversely-quantized transform coefficients. The inverse quantizer 604 outputs the inversely-quantized transform coefficients thus generated, via line L608.

The inverse transformer 605 performs inverse orthogonal transformation of the inversely-quantized transform coefficients fed via line L608, to generate a reconstructed residual signal. The inverse transformer 605 outputs the reconstructed residual signal thus generated, via line L609.

If the reconstructed residual signal generated is not one subjected to quantization, the video decoding device 20 does not have to be provided with the inverse quantizer 604. Similarly, if the reconstructed residual signal generated is not one subjected to transformation, the video decoding device 20 does not have to be provided with the inverse transformer 605.

The frame memory 606 stores previously-reconstructed image signals fed via line L610, i.e., frame image signals prior in the processing order to the processing target input image (which will be referred to hereinafter as reference frame image signals). Furthermore, the frame memory 606 outputs the reference frame image signals via line L611.

The predicted signal generator 607 generates a predicted signal of each sub-partition image in the target block, based on the motion vector fed via line L606 and the shape information fed via line L603, from an image signal in a predetermined range of the reference frame image signals fed via line L611. The predicted signal generator 607 outputs the predicted signal thus generated, via line L612. Although description is omitted in the present specification, the predicted signal may be generated by intra-picture prediction besides the inter-picture prediction.

The adder 608 adds the reconstructed residual signal fed via line L609, to the predicted signal of the target block fed via line L612, to generate a reconstructed image signal. The adder 608 outputs the reconstructed image signal via line L610.

Figure 35:
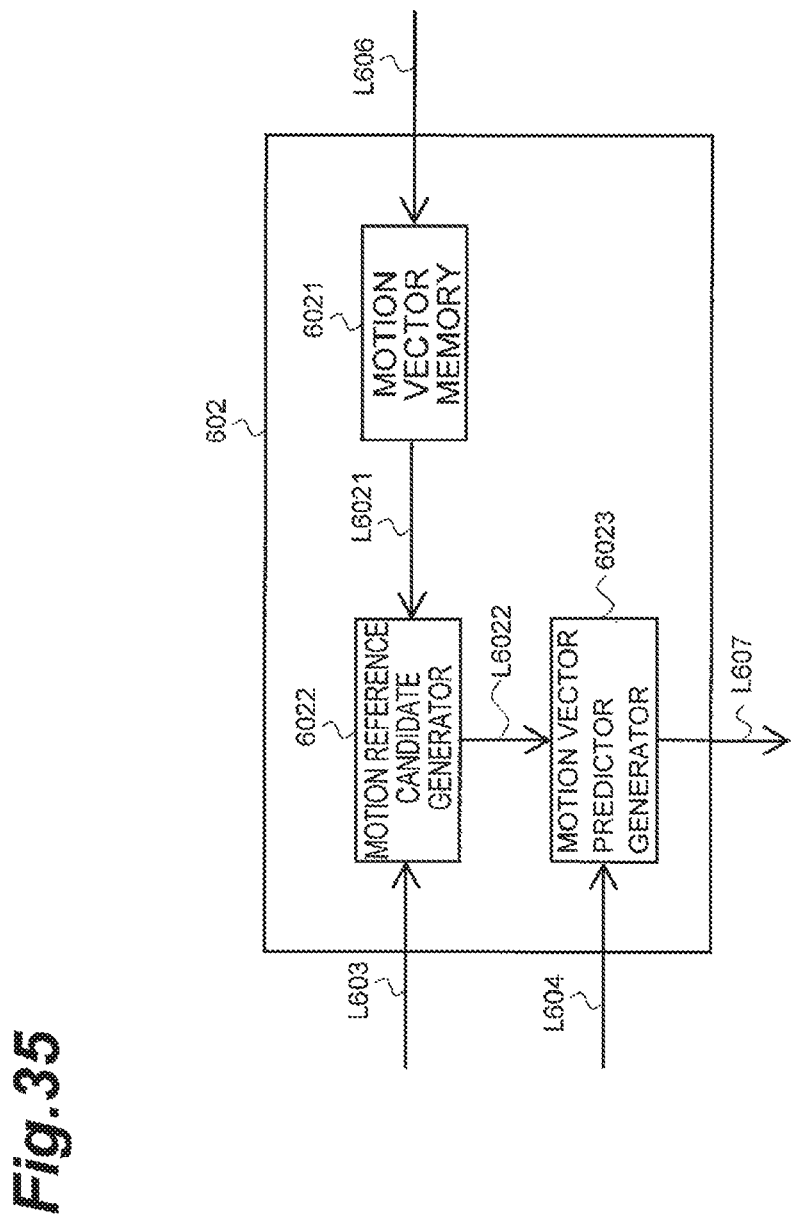
FIG. 35 is a drawing showing an example of a configuration of a motion predictor according to an embodiment.

FIG. 35 is a drawing showing a configuration of the motion predictor according to an embodiment. As shown in FIG. 35, the motion predictor 602 has a motion vector memory 6021, a motion reference candidate generator 6022, and a motion vector predictor generator 6023.

The motion vector memory 6021 stores motion vectors fed via line L606. The motion vectors stored in the motion vector memory 6021 are motion vectors of previously-processed partial regions prior in the processing order to the target block or the processing target sub-partition. The motion vector memory 6021 outputs the stored motion vectors via line L6021, for derivation of the motion vector predictor for the processing target sub-partition.

The motion reference candidate generator 6022 generates candidates for the motion vector predictor from the motion vectors fed via line L6021, by a below-described method, based on the shape information fed via line L603, and outputs them via line L6022.

The motion vector predictor generator 6023 determines a motion vector predictor, based on the indication information of the motion vector predictor fed via line L604, from the candidates for the motion vector predictor fed via line L6022, and outputs the determined motion vector predictor via line L607. If the number of candidates to be generated in the motion reference candidate generator is limited to one, the input of the indication information to specify the candidate to be selected can be omitted.

Figure 36:
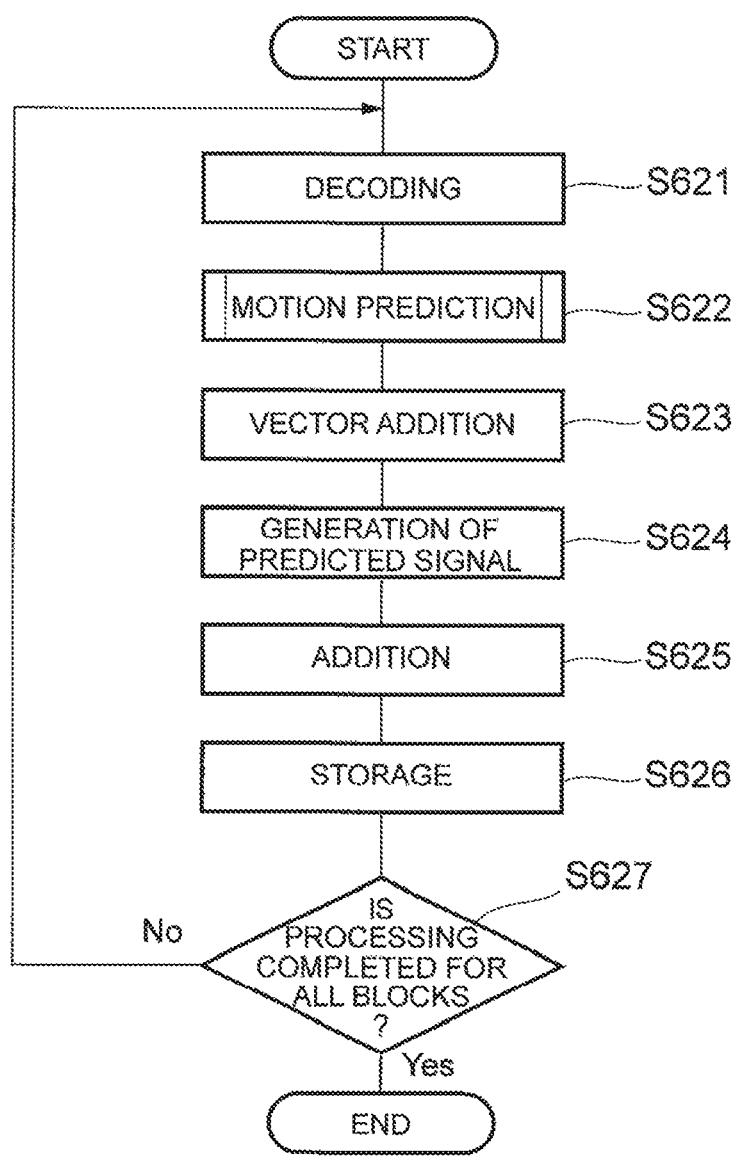
FIG. 36 is a flowchart of an example of a video decoding method according to an embodiment.

The below will describe the operation of the video decoding device 20 and a video decoding method according to an embodiment. FIG. 36 is a flowchart of a video decoding method according to an embodiment. In an embodiment, as shown in FIG. 36, in step S621, the data decoder 601 first decodes the encoded data in the compressed data about a target block, as described above, to restore the quantized transform coefficients, shape information, and differential motion vector of the target block. In step S621, the partition applicability information and indication information may be restored. Furthermore, in step S621, the inverse quantizer 604 may generate the inversely-quantized transform coefficients from the quantized transform coefficients restored, and the inverse transformer 605 may generate a reconstructed residual signal from the inversely-quantized transform coefficients.

In step S622, the motion predictor 602 then determines the motion vector predictor of the processing target step S621, for each step S621 in the target block serving as a processing target. In subsequent step S623, the adder 603 adds the motion vector predictor of the processing target step S621 to the differential motion vector to generate a motion vector.

In step S624, the predicted signal generator 607 then generates the predicted signal from the reference frame image signals in the frame memory 606, using the motion vector of the target block. In subsequent step S625, the adder 608 adds the predicted signal of the target block to the reconstructed residual signal to generate a reconstructed image signal.

In step S626, the reconstructed image signal generated in step S625 is then stored as a previously-reconstructed image signal into the frame memory 606. In subsequent step S627, it is determined whether the processing is completed for all the blocks. If the processing is not completed for all the blocks, the processing from step S621 is continued using an unprocessed block as a target block. On the other hand, when the processing is completed for all the blocks, the processing is terminated.

Figure 37:
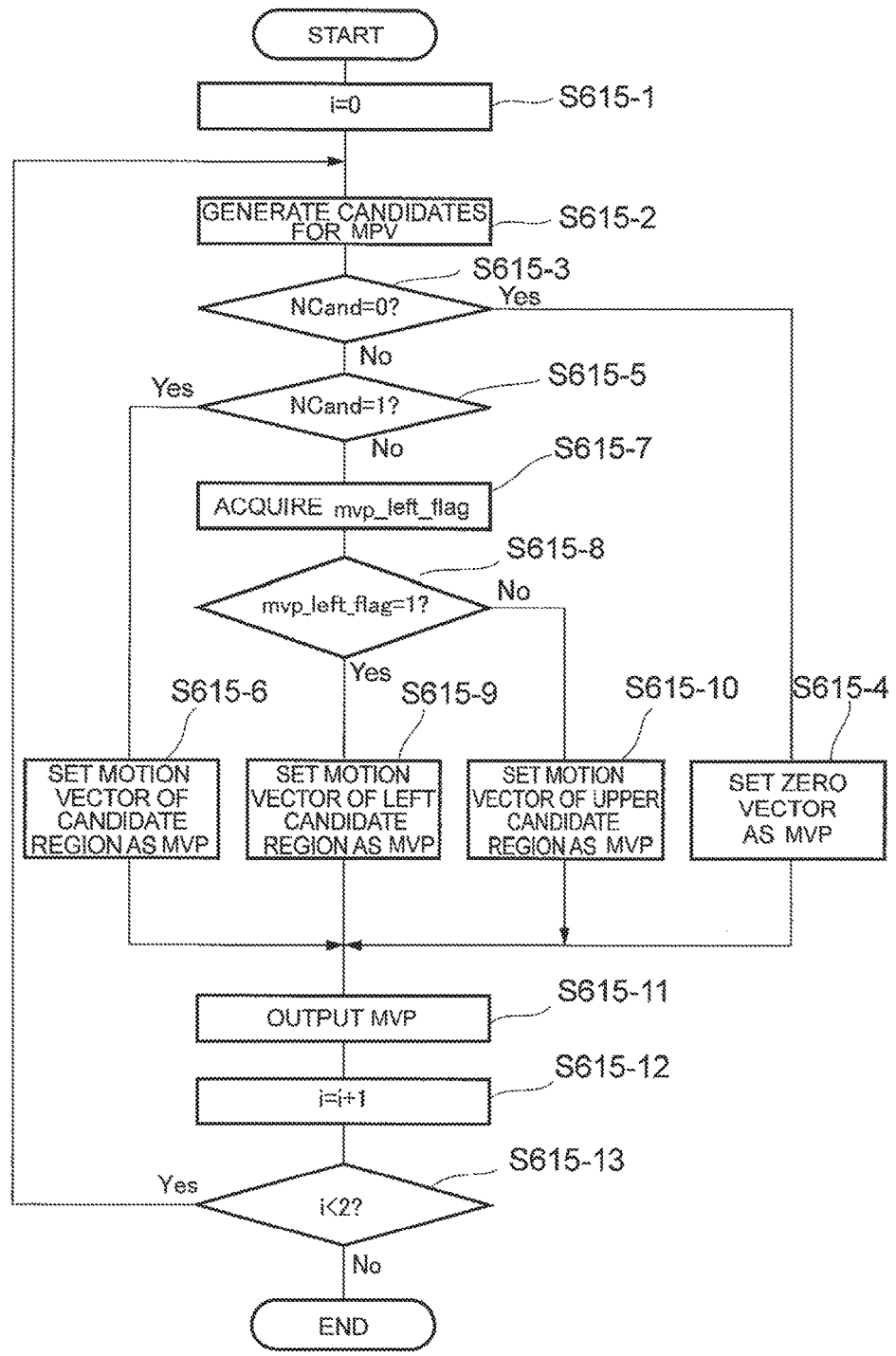
FIG. 37 is a flowchart showing an example of a process of the motion predictor according to an embodiment.

The operation of the motion predictor 602 will be described below in detail. FIG. 37 is a flowchart showing processing of the motion predictor according to an embodiment. The motion predictor 602 generates the motion vector predictor, according to the flowchart shown in FIG. 37.

In an embodiment, in step S615-1, the value of counter i is set to "0." It is assumed hereinafter that the processing for the first sub-partition is carried out with i=0 and the processing for the second sub-partition is carried out with i=1.

In next step S615-2, two candidates (left candidate and upper candidate) that can be the motion vector predictor of the processing target sub-partition are determined according to one of the methods described above using FIGS. 29, 30, 31, 32, and 33, out of motion vectors of partial regions prior in the processing order to the processing target sub-partition.

In step S615-3, it is then determined whether the number NCand of candidates generated in step S615-2 is "0." When NCand is "0" (Yes), the processing proceeds to step S615-4. When NCand is not "0" (No), the processing proceeds to step S615-5.

In step S615-4, the motion vector predictor MVP is set to a zero vector and the processing proceeds to step S615-11. On this occasion, it is also possible to set a motion vector of a predetermined block or a motion vector of a partial region immediately prior in the processing order to the processing target sub-partition, instead of the zero vector, as the motion vector predictor MVP.

In step S615-5, it is determined whether the number NCand of candidates generated in step S615-2 is "1." When NCand is "1" (Yes), the processing proceeds to step S615-6. When NCand is not "1" (No), the processing proceeds to step S615-7.

In step S615-6, the candidate generated in step S615-2 is set as MVP. Then the processing proceeds to step S615-11.

In step S615-7, the information mvp_left_flag to indicate the MVP to be selected is acquired from the candidates generated in step S615-2. Then the processing proceeds to step S615-8.

In step S615-8, it is determined whether the value of mvp_left_flag is "1." When the value of mvp_left_flag is "1" (Yes), the processing proceeds to step S615-9. When the value of mvp_left_flag is not "1" (No), the processing proceeds to step S615-10.

Step S615-9 is to set a motion vector of a partial region on the left side of the processing target sub-partition as MVP. Then the processing proceeds to step S615-11.

Step S615-10 is to set a motion vector of a partial region on the left side of the processing target sub-partition as MVP. Then the processing proceeds to step S615-11.

Step S615-11 is to output the MVP thus set. Then the processing proceeds to step S615-12.

Next, step S615-12 is to add "1" to the value of counter i. Then the processing proceeds to step S615-13.

Next, step S615-13 is to determine whether the value of counter i is smaller than "2." When the value of counter i is smaller than "2" (Yes), the processing proceeds to step S615-2. On the other hand, when the value of counter i is not smaller than 2 (No), the processing is terminated.

By limiting the number of candidates for the motion vector predictor to be generated, to one in step S615-2, the processes of steps S615-5, S615-6, S615-7, S615-8, S615-9, and S615-10 can be omitted. There are no restrictions on a method for this limitation, as described above as to the motion vector predictor generator 6023, but it is possible to use, for example, such a method as a method using an intermediate value of three candidates, a method using an average of two candidates, or a method of preliminarily determining a priority order for selection of one motion vector predictor out of a plurality of candidates for the motion vector predictor. In that case, when NCand is not "0" (No) in step S615-03, the processing proceeds to step S615-6.

The above-described method can be applied as a motion vector selection method in the case where the predicted signal of the processing target sub-partition is generated using previously-decoded motion vectors. Namely, the predicted signal of the processing target sub-partition may be generated using the motion vector predictor selected in step S615-2 in FIG. 37. In this case, there is no need for decoding of the differential motion vector, and therefore the motion vector predictor output from the motion predictor 602 is not output to the adder 603 but to the predicted signal generator 607.

Furthermore, the data decoder 601 may be configured to decode application information to specify whether the differential motion vector is to be decoded. In this modification, the motion predictor 602 may include a function to switch the output of the motion vector predictor either to the adder 603 or to the predicted signal generator 607, based on the application information.

In this modification, it is unfavorable that the motion vectors of all the sub-partitions in the target block become identical with each other, because partitioning of the target block becomes meaningless. In this modification, therefore, a motion vector of a sub-partition included in the target block and located prior in the processing order to the processing target sub-partition may be excluded from the candidates for the motion vector predictor, on the occasion of generating the candidates for the motion vector predictor of the processing target sub-partition in step S615-2 in FIG. 37. For example, in the case where the target block is partitioned into two sub-partitions and where the motion vector of the first sub-partition is first restored, the motion vector of the first sub-partitions is excluded from candidates for the motion vector predictor of the second sub-partition. If the motion vector of the first sub-partition is the same as that of the partial region U2, the motion vector of the partial region U2 does not have to be used in generation of the motion vector predictor of the second sub-partition.

In this modification, the occurrence probability in arithmetic decoding of the application information to indicate whether the differential motion vector is to be decoded can be adaptively determined according to the shape information. This method can be configured, for example, to set a higher probability of not encoding the differential motion vector, for the first sub-partition always being in contact with a previously-encoded region, than that for the second sub-partition possibly having no contact with any previously-decoded partial region. Since the effect of this modification was already described using FIGS. 34 and 35, the description thereof is omitted herein.

The below will describe a video encoding program for letting a computer operate as the video encoding device 10 and a video decoding program for letting a computer operate as the video decoding device 20.

Figure 38:
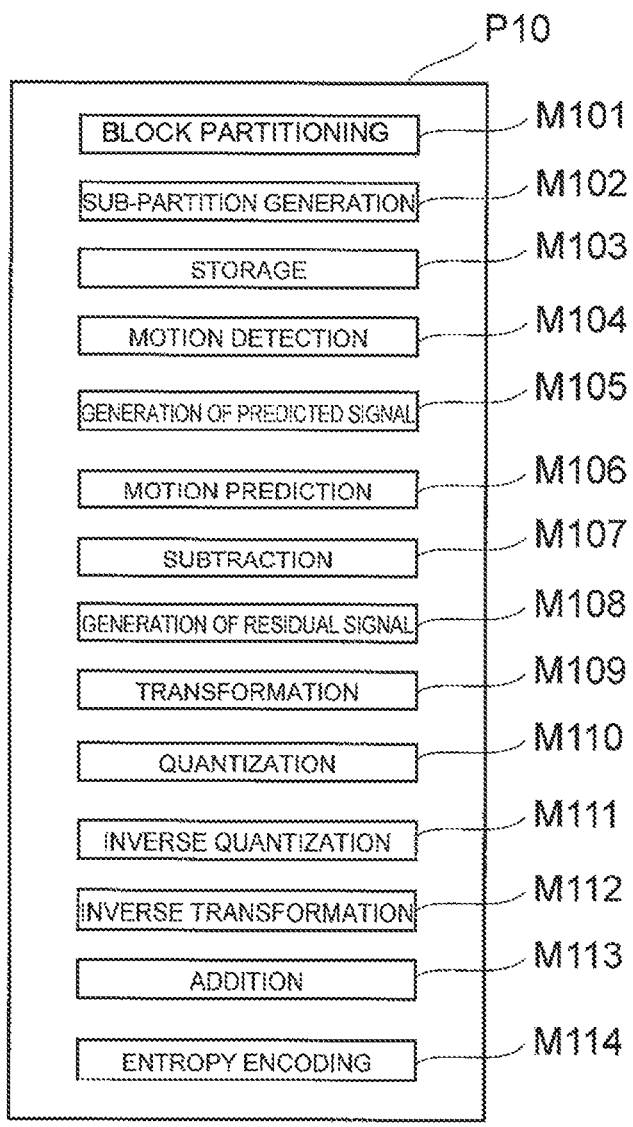
FIG. 38 is a drawing showing an example of a configuration of a video encoding program according to an embodiment.
Figure 39:
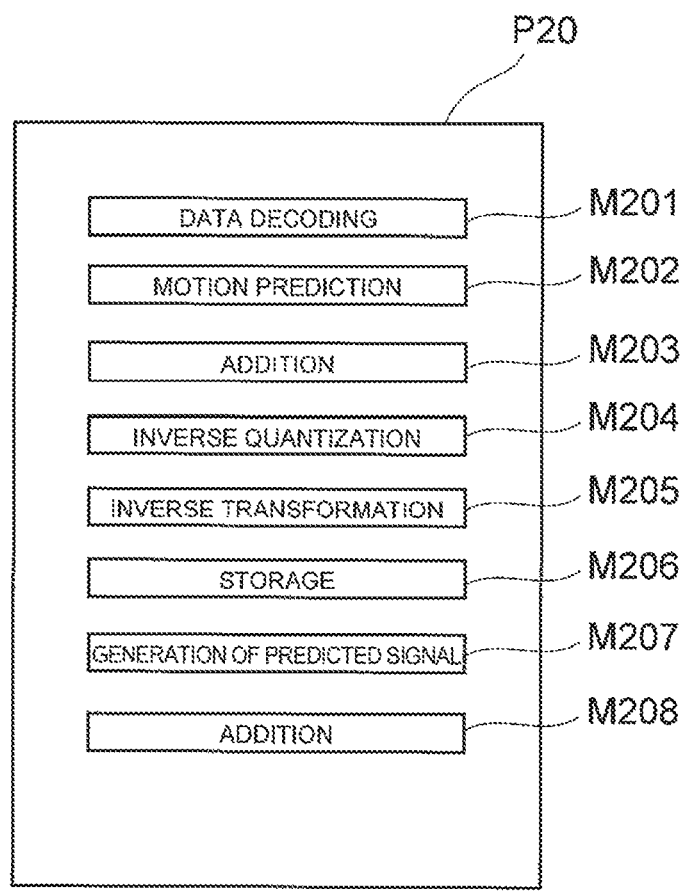
FIG. 39 is a drawing showing an example of a configuration of a video decoding program according to an embodiment.

FIG. 38 is a drawing showing a configuration of the video encoding program according to an embodiment. FIG. 39 is a drawing showing a configuration of the video decoding program according to an embodiment. Reference will be made below to FIG. 18 showing the hardware configuration of the computer according to an embodiment and FIG. 19 showing the perspective view of the computer according to an embodiment, as well as FIGS. 38 and 39.

The video encoding program P10 shown in FIG. 38 can be provided as stored in the recording medium SM. The video decoding program P20 shown in FIG. 38 can also be provided as stored in the recording medium SM. Examples of recording media SM include recording media such as floppy disks, CD-ROMs, DVDs, or ROMs, or semiconductor memories, or the like.

As described above, the computer C10 may be provided with the reading device C12 such as a floppy disk drive unit, a CD-ROM drive unit, or a DVD drive unit, the working memory (RAM) C14 in which an operating system is resident, the memory C16 storing programs stored in the recording medium SM, the monitor device C18 such as a display, the mouse C20 and keyboard C22 as input devices, the communication device C24 for transmission and reception of data and others, and the CPU C26 to control execution of the programs.

When the recording medium SM is put into the reading device C12, the computer C10 becomes accessible to the video encoding program P10 stored in the recording medium SM, through the reading device C12, and becomes able to operate as the video encoding device 10, based on the program P10.

When the recording medium SM is put into the reading device C12, the computer C10 becomes accessible to the video decoding program P20 stored in the recording medium SM, through the reading device C12, and becomes able to operate as the video decoding device 20, based on the program P20.

As shown in FIG. 19, the video encoding program P10 and the video decoding program P20 may be those provided in the form of computer data signal CW superimposed on a carrier wave, through a network. In this case, the computer C10 can execute the program P10 or P20 after the video encoding program P10 or the video decoding program P20 received by the communication device C24 is stored into the memory C16.

As shown in FIG. 38, the video encoding program P10 includes block partitioning module M101, sub-partition generator module M102, storage module M103, motion detection module M104, predicted signal generation module M105, motion prediction module M106, subtraction module M107, residual signal generation module M108, transform module M109, quantization module M110, inverse quantization module M111, inverse transform module M112, addition module M113, and entropy encoding module M114.

In an embodiment, the block partitioning module M101, sub-partition generator module M102, storage module M103, motion detection module M104, predicted signal generation module M105, motion prediction module M106, subtraction module M107, residual signal generation module M108, transform module M109, quantization module M110, inverse quantization module M111, inverse transform module M112, addition module M113, and entropy encoding module M114 cause the computer C10 to execute the same functions as the block partitioner 501, sub-partition generator 502, frame memory 503, motion detector 504, predicted signal generator 505, motion predictor 506, subtracter 507, residual signal generator 508, transformer 509, quantizer 510, inverse quantizer 511, inverse transformer 512, adder 513, and entropy encoder 514, respectively, in the video encoding device 10. Based on this video encoding program P10, the computer C10 becomes able to operate as the video encoding device 10.

As shown in FIG. 39, the video decoding program P20 includes data decoding module M201, motion prediction module M202, addition module M203, inverse quantization module M204, inverse transform module M205, storage module M206, predicted signal generation module M207, and addition module M208.

In an embodiment, the data decoding module M201, motion prediction module M202, addition module M203, inverse quantization module M204, inverse transform module M205, storage module M206, predicted signal generation module M207, and addition module M208 cause the computer C10 to execute the same functions as the data decoder 601, motion predictor 602, adder 603, inverse quantizer 604, inverse transformer 605, frame memory 606, predicted signal generator 607, and adder 608, respectively, in the video decoding device 20. Based on this video decoding program P20, the computer C10 becomes able to operate as the video decoding device 20.

A variety of embodiments of the image prediction encoding/decoding system were described above in detail. It is, however, noted that the present invention is by no means intended to be limited to the above embodiments. The present invention can be modified in many ways without departing from the scope and spirit of the invention.

REFERENCE SIGNS LIST 100 image predictive encoding device; 101 input terminal; 102 block partitioner; 103 predicted signal generator; 104 frame memory; 105 subtracter; 106 transformer; 107 quantizer; 108 inverse quantizer; 109 inverse transformer; 110 adder; 111 quantized transform coefficient encoder; 112 output terminal; 113 prediction block partitioning type selector; 114 motion information estimator; 115 prediction information memory; 116 prediction information encoder; 201 input terminal; 202 data analyzer; 203 inverse quantizer; 204 inverse transformer; 205 adder; 206 output terminal; 207 quantized transform coefficient decoder; 208 prediction information decoder; 10 video encoding device; 20 video decoding device; 501 block partitioner; 502 sub-partition generator; 503 frame memory; 504 motion detector; 505 predicted signal generator; 506 motion predictor; 507 subtracter; 508 residual signal generator; 509 transformer; 510 quantizer; 511 inverse quantizer; 512 inverse transformer; 513 adder; 514 entropy encoder; 601 data decoder; 602 motion predictor; 603 adder; 604 inverse quantizer; 605 inverse transformer; 606 frame memory; 607 predicted signal generator; 608 adder; 5061 motion vector memory; 5062 motion reference candidate generator; 5063 motion vector predictor generator; 6021 motion vector memory; 6022 motion reference candidate generator; 6023 motion vector predictor generator.

The invention claimed is:

1. An image predictive decoding method comprising:
a data analysis step of extracting with a processor, from compressed data of an image, encoded data of prediction information to indicate a prediction method to be used in prediction of a signal of a target region serving as a decoding target, encoded data of a predicted signal of the target region, and encoded data of a residual signal, wherein the compressed data of the image is a result of partition into a plurality of regions and encoding of the target region;
a prediction information decoding step of decoding the encoded data of the prediction information with the processor to restore a prediction block partitioning type and motion information, the prediction block partitioning type indicating a number of prediction regions and region shapes of the prediction regions, wherein the prediction regions are sub-partitioned regions of the target region, and the motion information is used for acquisition of each of a plurality of predicted signals of the respective prediction regions from a previously-reconstructed signal;
a predicted signal generation step of generating the predicted signal of the target region with the processor based on the prediction information associated with the target region;
a residual signal restoration step of restoring with the processor a reconstructed residual signal of the target region from the encoded data of the residual signal; and
a recording step of the processor adding the predicted signal to the reconstructed residual signal to restore a pixel signal of the target region, and storing the pixel signal as the previously-reconstructed signal,
wherein the prediction information decoding step further comprises the steps of:

decoding with the processor the prediction block partitioning type of the target region and storing the prediction block partitioning type as previously-decoded prediction information into a prediction information storage that stores previously-decoded prediction information;
selecting a candidate for motion information with the processor to be used in generation of a predicted signal of a target prediction region serving as a next prediction region based on: the prediction information of a region neighboring the target region, a number of previously-decoded prediction regions in the target region, and the previously-decoded prediction information of the target region, wherein, when the prediction block partitioning type indicates that the target region is horizontally partitioned into a first prediction region on the upper side and a second prediction region on the lower side, and the target prediction region serving as the next prediction region is the second prediction region, the candidate for motion information is selected from previously-decoded motion information of a region neighboring the target prediction region and excluding the first prediction region;
decoding with the processor, according to a number of candidates for motion information selected, merging block information using the selected candidate for motion information and the motion information, or decoding with the processor either one of the merging block information or the motion information, wherein the merging block information is indicative of generation of the predicted signal of the target prediction region; and
storing the motion information to be used in generation of the predicted signal of the target prediction region into the prediction information storage.

2. The image predictive decoding method according to claim 1, wherein the motion information includes a motion vector and a reference frame number.

3. An image predictive decoding method executed by a processor of an image predictive decoding device to implement:
extracting from compressed image data (a) encoded prediction information indicating a prediction method to be used in deriving a prediction signal of a target region to be decoded and (b) an encoded residual signal, wherein the compressed image data is a result from partitioning into a plurality of regions and encoding of the regions;
decoding the encoded prediction information to restore prediction block partitioning type information indicating a number of prediction blocks sub-partitioned in the target region;
if the prediction block partitioning type information indicates that the target region is horizontally partitioned into a first prediction block on the upper side and a second prediction block on the lower side, further decoding the encoded prediction information to restore first merge identification information indicating whether or not to utilize motion information associated with neighboring regions neighboring the first prediction block when generating a prediction signal of the first prediction block and to restore second merge identification information indicating whether or not to utilize motion information associated with neighboring regions neighboring the second prediction block when generating a prediction signal of the second prediction block;

if the first merge identification information indicates not to utilize the motion information of the neighboring regions of the first prediction block, further decoding the encoded prediction information to restore first motion information for use in generating the prediction signal of the first prediction block;

if the first merge identification information indicates to utilize the motion information of the neighboring regions of the first prediction block, further decoding the encoded prediction information to restore first selection information identifying first merge motion information associated with a neighboring region of the first prediction block for use in generating the prediction signal of the first prediction block and to restore the identified first merge motion information;

if the second merge identification information indicates not to utilize the motion information of the neighboring regions of the second prediction block, further decoding the encoded prediction information to restore second motion information for use in generating the prediction signal of the second prediction block;

if the second merge identification information indicates to utilize the motion information of the neighboring regions of the second prediction block, further decoding the encoded prediction information to restore second selection information identifying second merge motion information associated with a neighboring regions of the second prediction block for use in generating the prediction signal of the second prediction block and to restore the identified second merge motion information, wherein the first merge motion information is excluded from the motion information of the neighboring regions of the second prediction block from which the second merge motion information is identified by the second selection information;

using either the first motion information or the first merge motion information and either the second motion information or the second merge motion information, generating the prediction signal of each of the first and second prediction blocks in the target region;

decoding the encoded residual signal to restore a residual signal for the target region; and generating a restored pixel signal of the target region from the prediction signal of each of the first and second prediction block and the restored residual signal and storing the restored pixel signal as a reconstructed image signal.

4. The image predictive decoding method according to claim 3, wherein the motion information includes a motion vector and a reference frame number.

5. An image predictive decoding device comprising:
a processor;
a data analysis unit executable by the processor to extract, from compressed data of an image: encoded data of prediction information to indicate a prediction method to be used in prediction of a signal of a target region serving as a decoding target, encoded data of a predicted signal of the target region, and encoded data of a residual signal;
the compressed data of the image resulting from partition into a plurality of regions and encoding of the target region;
a prediction information decoding unit executable by the processor to decode the encoded data of the prediction information to restore a prediction block partitioning type and motion information, the prediction block partitioning type indicating a number of prediction regions and region shapes of the prediction regions, wherein the prediction regions are sub-partitioned regions of the target region, and the motion information is used for acquisition of each of a plurality of predicted signals of the respective prediction regions from a previously-reconstructed signal;
a predicted signal generation unit executable by the processor to generate the predicted signal of the target region based on the prediction information associated with the target region;
a residual signal restoration unit executable by the processor to restore a reconstructed residual signal of the target region from the encoded data of the residual signal; and
a recording unit executable by the processor to add the predicted signal to the reconstructed residual signal to restore a pixel signal of the target region, and to store the pixel signal as the previously-reconstructed signal,
wherein the prediction information decoding unit includes prediction information storage means adapted to store previously-decoded prediction information of the target region, and the prediction information decoding unit is further executable to decode the prediction block partitioning type of the target region and store the prediction block partitioning type into the prediction information storage means;
the prediction information decoding unit further executable to select a candidate for motion information to be used in generation of a predicted signal of a target prediction region serving as a next prediction region, the candidate for motion information selected based on: the prediction information of a region neighboring the target region, a number of previously-decoded prediction regions in the target region, and the previously-decoded prediction information of the target region, wherein, when the prediction block partitioning type indicates that the target region is horizontally partitioned into a first prediction region on the upper side and a second prediction region on the lower side, and the target prediction region serving as the next prediction region is the second prediction region, the candidate for motion information is selected from previously-decoded motion information of a region neighboring the target prediction region and excluding the first prediction region; and
according to the number of candidates for motion information selected, the prediction information decoding unit further executable to decode merging block information using the selected candidate for motion information and the motion information, or decode either one of the merging block information or the motion information, wherein the merging block information is indicative of generation of the predicted signal of the target prediction region;
the prediction information decoding unit further executable to store the motion information to be used in generation of the predicted signal of the target prediction region into the prediction information storage means.

6. An image predictive decoding device comprising a processor and a memory that stores a program for programming the processor to:
extract from compressed image data (a) encoded prediction information indicating a prediction method to be used in deriving a prediction signal of a target region to be decoded and (b) an encoded residual signal, wherein the compressed image data is a result from partitioning into a plurality of regions and encoding of the regions;

decode the encoded prediction information to restore prediction block partitioning type information indicating a number of prediction blocks in the target region;

if the prediction block partitioning type information indicates that the target region is horizontally partitioned into a first prediction block on the upper side and a second prediction block on the lower side, further decode the encoded prediction information to restore first merge identification information indicating whether or not to utilize motion information associated with neighboring regions neighboring the first prediction block when generating a prediction signal of the first prediction block and to restore second merge identification information indicating whether or not to utilize motion information associated with neighboring regions neighboring the second prediction block when generating a prediction signal of the second prediction block;

if the first merge identification information indicates not to utilize the motion information of the neighboring regions of the first prediction block, further decode the encoded prediction information to restore first motion information for use in generating the prediction signal of the first prediction region;

if the first merge identification information indicates to utilize the motion information of the neighboring regions of the first prediction block, further decode the encoded prediction information to restore first selection information identifying first merge motion information associated with a neighboring region of the first prediction block for use in generating the prediction signal of the first prediction block and to restore the identified first merge motion information;

if the second merge identification information indicates not to utilize the motion information of the neighboring regions of the second prediction block, further decode the encoded prediction information to restore second motion information for use in generating the prediction signal of the second prediction block;

if the second merge identification information indicates to utilize the motion information of the neighboring regions of the second prediction block, further decode the encoded prediction information to restore second selection information identifying second merge motion information associated with a neighboring region of the second prediction block for use in generating the prediction signal of the second prediction block and to restore the identified second merge motion information, wherein the first merge motion information is excluded from the motion information of the neighboring regions of the second prediction block from which the second merge motion information is identified by the second selection information;

using either the first motion information or the first merge motion information and either the second motion information or the second merge motion information, generate the prediction signal of each of the first and second prediction blocks in the target region;

decode the encoded residual signal to restore a residual signal for the target region; and generate a restored pixel signal of the target region from the prediction signal of each of the first and second prediction blocks and the restored residual signal and store the generated pixel signal as a reconstructed image signal.

\* \* \* \* \*